United States Patent [19]

Ishida et al.

[11] Patent Number: 5,049,731
[45] Date of Patent: Sep. 17, 1991

[54] AUTOMATIC FOCUS CONTROL DEVICE HAVING A PLURALITY OF FOCUS DETECTION AREAS

[75] Inventors: Tokuji Ishida; Toshio Norita; Hiroshi Ootsuka, all of Osaka, Japan

[73] Assignee: Minolta Camera Kabushiki Kaisha, Osaka, Japan

[21] Appl. No.: 457,898

[22] Filed: Dec. 27, 1989

Related U.S. Application Data

[63] Continuation of Ser. No. 141,845, Jan. 11, 1988, Pat. No. 4,904,854.

[30] Foreign Application Priority Data

| Jan. 12, 1987 | [JP] | Japan | 62-4621 |
| Jan. 12, 1987 | [JP] | Japan | 62-4622 |
| Jan. 12, 1987 | [JP] | Japan | 62-4623 |
| Jan. 12, 1987 | [JP] | Japan | 62-4624 |
| Jan. 12, 1987 | [JP] | Japan | 62-4625 |
| Jan. 12, 1987 | [JP] | Japan | 62-4626 |
| Jan. 12, 1987 | [JP] | Japan | 62-4627 |
| Jan. 12, 1987 | [JP] | Japan | 62-4628 |

[51] Int. Cl.$^5$ .............................................. G01J 1/20
[52] U.S. Cl. .................................. 250/201.2; 250/201.8; 354/408
[58] Field of Search ................. 250/201.2, 201.3, 204, 250/201.8; 354/402, 408, 409

[56] References Cited

U.S. PATENT DOCUMENTS

| 4,203,031 | 5/1980 | Kamachi et al. | 250/204 |
| 4,687,917 | 8/1987 | Kusaka et al. | 250/208.1 |
| 4,772,912 | 9/1988 | Ishida et al. | 250/204 |
| 4,792,668 | 12/1988 | Akashi et al. | 250/201.2 |
| 4,831,403 | 5/1989 | Ishida et al. | 354/402 |
| 4,835,615 | 5/1989 | Taniguchi et al. | 358/213.19 |
| 4,857,720 | 8/1989 | Karasaki | 250/201.2 |
| 4,888,609 | 12/1989 | Hamada et al. | 354/402 |

Primary Examiner—David C. Nelms
Assistant Examiner—S. Allen
Attorney, Agent, or Firm—Burns, Doane, Swecker & Mathis

[57] ABSTRACT

An automatic focus control device including a plurality of photo-sensors corresponding, respectively, to a plurality of focus detecting regions, an optical system for guiding light to the photo-sensors, a first calculating device for calculating first defocus amounts upon reception of signals from the photo-sensors, respectively, a storage for storing deviation amounts in a direction of an optical axis for the focus detecting regions, respectively and a second calculating device for calculating second defocus amounts corrected on the basis of the first defocus amounts and the deviation amounts, respectively.

12 Claims, 36 Drawing Sheets

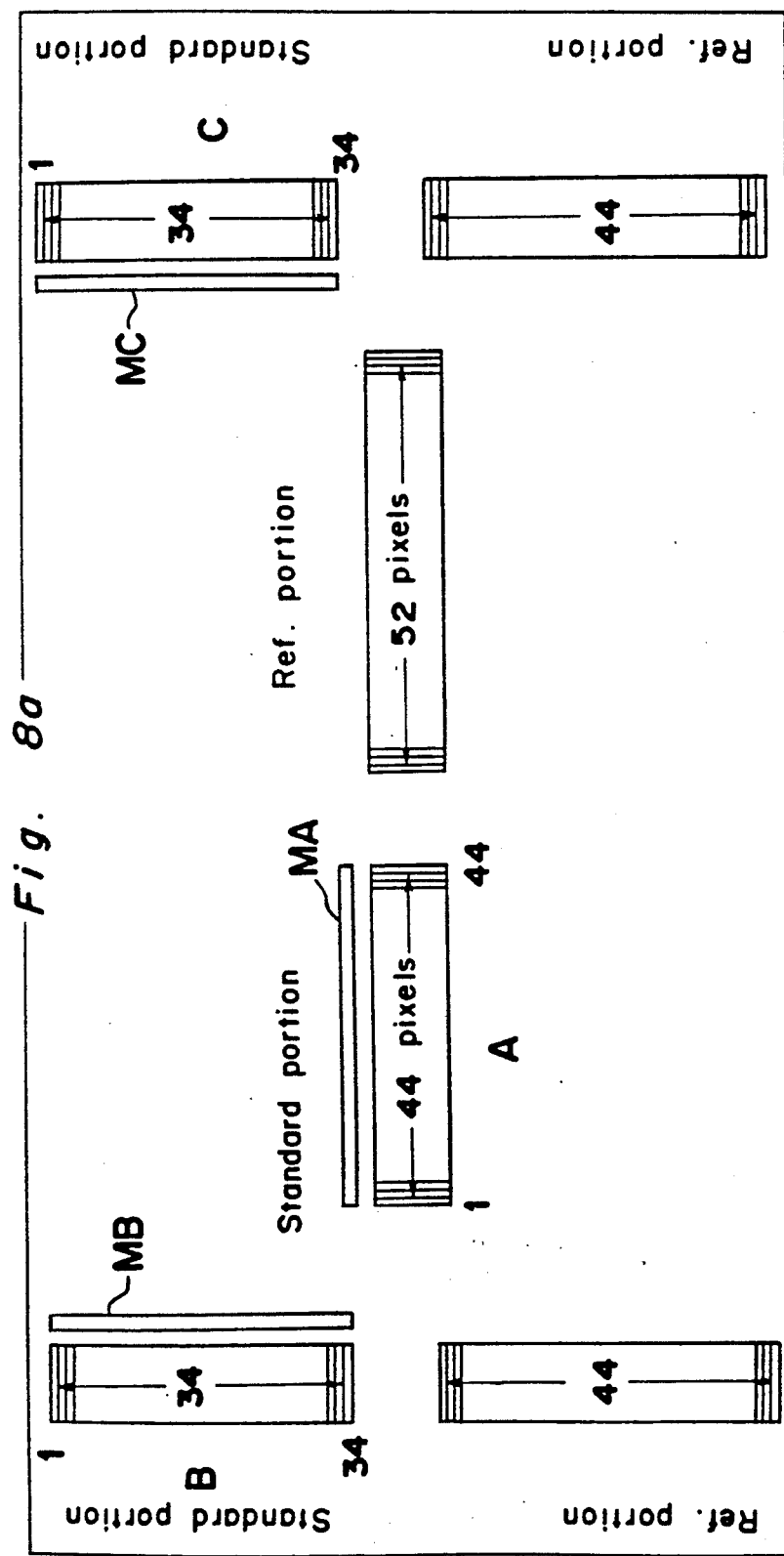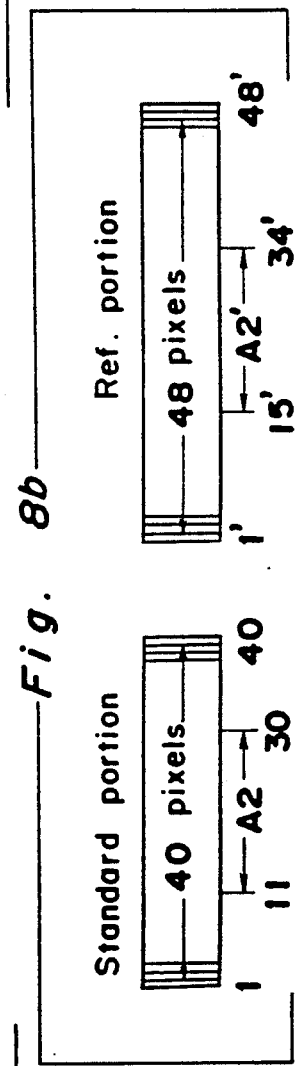

AUTOMATIC FOCUS CONTROL DEVICE HAVING A PLURALITY OF FOCUS DETECTION AREAS

This application is a continuation of application Ser. No. 07/141,845 filed Jan. 11, 1988, now U.S. Pat. No. 4,904,854.

BACKGROUND OF THE INVENTION

The present invention relates to an automatic focus control device having a plurality of focus detecting regions.

Conventionally, an automatic focus detecting device having a single focus detecting region, in which a defocus amount is corrected in accordance with assembly errors of an optical system, has been proposed in, for example, Japanese Patent Laid-Open Publication No. 126517/1984. However, an automatic focus detecting device having a plurality of focus detecting regions, in which a defocus amount is corrected for each of the focus detecting regions, is not known.

As shown in FIG. 7, in the case where automatic focus detection is performed in three focus detecting regions, i.e. a horizontally elongated focus detecting area A disposed at a center of a photographing field S and a pair of vertically elongated focus detecting regions B and C disposed at opposite sides of the photographing field S, CCD light-receiving element arrays e1, e2 and e3 corresponding to the focus detection regions A, B and C, respectively are provided on one chip as shown in FIG. 4. If only one CCD light-receiving element array, for example, only the CCD light-receiving element array corresponding to the central focus detecting region A is provided, positional adjustment of the CCD chip in the direction of its optical axis can be performed by performing positional adjustment of only the central portion of the CCD chip in the direction of the optical axis. However, in the case where a plurality of, for example, three CCD light-receiving element arrays are provided as described above, parallelism of the CCD chip plays an important role. Namely, when parallelism of the CCD chip is poor, deviation in the direction of the optical axis occurs at opposite sides of the CCD chip. When parallelism of the CCD chip is poor, deviation in the direction of the optical axis occurs at opposite sides of the CCD chip. Even in the case of only one CCD light-receiving element array, the deviation also takes place at opposite sides of the CCD chip but assumes a small value. Meanwhile, also in the case where a plurality of the CCD light-receiving element arrays corresponding to the focus detecting regions, respectively are not provided on a single chip, deviations of the assembled CCD light-receiving element arrays in the direction of the optical axis are different from each other, so that it becomes necessary to correct the respective focus detecting regions in the direction of the optical axis.

As shown in FIG. 6a, a focus detecting device has been widely used in which an image formed by a light-receiving lens a is re-formed by a pair of reimaging lenses d1 into first and second images on a light-receiving element array e1 arranged in a straight line and a distance between the first and second images is detected by the light-receiving element array e1 such that a focusing state is detected. In this known focus detecting device, when the distance between the first and second images assumes a predetermined value, a decision of an in-focus state in which the image is formed on a predetermined focal plane is made. Meanwhile, when the distance between the first and second images is smaller and larger than the predetermined value, decisions of front and rear focus states in which the image is formed forwardly and rearwardly of the predetermined focal plane are made, respectively such that deviation amounts of the distance between the images from that of the in-focus position are outputted as defocus amounts. At the time of focus detection, the distance j between the first and second images is obtained and the defocus amount $\Delta\epsilon$ is calculated by multiplying the distance j by a predetermined coefficient s. The above described Japanese Patent Laid-Open Publication proposes correction of the coefficient s since the coefficient s for the front focus state is different from that for the rear focus state.

In the CCD chip of FIG. 4, it is considered that if a length of the CCD light-receiving element arrays e1 and e3 corresponding to the focus detecting regions B and C disposed at opposite sides of the photographing field, respectively is made smaller than that of the CCD light-receiving element array e2 corresponding to the focus detecting region A disposed at the center of the photographing field, a focus detecting module can be made smaller in size by a difference between the length of the CCD light-receiving element arrays e1 and e3 and that of the CCD light-receiving element array e2 and a time period required for effecting data dump from the CCD light-receiving element arrays e1 and e3 can be reduced. To this end, as shown in FIG. 4, a pair of reimaging lenses d1 and a pair of reimaging lenses d3, which are, respectively, disposed at opposite sides of the CCD chip, have distances Dd1 and Dd3 smaller than a distance Dd2 between a pair of reimaging lenses d2 disposed at a center of the CCD chip, so that the numbers of the elements required for the CCD light-receiving element arrays e1 and e3 are determined accordingly. However, in this case, such a problem arises due to the difference between the distances Dd1 and Dd3 and the distance Dd2 that a coefficient for converting a distance between the first and second images into a defocus amount on the CCD light-receiving element array e2 is different from a coefficient for converting a distance between the first and second images into a defocus amount on the CCD light-receiving element array e1 and a coefficient for converting a distance between the first and second images into a defocus amount on the light-receiving element array e3.

In FIG. 6a, the distance De1 between the first and second images on the light-receiving element array e1 changes according to changes of a distance Dd1 of the reimaging lenses d1. Therefore, in the case where the reimaging lenses d1 are made of, for example, plastic, the distance Dd1 of the reimaging lenses d1 varies in response to temperature change, so that the distance De1 between the first and second images on the light-receiving element array e1 changes, thereby resulting in also change of the defocus amount. Thus, Japanese Patent Laid-Open Publication No. 235110/1985 discloses that temperature of the focus detecting device is detected such that the defocus amount is corrected in accordance with the detected temperature of the focus detecting device.

Meanwhile, if temperature rise occurs in the case where as shown in FIG. 4, a pair of the reimaging lenses d1 and a pair of the reimaging lenses d3, which are, respectively, disposed at opposite sides of the CCD chip, have the distances Dd1 and Dd3 smaller than a distance Dd2 of a pair of the reimaging lenses d2 disposed at a center of the CCD chip, so that the numbers of the elements required for the CCD light-receiving element arrays e1 and e3 are determined accordingly, amounts of change of the distances between the two images on the CCD light-receiving element arrays e1, e2 and e3 upon temperature rise are different from each other due to the differences among the distances Dd1, Dd2 and Dd3 even if the reimaging lenses d1, d2 and d3 are made of an identical material. Meanwhile, in the case where the reimaging lenses are not made of an identical material, the reimaging lenses have different coefficients of thermal expansion, so that amounts of change of the distances between the images on the CCD light-receiving element arrays e1, e2 and e3 upon temperature rise are different from each other for the respective focus detecting regions.

SUMMARY OF THE INVENTION

Accordingly, an essential object of the present invention is to provide an automatic focus control device having a plurality of focus detecting regions, in which correction in a direction of an optical axis can be performed for the respective focus detecting regions.

A second object of the present invention is to provide an automatic focus control device in which even if distances between pairs of reimaging lenses for a plurality of focus detecting regions are different from each other, a distance between two images on each of light-receiving element arrays can be converted into a defocus amount.

A third object of the present invention is to provide an automatic focus control device in which even if distances between pairs of reimaging lenses for a plurality of focus detecting regions are different from each other, temperature compensation of a defocus amount for each of the focus detecting regions can be performed.

BRIEF DESCRIPTION OF THE DRAWINGS

These objects and features of the present invention will become apparent from the following description taken in conjunction with the preferred embodiments thereof with reference to the accompanying drawings, in which:

FIGS. 8a and 8b are views explanatory of a CCD chip employed in the automatic focus control device of FIGS. 1 to 3;

Before the description of the present invention proceeds, it is to be noted that like parts are designated by like reference numerals throughout several views of the accompanying drawings.

DETAILED DESCRIPTION OF THE INVENTION

Figure 1:
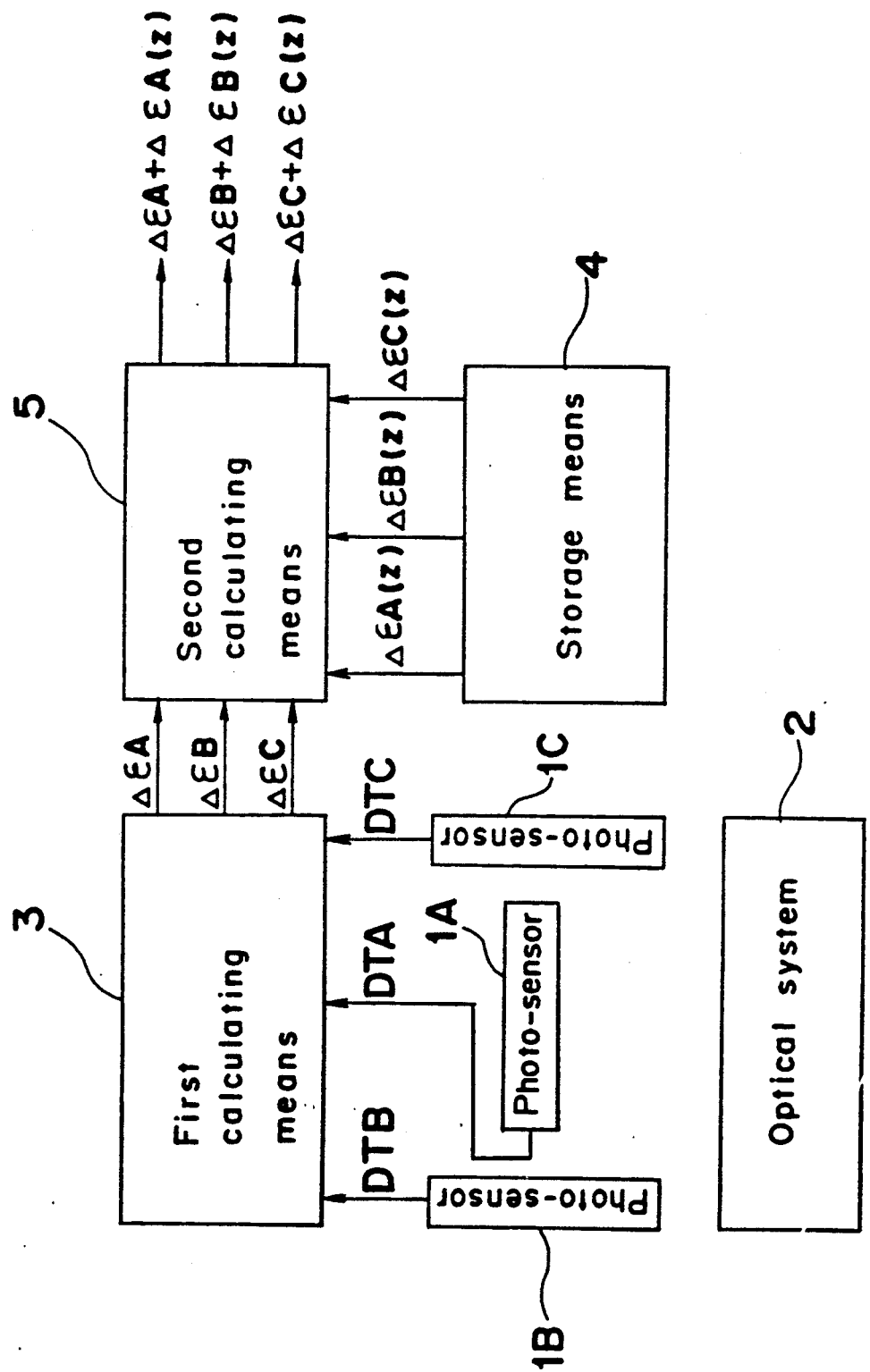
FIGS. 1 to 3 are block diagrams of an automatic focus control device according to an embodiment of the present invention.

Referring now to the drawings, there is shown in FIG. 1, an automatic focus control device according to an embodiment of the present invention. The device includes photo-sensor means 1A, 1B and 1C corresponding to focus detecting regions A, B and C, respectively, an optical system 2 for guiding light to the photo-senor means 1A, 1B and 1C, a first calculating means 3 for calculating defocus amounts $\Delta\epsilon A$, $\Delta\epsilon B$ and $\Delta\epsilon C$ upon reception of signals DTA, DTB and DTC from the photo-sensor means 1A, 1B and 1C, respectively, a storage means 4 for storing deviation amounts $\Delta\epsilon A(z)$, $\Delta\epsilon B(z)$ and $\Delta\epsilon C(z)$ for the regions A, B and C, respectively in a direction of an optical axis and a second calculating means 5 for calculating corrected defocus amounts $(\Delta\epsilon A+\Delta\epsilon A(z))$, $(\Delta\epsilon B+\Delta\epsilon B(z))$ and $(\Delta\epsilon C+\Delta\epsilon C(z))$ on the basis of the defocus amounts $\Delta\epsilon A$, $\Delta\epsilon B$ and $\Delta\epsilon C$ obtained by the first calculating means 3 and the deviation amounts $\Delta\epsilon A(z)$, $\Delta\epsilon B(z)$ and $\Delta\epsilon C(z)$ for the regions A, B and C, respectively in the direction of the optical axis stored in the storage means 4.

In the device, light is, respectively, guided from the optical system 2 to a plurality of the photo-sensor means 1A, 1B and 1C for performing focus detection in a plurality of regions A, B and C. The signals DTA, DTB and DTC from the photo-sensor means 1A, 1B and 1C are inputted to the first calculating means 3 in which the defocus amounts $\Delta\epsilon A$, $\Delta\epsilon B$ and $\Delta\epsilon C$ are calculated. The deviation amounts $\Delta\epsilon A(z)$, $\Delta\epsilon B(z)$ and $\Delta\epsilon C(z)$ for the regions A, B and C in the direction of the optical axis are stored in the storage means 4. The corrected defocus amounts $(\Delta\epsilon A+\Delta\epsilon A(z))$, $(\Delta\epsilon B+\Delta\epsilon B(z))$ and $(\Delta\epsilon C+\Delta\epsilon C(z))$ are newly calculated on the basis of the deviation amounts $\Delta\epsilon A(z)$ $\Delta\epsilon B(z)$ and $\Delta\epsilon C(z)$ for the regions A, B and C in the direction of the optical axis stored in the storage means 4 and the defocus amounts $\Delta\epsilon A$, $\Delta\epsilon B$ and $\Delta\epsilon C$ obtained by the first calculating means 3. Therefore, in the device, it becomes possible to separately correct the deviation amounts in the direction of the optical axis for the photo-sensor means 1A, 1B and 1C.

In the device, it is needless to say that the number of the focus detecting regions is not limited to three but can be set to an arbitrary value not less than two.

Figure 2:
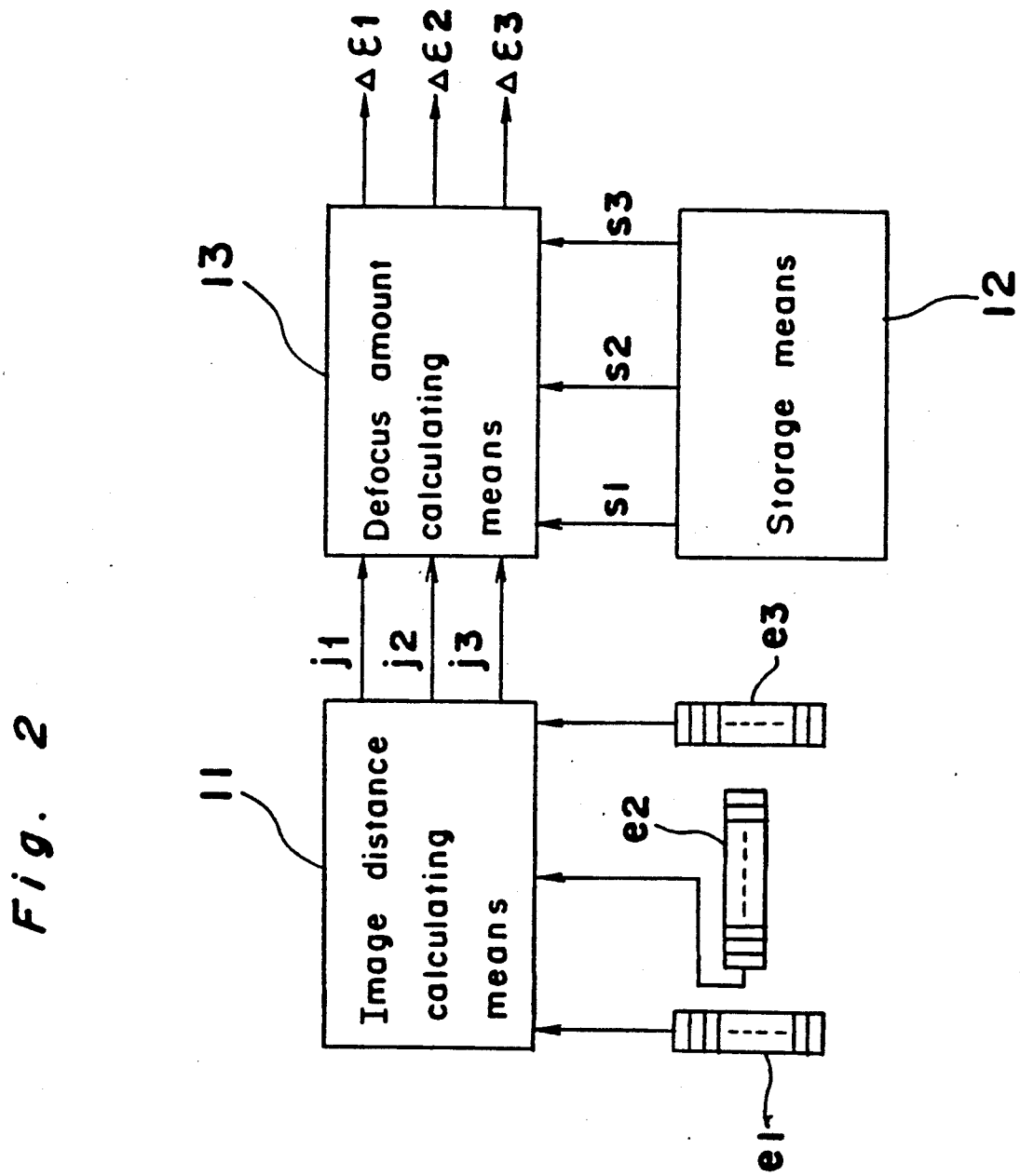
Figure 4:
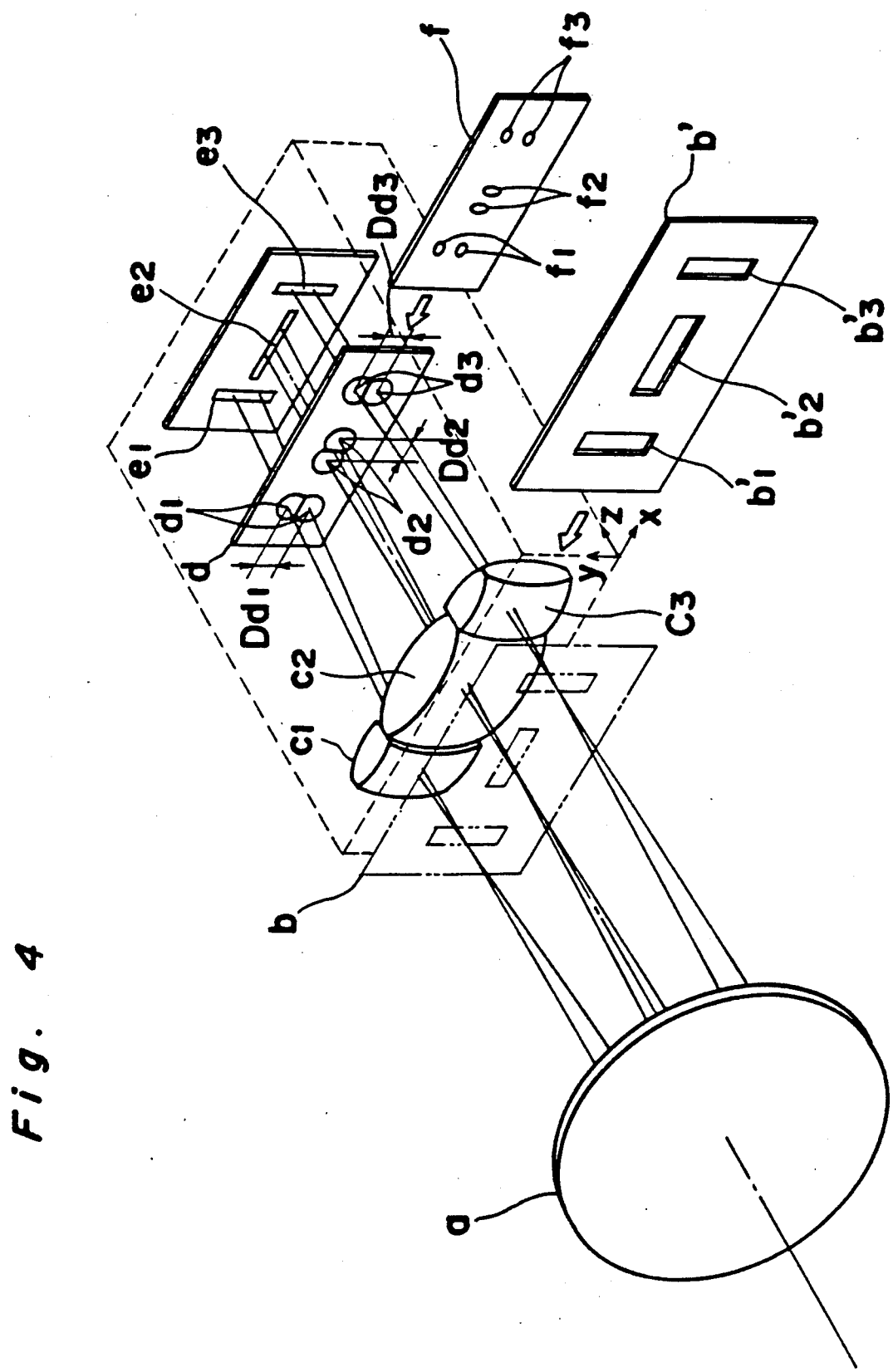
FIG. 4 is a perspective view of the automatic focus control device of FIGS. 1 to 3.

Referring to FIG. 2, there is shown an automatic focus control device according to the embodiment of the present invention. The device includes a plurality of focus detecting units. As shown in FIG. 4, in the device, an image formed by a photo-taking lens a is re-formed by three pairs of reimaging lenses d1, d2 and d3 into three sets of first and second images on light-receiving element arrays e1, e2 and e3 each arranged in a line. The focus detecting units detect distances j1, j2 and j3 between the first and second images on the light-receiving element arrays e1, e2 and e3 from outputs of the light-receiving element arrays e1, e2 and e3, respectively so as to determine a focusing state of the photo-taking lens a. In the device, a distance Dd2 of at least one pair of the reimaging lenses d2 is different from a distance Dd1 between the reimaging lenses d1 and a distance Dd3 between the reimaging lens d3. As shown in FIG. 2, the device includes an image distance calculating means 11 for calculating the distances j1, j2 and j3 between the first and second images on the light-receiving element arrays e1, e2 and e3 from the outputs of the light-receiving element arrays e1, e2 and e3, respectively, a storage means 12 for storing, for the focus detecting regions A, B and C, coefficients s1, s2 and s3 for converting the distances j1, j2 and j3 between the first and second images on the light-receiving element arrays e1, e2 and e3 into defocus amounts $\Delta\epsilon1$, $\Delta\epsilon2$ and $\Delta\epsilon3$, respectively and a defocus amount calculating means 13 for calculating the defocus amounts $\Delta\epsilon1$, $\Delta\epsilon2$ and $\Delta\epsilon3$ from the distances j1, j2 and j3 between the first and second images on the light-receiving element arrays e1, e2 and e3 and the coefficients s1, s2 and s3 stored in the storage means 12.

In the device, at least one of the distances Dd1, Dd2 and Dd3 of the reimaging lenses d1, d2 and d3 is different from the remaining ones of the distances Dd1, Dd2 and Dd3. The outputs of the light-receiving element arrays e1, e2 and e3 are inputted to the image distance calculating means 11 in which the distances j1, j2 and j3 between the first and second images on the light-receiving element arrays e1, e2 and e3 are calculated. The coefficients s1 s2 and s3 for converting the distances j1, j2 and j3 between the first and second images into the defocus amounts $\Delta\epsilon1$, $\Delta\epsilon2$ and $\Delta\epsilon3$ are stored for the focus detecting areas A, B and C in the storage means 12. In the defocus amount calculating means 13, the defocus amounts $\Delta\epsilon1$ ($=s1\times j1$), $\Delta\epsilon2$ ($=s2\times j2$) and $\Delta\epsilon3$ ($=s3\times j3$) are calculated from the coefficients s1, s2 and s3 and the distances j1, j2 and j3 between the first and second images on the light-receiving element arrays e1, e2 and e3, respectively.

Figure 3:
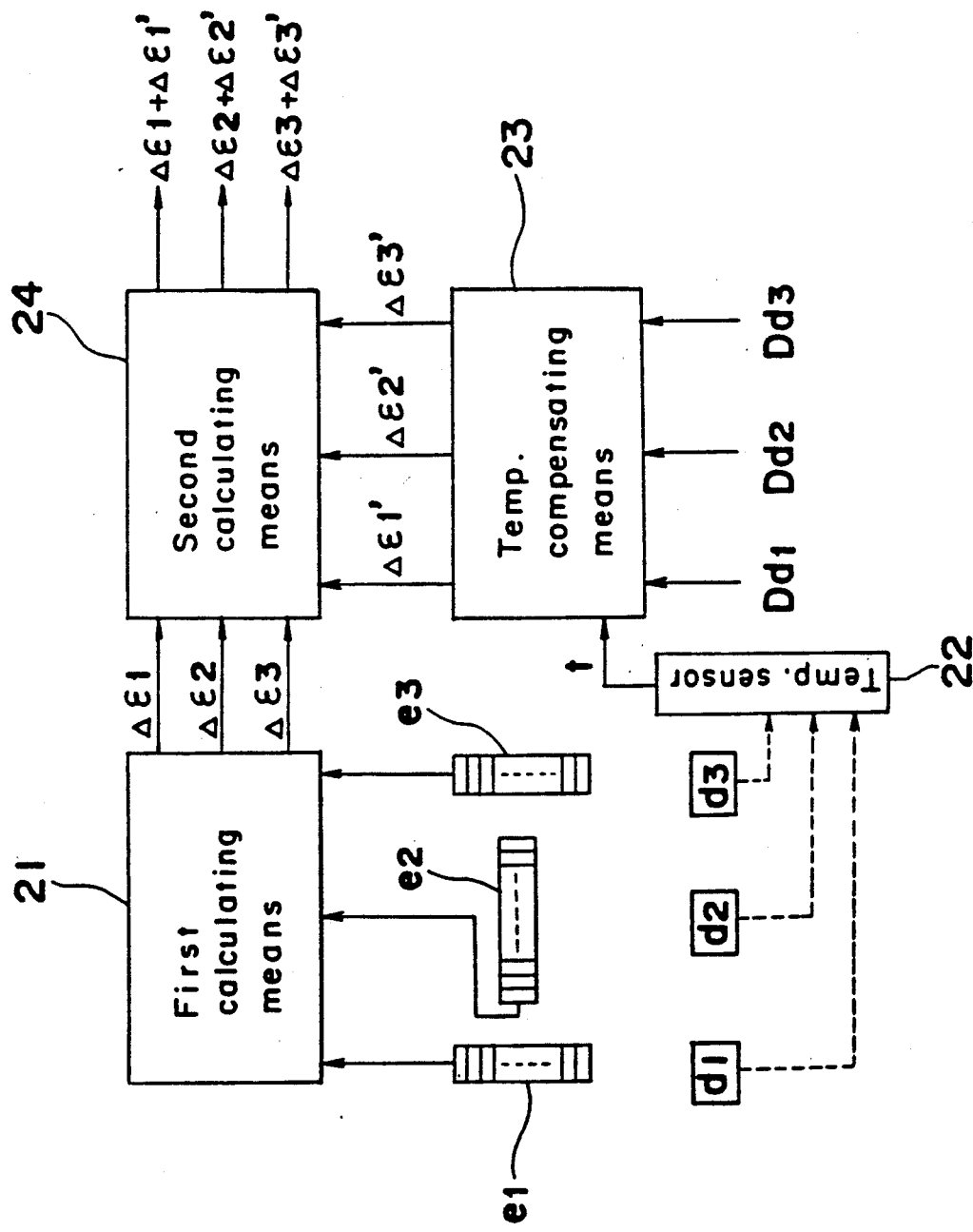

Referring to FIG. 3, there is shown an automatic focus control device according to the embodiment of the present invention. The device includes a first calculating means 21 for calculating defocus amounts $\Delta\epsilon1$, $\Delta\epsilon2$ and $\Delta\epsilon3$ in accordance with distances between first and second images on the light-receiving element arrays e1, e2 and e3, which distances are detected by outputs of the light-receiving element arrays e1, e2 and e3, respectively, a temperature sensor 22 for detecting a temperature t in the vicinity of the reimaging lenses d1, d2 and d3, a temperature compensating means 23 for determining temperature compensation amounts $\Delta\epsilon1'$, $\Delta\epsilon2'$ and $\Delta\epsilon3'$ for the defocus amounts of the focus detecting regions in accordance with the temperature t detected by the temperature sensor 22 and the distances Dd1, Dd2 and Dd3 of the reimaging lenses d1, d2 and d3 and a second calculating means 24 for calculating defocus amount ($\Delta\epsilon1+\Delta\epsilon1'(z)$), ($\Delta\epsilon2+\Delta\epsilon2'(z)$) and ($\Delta\epsilon3+\Delta\epsilon3'(z)$) having temperature compensation from the defocus amounts $\Delta\epsilon1$, $\Delta\epsilon2$ and $\Delta\epsilon3$ obtained by the first calculating means 21 and the temperature compensation amounts $\Delta\epsilon1'$, $\Delta\epsilon2'$ and $\Delta\epsilon3'$ obtained by the temperature compensating means 23.

In the device, the distance Dd2 of at least one pair of the reimaging lenses d2 is different from the distance Dd1 of the reimaging lenses d1 and the distance Dd3 of the reimaging lenses d3. Thus, amounts of change of the distances Dd1, Dd2 and Dd3 of the reimaging lenses d1, d2 and d3 are different from each other when temperature has changed. Thus, the temperature compensation amounts $\Delta\epsilon1'$, $\Delta\epsilon2'$ and $\Delta\epsilon3'$ of the defocus amounts for the focus detecting regions are calculated by the temperature compensating means 23 from the temperature t detected by the temperature sensor 22 an the distances Dd1, Dd2 and Dd3 of the reimaging lenses d1, d2 and d3. The defocus amounts $\Delta\epsilon1$, $\Delta\epsilon2$ and $\Delta\epsilon3$ calculated by the first calculating means 21 are subjected to temperature compensation of the temperature compensation amounts $\Delta\epsilon1'$, $\Delta\epsilon2'$ and $\Delta\epsilon3'$ in the second calculating means 24. Meanwhile, it is convenient to detect the temperature at only one location on the assumption that temperatures t1, t2 and t3 of the reimaging lenses d1, d2 and d3 are substantially identical with each other. However, it can also be so arranged that the temperatures t1, t2 and t3 of the reimaging lenses d1, d2 and d3 are separately detected.

FIG. 4 shows schematically a construction of the automatic focus control device. The device includes a photo-taking lens a having a predetermined focal plane b, a field aperture b' disposed adjacent to the focal plane b and having rectangular openings b'1, b'2 and b'3, condenser lenses c1, c2 and c3, three pairs of reimaging lenses d1, d2 and d3, CCD (charge coupled device) light-receiving element arrays e1, e2 and e3 disposed at a focal plane of the reimaging lenses d1, d2 and d3 and an aperture mask f having three pairs of elliptic openings f1, f2 and f3. Two images are formed on the CCD light-receiving element array e1 by means of the pair of reimaging lenses d1 by the light having been restricted by the rectangular opening b'1 and passed through the condenser lens c1. Likewise, images restricted by the rectangular openings b'2 and b'3 are, respectively projected on the CCD light-receiving element array e2 and e3 by the condenser lenses c2 and c3 of the reimaging lenses d2 and d3, respectively.

Characters Dd1 denote a distance between the pair of reimaging lenses d1, characters Dd2 denote a distance between the pair of reimaging lenses d2 and characters Dd3 denote a distance between the pair of reimaging lenses d3. Supposing that a rectangular coordinate system having an x-axis, a y-axis and a z-axis is established as shown in FIG. 4, the CCD light-receiving element arrays e1 and e3 arranged in the direction of the y-axis are set, in length, smaller than the CCD light-receiving element array e2 arranged in the direction of the x-axis for the purpose of reducing an area of the CCD light-receiving element arrays e1, e2 and e3 and a total time period required for outputting data.

Figure 5A:
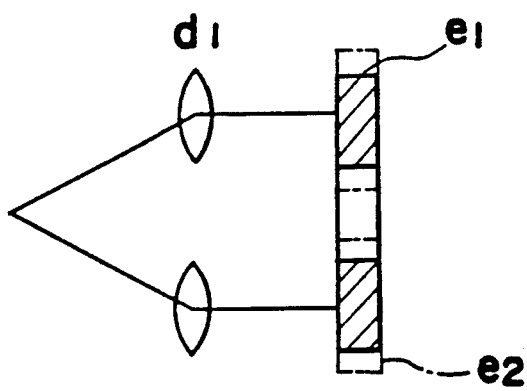
FIGS. 5a, 5b, and 6a to 6c are views explanatory of operation of the automatic focus control device of FIGS. 1 to 3.

This reduction is described with reference to FIGS. 5a and 5b. The CCD light-receiving element arrays are not formed by only a necessary number of the elements (hatched portions) but are formed in a line so as to include also the blank portion. Therefore, when the distance Dd1 between the reimaging lenses d1 is made equal to the distance Dd2 between the central CCD light-receiving element array d2 in the case where, for example, a necessary number of the elements for the CCD light-receiving element array e2 is larger than that for the CCD light-receiving element array e1, the CCD light-receiving element array e1 is formed as shown by the solid lines in FIG. 5a. Thus, as compared with the central CCD light-receiving element array e2 shown by the one-dot chain lines, unnecessary CCD pixels increases in the CCD light-receiving element array e1 and the CCD light-receiving element array e1 becomes large in size. Meanwhile, data are outputted also to the blank portions and thus, a time period required for data output increases. However, since the distance between the images on the CCD light-receiving element array e1 is equal to that of the CCD light-receiving element array e2 at this time, a defocus amount per pitch of the CCD light-receiving element array e1 becomes equal to that of the CCD light-receiving element array e2 and thus, no correction is necessary.

Figure 5B:
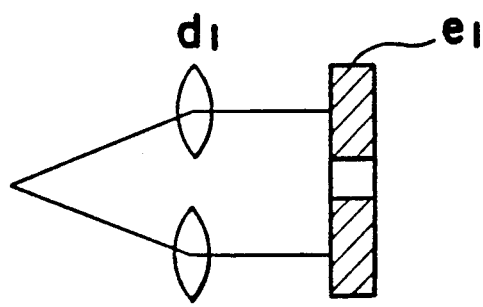

In FIG. 5b, the distance Dd1 between the reimaging lenses d1 is reduced in order to decrease the distance between the images on the CCD light-receiving element array e1, thereby saving the CCD elements and making the CCD light-receiving element array e1 compact in size. Furthermore, a time period required for data output is reduced and an imaging optical system can be made compact in size. However, since the distance between the images on the CCD photo-receiving element array e1 or e3 is different from that of the CCD light-receiving element array e2 when an identical defocus amount is given, correction of the distance between the images becomes necessary.

Figure 6A:
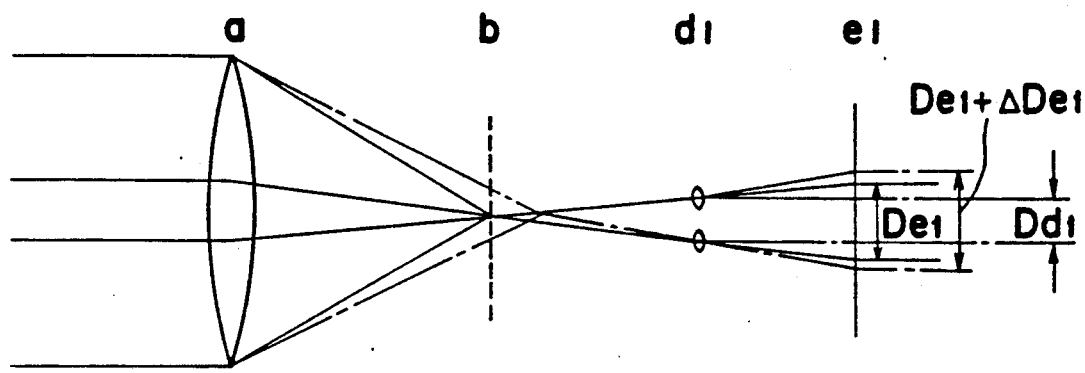
Figure 6B:
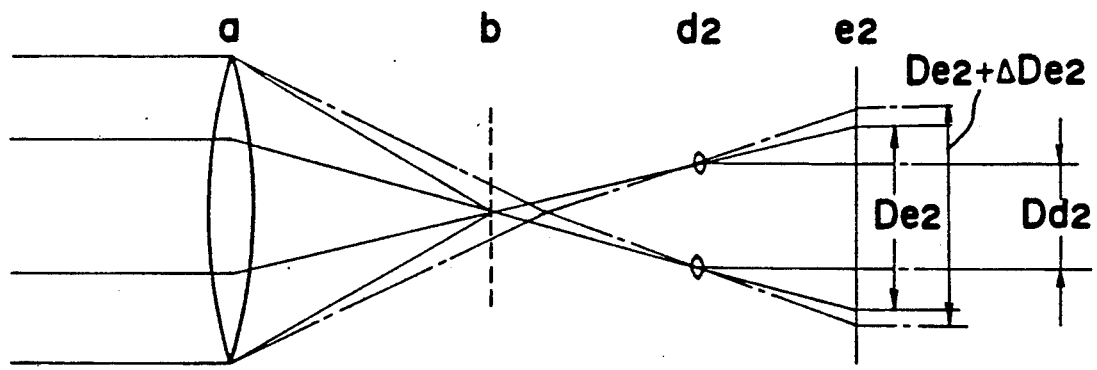

From the foregoing, it is desirable that the distances Dd1, Dd2 and Dd3 are so set as to satisfy the relation of $(Dd2 \geq Dd1 = Dd3)$, so that a basic distance between the images formed on the CCD light-receiving element arrays e1 and e3 is made smaller than that of the CCD light-receiving element array e2 and the distances between the images are corrected. In FIG. 6a, at the time of an in-focus state for the distance Dd1 between the reimaging lenses d1, two images formed on the CCD light-receiving element array e1 are spaced a distance De1 from each other. Meanwhile, in FIG. 6b, at the time of the in-focus state for the distance Dd2 between the reimaging lenses d2, two images formed on the CCD light-receiving element array e2 are spaced a distance De2 from each other. In the same manner as FIG. 4, FIGS. 6a and 6b show the photo-taking lens a having the predetermined focal plane b, the reimaging lenses d1 and d2 and the CCD light-receiving element arrays e1 and e2 disposed at the focal plane of the reimaging lenses d1 and d2. The images projected onto the CCD light-receiving element arrays e1 and e2 are subjected to photoelectric conversion so as to be used for focus detection. In case the distance Dd1 between the reimaging lenses d1 and the distance Dd2 between the reimaging lenses d2 are so set as to be different from each other as shown in FIGS. 6a and 6b, an incremental or decremental amount $\Delta De1$ of the distance De1 and an incremental or decremental amount $\Delta De2$ of the distance De2 are different from each other when an identical defocus amount is given. Meanwhile, even in case the distance Dd1 between the reimaging lenses d1 and the distance Dd3 between the reimaging lenses d3 are so set as to be equal to each other, a certain difference may arise between the distances Dd1 and Dd3 in manufacturing processes. Furthermore, there may be deviations in pitch of the CCD light-receiving element itself. Thus, it is desirable that a detection sensitivity of distance measurement (defocus amount per pitch) is separately set for each of the focus detecting regions.

Meanwhile, the distance Dd1 between the reimaging lenses d1, the distance Dd2 between the reimaging lenses d2 and the distance Dd3 between the reimaging lenses d3 change upon change in temperature. Hence, even if the reimaging lenses d1, d2 and d3 are made of the same material having an identical coefficient of thermal expansion, changes $\Delta DTd1$, $\Delta DTd2$ and $\Delta DTd3$ of the distances Dd1, Dd2 and Dd3 upon temperature change are different from each other in case the distances Dd1, Dd2 and Dd3 are different from each other at ordinary temperature. Especially, when the reimaging lenses d1, d2 and d3 are made of plastic, thermal expansion of the reimaging lenses d1, d2 and d3 upon temperature change becomes conspicuous. Therefore, it is desirable that a coefficient of temperature compensation is separately set for each of the focus detecting regions.

Figure 6C:
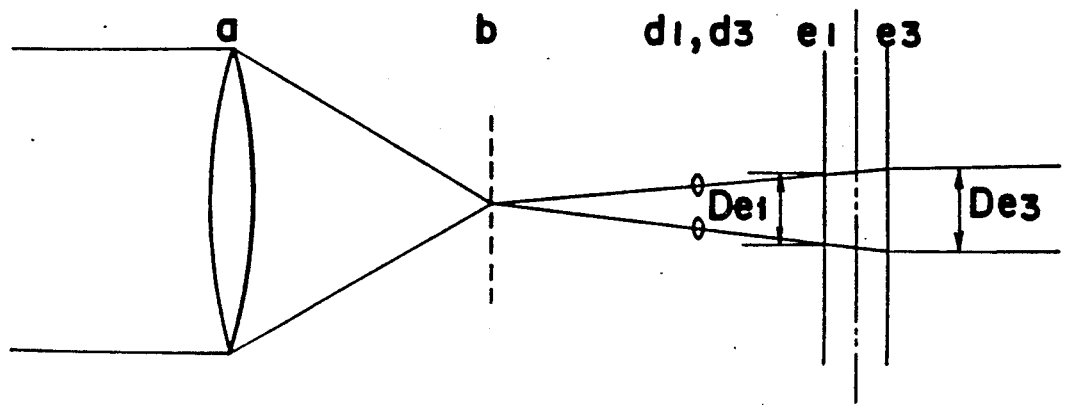

Meanwhile, the optical system module, including the condenser lenses c1, c2 and c3, and the pairs of reimaging lenses d1, d2 and d3, and the CCD light-receiving elements are bonded to each other through positional adjustments thereof in manufacturing processes. When an error of parallelism therebetween is produced at this time, there is a difference between the basic distance De1 between the images formed on the CCD light-receiving element array e1 and a basic distance De3 between the images formed on the CCD light-receiving element array e3 as shown in FIG. 6c even if the reimaging lenses d1 and d3 are manufactured identically. In order to correct this difference, it is desirable that different adjustment amounts in the direction of the z-axis are set for the focus detecting regions or focus detecting blocks, respectively.

Figure 7:
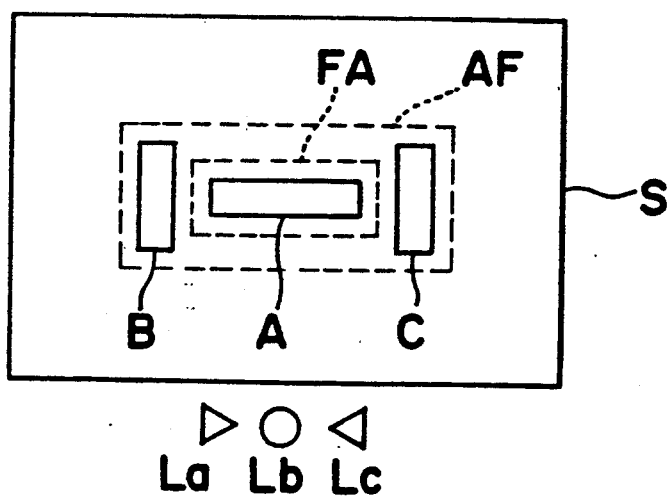
FIG. 7 is a front elevational view indicative of display in a viewfinder employed in the automatic focus control device of FIGS. 1 to 3.

FIG. 7 shows a display in a viewfinder of a photographic camera employing the automatic focus control device. In FIG. 7, focus detection of objects in three focus detecting regions A, B and C disposed at a central portion of a photographing field S and shown by the solid lines can be performed. Rectangular frames shown by the broken lines are displayed by liquid crystal display elements so as to inform the photographer of focus detecting zones and are placed at a position of a focusing screen (not shown). Display of the focus detecting zone can be changed over between an automatic focusing (AF) mode for driving the photo-taking lens a to an in-focus position and a focus aid (FA) mode for performing only focus detection without driving the photo-taking lens. The large frame is displayed in the AF mode, while the small frame is displayed in the FA mode as will be described in detail later. Display lamps La, Lb and Lc disposed outside the photographing field S indicate states of focus condition. Namely, the display lamp Lb is turned on at the time of an in-focus state in which an image of an object is formed on the predetermined focal plane b. The display lamp La is turned on at the time of a front focus state in which the image of the object is formed forwardly of the predetermined focal plane, while the display lamp Lc is turned on at the time of a rear focus state in which the image of the object is formed rearwardly of the predetermined focal plane. At the time when focus detection is impossible, both of the display lamps La and Lc are blinked.

FIG. 8a shows a light receiving portion of the CCD employed in the device. It should be noted that the CCD is construed as including the light receiving portion, an accumulation portion and a transfer portion. Each of the regions A, B and C of FIG. 7 is provided with a standard portion and a reference portion. In the regions A, B and C, each of monitoring photo-sensors MA, MB and MC for controlling an integration time period of the accumulation portion of the CCD is provided at one side of the standard portion. In the region A, the number X of pixels in the standard portion is 44 and the number Y of pixels in the reference portion is 52. In the region B, the numbers X and Y are 34 and 44, respectively, while in the region C, the numbers X and Y are 34 and 44, respectively. These pixels are all formed on one chip.

In the device, the standard portion of each of the three regions A, B and C is divided into a plurality of segments and the divided standard portion and the reference portion are wholly compared with each other so as to perform focus detection. In each of the regions A, B and C, in order to focus an object most approximate to the photographic camera, data indicative of the most rear focus state is utilized as focus detection data of each of the regions A, B and C from among results of focus detection through division of the standard portion. Furthermore, data indicative of the most rear focus state is employed as focus detection data of the photographic camera from among the focus detection data of the regions A, B and C.

Figure 9:
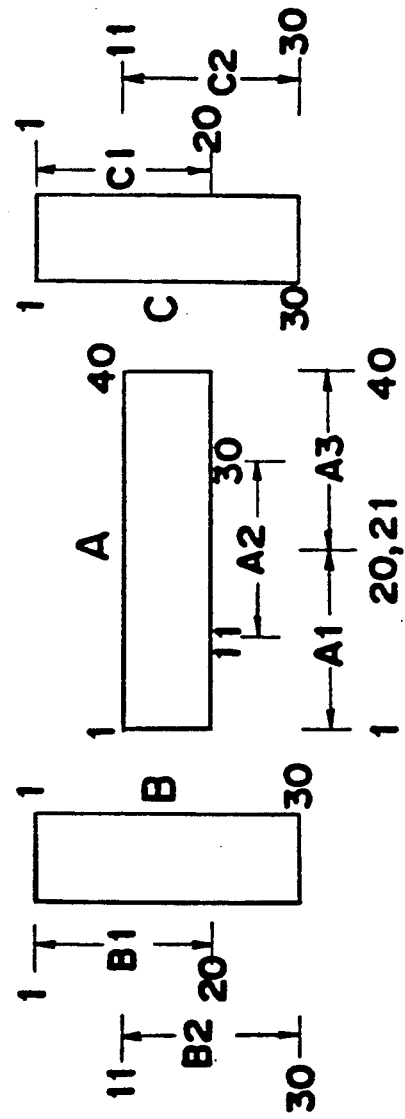
FIG. 9 is a view explanatory of divided areas of standard portions of the CCD chip of FIGS. 8a and 8b.

Ranges of the division and defocus ranges of the divided regions are described with reference to FIGS. 8b, 9 and 10. FIG. 9 shows, on an enlarged scale, the focus detecting regions A, B and C of FIG. 7. In FIG. 9, the focus detecting regions A, B and C occupy areas of the respective standard portions shown in FIG. 8a. In FIG. 9, each of the numerals shown in each of the regions A, B and C indicates the number of differences in which difference data are taken every four pixels of the CCD of FIG. 8a. The difference data can also be taken every three pixels or every other pixel, but in that case, the numerals are different from that of FIG. 9. Therefore, in the region A, the number X of pixels in the standard region is 40 and the number Y of pixels in the reference region is 48. In the regions B and C, the numbers X and Y are 30 and 44, respectively. The region A is rightwards divided into three segments A1 ranging from 1 to 20, A2 ranging from 11 to 30 and A3 ranging from 21 to 40. The region B is downwardly divided into two segments B1 ranging from 1 to 20 and B2 ranging from 11 to 30. Likewise, the region C is downwardly divided into two segments C1 ranging from 1 to 20 and C2 ranging from 11 to 30.

In this focus detecting method of phase difference, if the distance between the image of the standard portion and the image of the reference portion, in the case where the image of the standard portion and the image of the reference portion coincide with each other, is larger than, equal to and smaller than a predetermined number, a focusing state is detected as the rear focus state, the in-focus state and the front focus state, respectively. Therefore, the defocus range in each of the segments is allotted to the rear focus side as the defocus range is further spaced from an optical center of each of the segments. More specifically, FIG. 8b, in which the difference data have been taken, shows the standard portion and the reference portion of the region A. The defocus range of the segment A2 is described. The in-focus state is detected when an image of a segment A2' of the reference portion ranging from 15 to 34 counted from the left end of the reference portion coincides with the image of the segment A2. When coincidence of the images takes place leftwards of the segment A' in the reference portion, the front focus state is detected. At this time, a maximum number of deviation data (referred to as "deviation pitch", hereinbelow) of the front focus state is 14. On the contrary, when coincidence of the images takes place rightwards of the segment A2' in the reference portion, the rear focus state is detected and a maximum deviation pitch of the rear focus state is 14.

Figure 10:
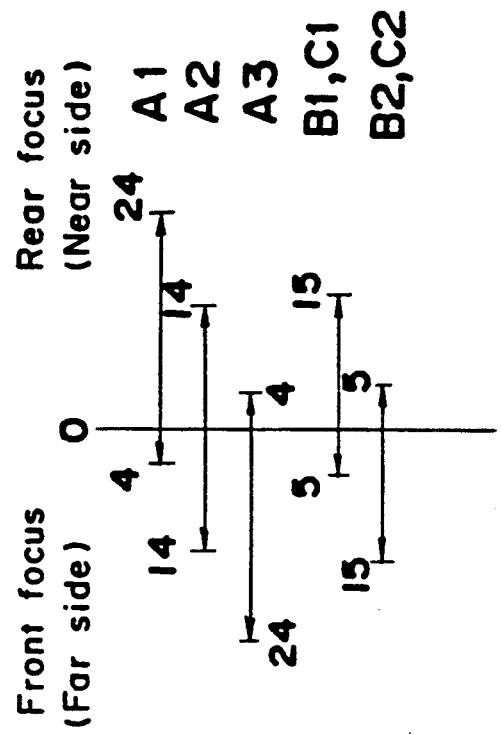
FIG. 10 is a view explanatory of amounts of shift in the divided areas of FIG. 9.

The foregoing applies to the defocus ranges in other segments likewise as shown in FIG. 10. In the segment A1, the maximum deviation pitch of the front focus state is 4 and the maximum deviation pitch of the rear focus state is 24. In the segment A3, the maximum deviation pitch of the front focus state is 24 and the maximum deviation pitch of the rear focus state is 4. In the regions B and C, a maximum deviation pitch of the front focus state and a maximum deviation pitch of the rear focus state in the segments B1 and C1 are 5 and 15, respectively, while a maximum deviation pitch of the front focus state and a maximum deviation pitch of the rear focus state in the segments B2 and C2 are 15 and 5, respectively.

Figure 12:
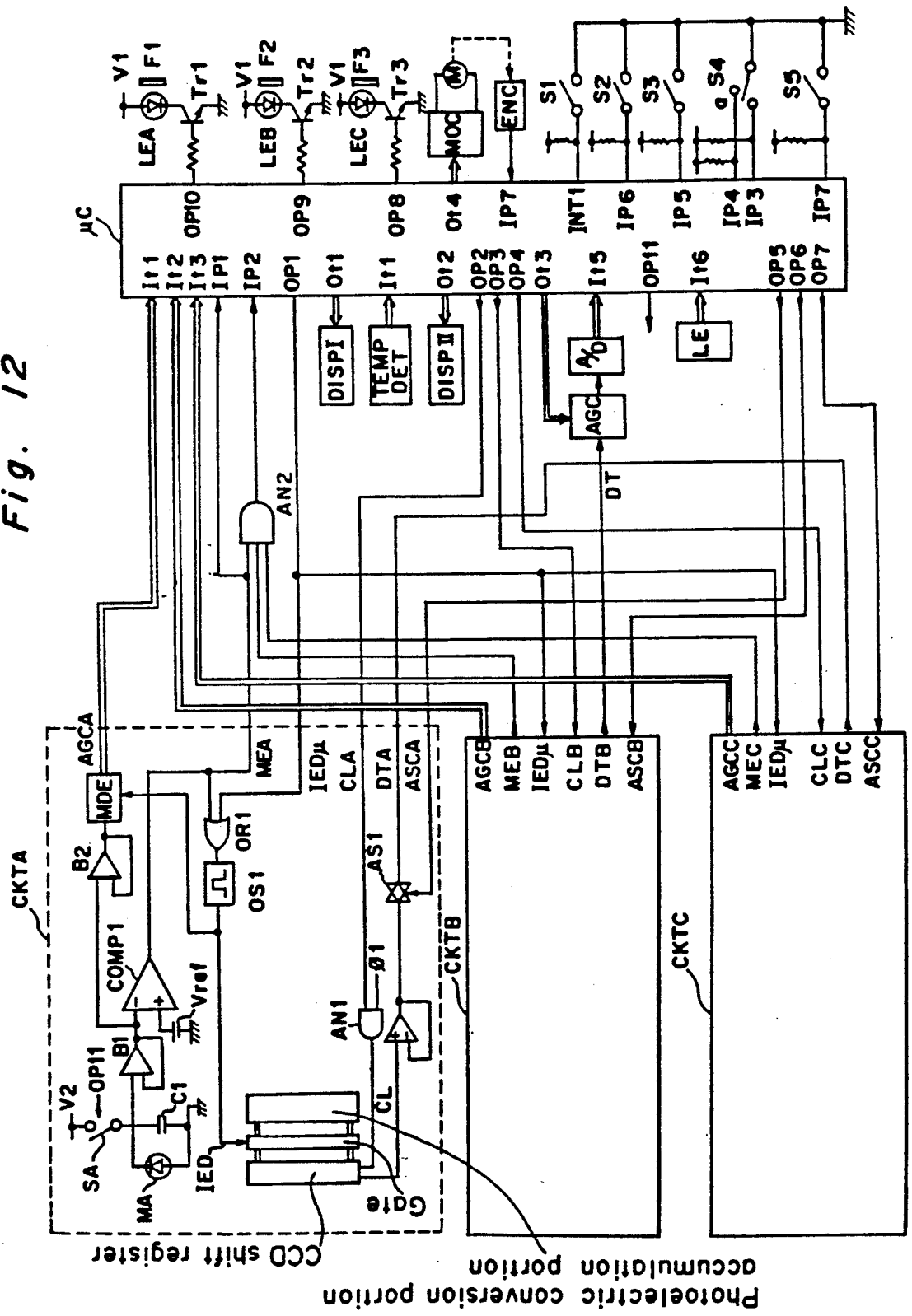
FIG. 12 is a circuit diagram of a control circuit employed in the automatic focus control device of FIGS. 1 to 3.

FIG. 12 shows a control circuit for focus detection and focus control employed in the device. The circuit includes a microcomputer $\mu C$ for performing arithmetic operation and control required for focus detection and focus control, a display portion DISPI for displaying the focus detecting zones of the photographing field S in the display of the viewfinder of FIG. 7, a display portion DISPII for displaying a focusing state outside the photographing field S in the display of the viewfinder of FIG. 7, a temperature detecting device TEMPDET for measuring temperature by using a temperature detecting element, for example, a thermistor disposed adjacent to the reimaging lenses d1, d2 and d3, a motor controller MOC for controlling a motor M used for focusing, an encoder ENC for detecting rotation of the motor M, a circuit LE provided in an interchangeable lens (not shown) and storing data required for focusing, light emitting diodes LEA, LEB and LEC for irradiating near infrared light over the regions A, B and C of FIG. 7, respectively, if it is too dark to perform focus detection due to use of only ambient light, filters F1, F2 and F3 for forming specific patterns on an object and transistors TR1, TR2 and TR3 for driving the light emitting diodes LEA, LEB and LEC, respectively. The filter F1 has a random pattern of vertical stripes, while the filters F2 and F3 have random patterns of horizontal stripes.

Then, control circuits CKTA, CKTB and CKTC of the CCDs used for focus detection are described. Each of the control circuits CKTA, CKTB and CKTC corresponds to a combination of the standard portion and the reference portion of the CCD of each of the regions A, B and C and has an identical configuration. Therefore, only the control circuit CKTA is described in detail and description of the control circuits CKTB and CKTC is abbreviated for the sake of brevity. Meanwhile, signal lines connected to the microcomputer $\mu C$ are described with reference to all the control circuits CKTA, CKTB and CKTC.

In control of the CCD, the light receiving portion and the integration time period of the accumulation portion are initially described. The circuit CKTA includes the monitoring photo-sensor MA referred to earlier, a capacitor C1 for integration, and a switch SA for controlling integration. When the switch SA has been turned on in response to an integration start signal of one shot from the microcomputer $\mu C$ and then, turned off, integration is started. The circuit CKTA further includes a buffer B1 for buffering a voltage of the capacitor C1, a comparator COMP1 for outputting an integration completion signal by comparing an integrated voltage with a reference voltage Vref and an OR circuit OR1 for outputting a signal to a one-shot circuit OS1 in response to the integration completion signal from the comparator COMP1 or the microcomputer μC. The one-shot circuit OS1 outputs a one-shot signal IED to a gate for transferring data of the accumulation portion of the CCD to a CCD shift register so as to complete integration. Furthermore, the circuit CKTA includes a buffer B2 for buffering the voltage of the capacitor C1 obtained through the buffer B1 and a monitor data formulating circuit MDE which receives the voltage signal from the buffer B2 so as to formulate AGC (automatic gain control) digital data for determining an amplification factor of the signal of the shift register in accordance with the voltage signal from the buffer B2 and latches the data in response to the one-shot signal from the one-shot circuit OS1. Meanwhile, each of the photo-sensors of the CCD has the same configuration as that of the monitoring photo-sensor MA, the capacitor C1 and the switch SA and its integration is started by a signal from a terminal OP11 of the microcomputer μC.

Then, operation of inputting to the microcomputer μC the data transferred to the CCD shift register is described. The data transferred to the CCD shift register is held in the shift register until a clock φ1 transmitted through an AND circuit AN1 is inputted to the CCD shift register. When the clock φ1 has been inputted to the CCD shift register, the data of the CCD shift register is sequentially outputted therefrom synchronously with the clock φ1 so as to be inputted, through an analog switch AS1 controlled by a signal from the microcomputer μC, to a gain control circuit AGC for controlling gain. The gain control circuit AGC is used for causing an analog signal outputted from the shift register to be equal to or greater than a predetermined value. Only values of ×2, ×4 and ×8 are used as the gain. The gain is determined by a signal from an output terminal Ot3 of the microcomputer μC. The data subjected to gain control of the gain control circuit AGC is converted into digital data by an A/D converter A/D and the digital data is inputted to the microcomputer μC. An AND circuit AN2 receives the signal of the comparator COMP1 and signals of comparators (not shown) of the circuits CKTB and CKTC and outputs to the microcomputer μC an integration completion signal indicating that integration of all the CCDs has been completed.

Then, switches S1 to S5 are described. The switch S1 is a normally open switch to be turned on upon depression of a shutter release button (not shown) through a first stroke and focus detection to be described later is started upon turning on of the switch S1. The switch S2 is a mode changeover switch for effecting changeover between the AF mode and the FA mode. When the switch S2 is in the ON state and the OFF state, the device is set to the AF mode and the FA mode, respectively. The switch S3 is a detection switch to be turned on when the lens has reached the respective stroke ends during forward and rearward drive of the lens. The switch S4 detects whether or not the camera body is held at the vertical position and whether the camera body is held at a vertical "a" position or a vertical "b" position. When the region B is disposed at a lower side in the display of the viewfinder of FIG. 7, the switch S4 is turned on at a contact a. On the other hand, when the region C is disposed at the lower side in the display in the viewfinder of FIG. 7, the switch S4 is turned on at a contact b.

Figure 11:
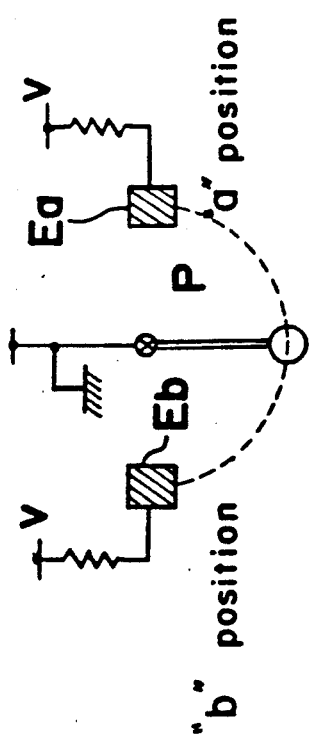
FIG. 11 is a schematic view of a position detecting device employed in the automatic focus control device of FIGS. 1 to 3.

A configuration of the switch S4 is described with reference to FIG. 11. The switch S4 includes a kind of pendulum P made of a conductor. The pendulum P has a weight attached to its lower end and is grounded at the other end. The pendulum P is required to be frictionally supported so as not to be swung unnecessarily. Electrodes Ea and Eb shown by hatching ar normally set to the high level through a resistor by a power source V, but are set to the low level when the pendulum P has been brought into contact with the electrodes Ea and Eb, respectively.

Referring back to FIG. 12, the switch S5 is a mode changeover switch for effecting changeover between a continuous AF mode in which focusing is continued through follow of motion of an object after the object has been focused and a one-shot AF mode in which focusing is terminated once a target object has been focused. When the switch S5 is in the ON state, the device is set to the continuous AF mode.

Figure 13A:
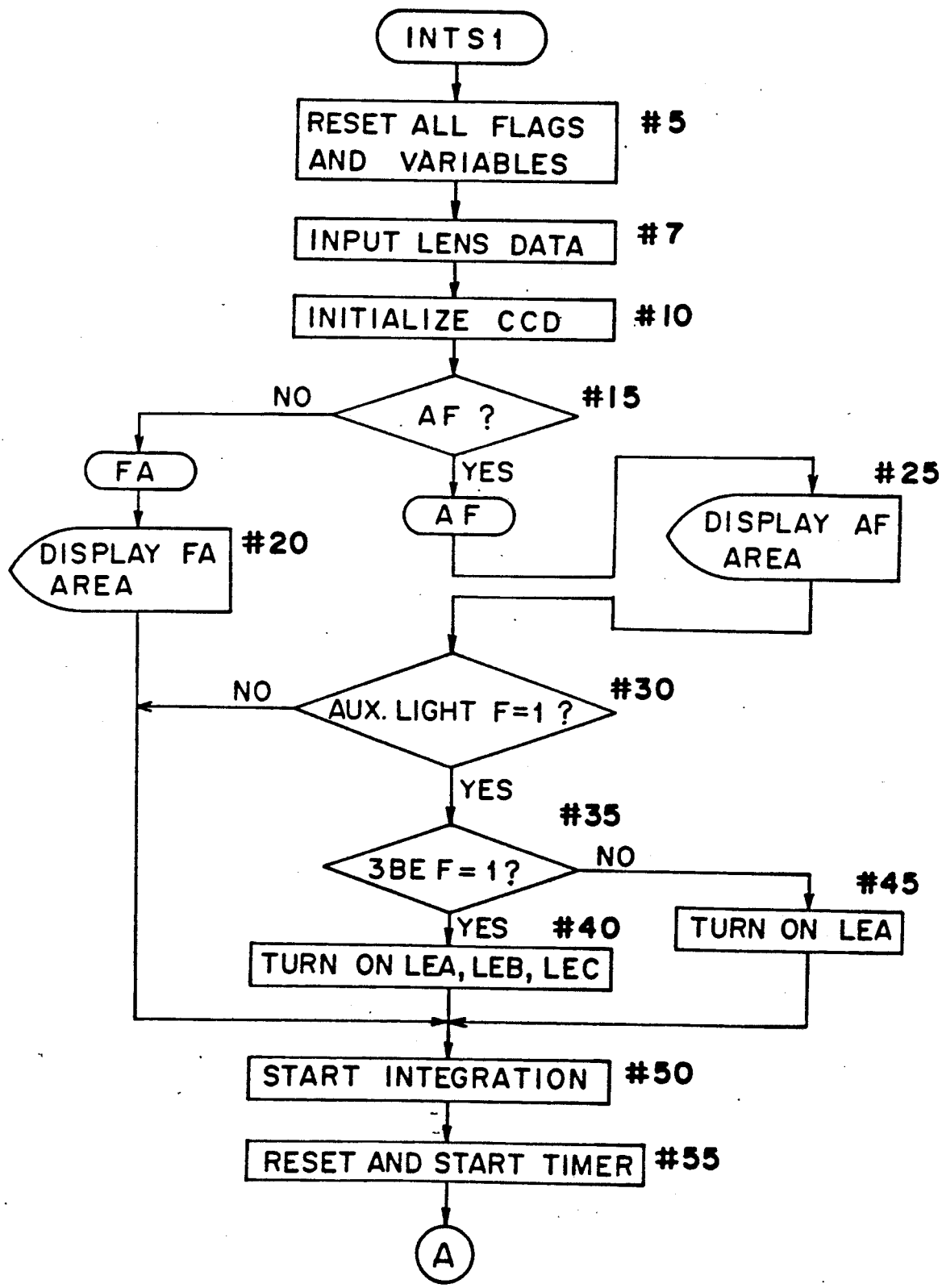
FIGS. 13 to 28 are flow charts showing operation of the automatic focus control device of FIGS. 1 to 3.
Figure 13B:
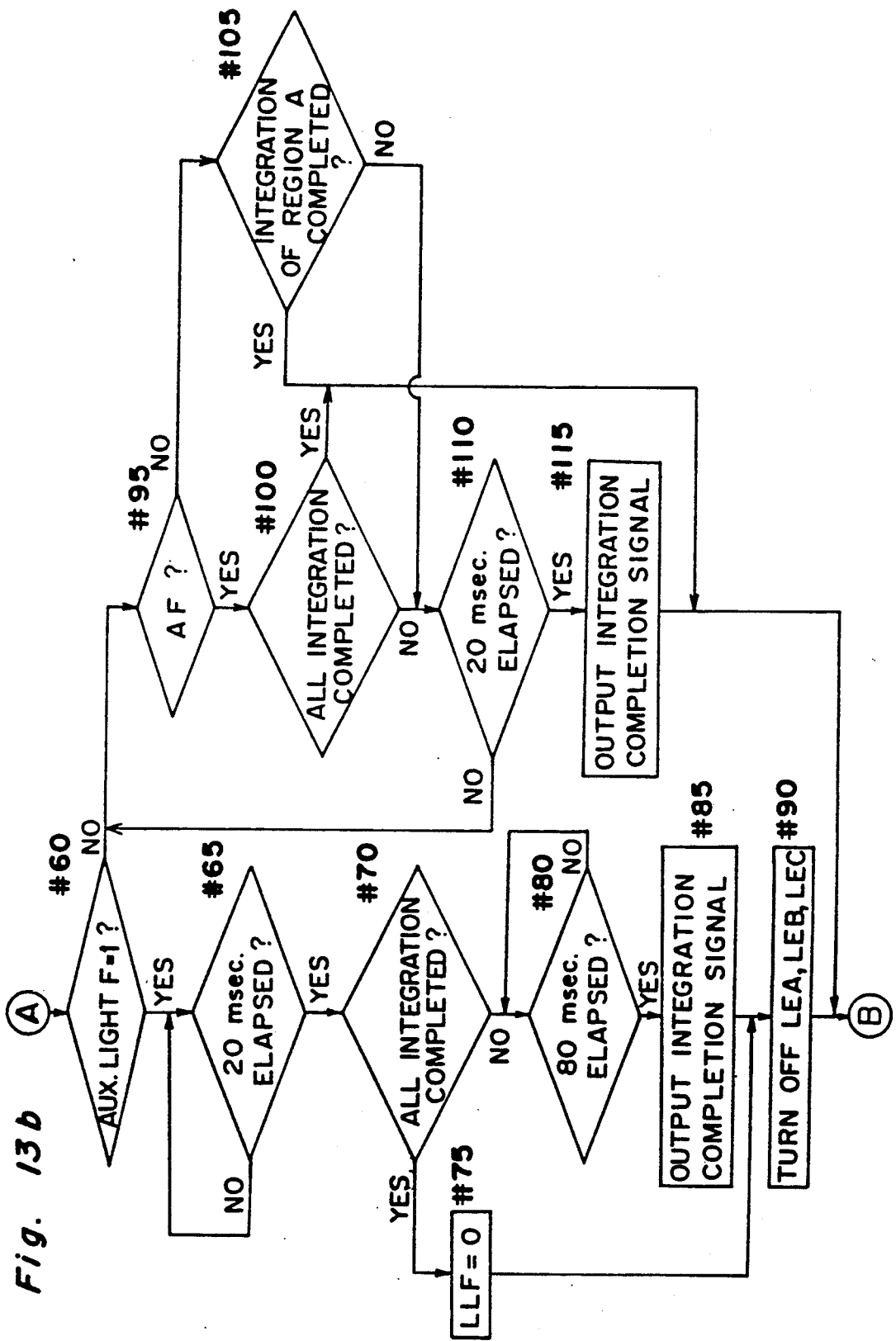
Figure 13C:
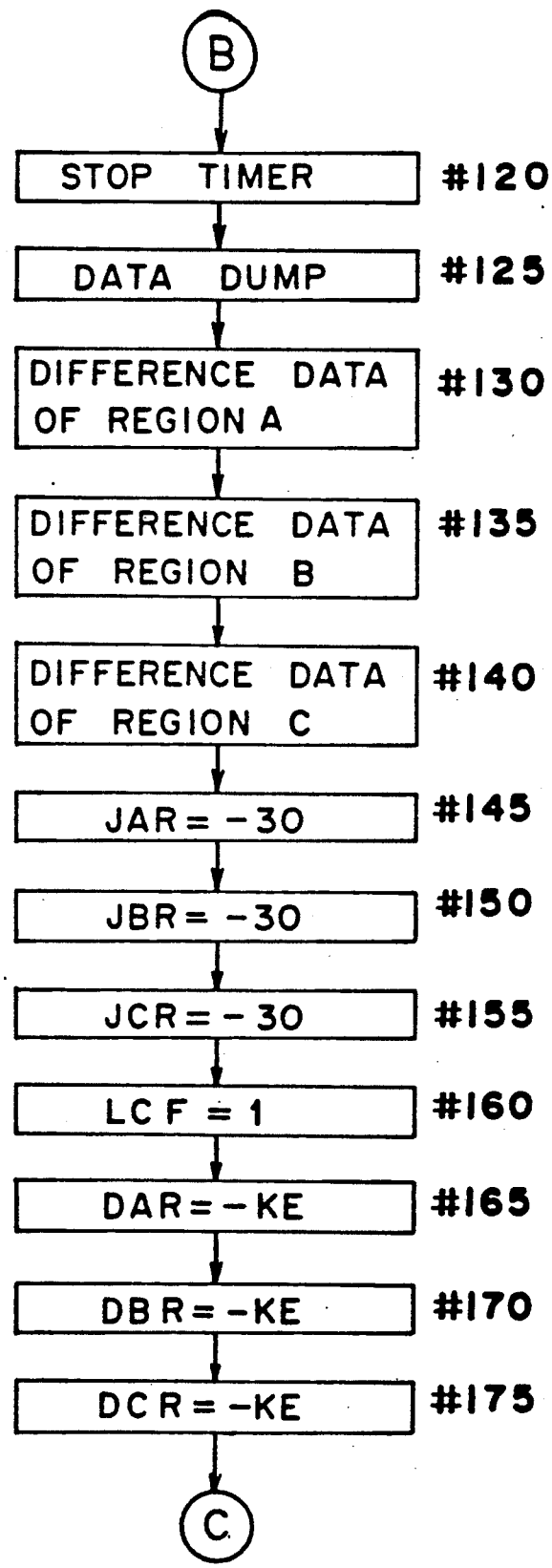

Operation of the device of the above described arrangement is described with reference to flow charts of FIGS. 13 to 28, hereinbelow. When the switch S1 is turned on, a signal changing from the high level to the low level is inputted to an interruption input terminal INT1 of the microcomputer μC and thus, an interruption processing INTS1 shown in FIG. 13 comprising FIGS. 13a to 13c is executed. Initially, at step #5, the microcomputer μC resets all flags and variables to be used and then, receives from the circuit LE a conversion coefficient for converting a defocus amount into the number of revolutions of the motor at step #7. Then, in order to eliminate electric charge accumulated in the CCD shift register acting as the accumulation portion and the transfer portion of the CCD before operation of the microcomputer μC, electric charge accumulated in the transfer portion is transferred by setting all of output terminals OP2, OP3 and OP4 to the high level at step #10 (referred to as "CCD initialization", hereinbelow). Meanwhile, although the clock φ1 is not shown, the clock φ1 is operated without stop after the program has entered this flow of interruption.

Then, at step #15, the microcomputer μC decides from a level of a signal of an input terminal IP6 whether or not the AF mode is employed. In the case of "YES" at step #15, the program flow proceeds to step #25 at which a signal for displaying the focus detecting zone of the AF mode of FIG. 7 is outputted from an output terminal Ot1 to the display portion DISPI, and then, step #30 follows. In the case of "NO" at step #15, namely when the FA mode is employed, a signal for displaying the focus detecting zone of the FA mode of FIG. 7 is outputted from the output terminal Ot1 to the display portion DISPI and then, step #50 follows.

The focus detecting zone is changed between the AF mode and the FA mode, especially the focus detecting zone is restricted to the central portion of the photographing field in the FA mode for the following reason. Generally, in case the FA mode is employed, the photographer focuses a specific object in the photographing field while viewing the viewfinder. In this case, if the focus detecting zone is set to a wide visual field in the FA mode, a focus detection value deviates by objects other than a target object to be photographed, which objects are contained in the photographing field. Such a phenomenon is likely to take place as the focus detecting zone becomes wider. This trend becomes more conspicuous when focus detection of a plurality of the regions is performed as in this embodiment. For example, in this embodiment, when a relatively near object exists in the region B or C although a relatively far object of the region A is required to be focused, focus detection data of the near object is displayed. Therefore, in order to prevent such a phenomenon, the focus detecting zone of the FA mode is restricted to the region A but may also be further restricted to the segment A2 into which the region A is divided. In this case, the focus detecting zone to be displayed is also reduced in size accordingly. On the other hand, in the AF mode, the above described problem still arises that the relatively near object in the region B or C is focused when the object in the region A is required to be focused. However, the AF mode has such an advantage that since focus detection can be performed in a wide range, it becomes possible to select a photographic composition freely.

Referring back to FIG. 13a, in the AF mode, the focus detecting zone of the AF mode is displayed at step #25 and then, the microcomputer μC decides at step #30 whether or not an auxiliary light flag for emitting auxiliary light when focus detection is impossible due to darkness is set. In the case of "NO" at step #30, the program flow proceeds to step #50. On the contrary, in the case of "YES" at step #30, the program flow proceeds to steps #35 and so on so as to emit auxiliary light. In this embodiment, auxiliary light is emitted in two ways. In one way, three auxiliary light beams for the respective focus detecting regions A, B and C are emitted in a state where the lens is at a stop. In the other way, when focus detection is still impossible although three auxiliary light beams are emitted, only the auxiliary light beam corresponding to the region A is emitted, while the lens is being driven, at a predetermined timing so as to search for an object enabling focus detection. The reason for performing two different ways of control of emitting auxiliary light is as follows. Namely, in a device having n electric battery acting as its power source as in the case of a photographic camera, if as many as three auxiliary light beams are emitted while the motor for driving the lens is being driven, electric charge of about 50 to 100 mA is consumed per light emitting diode, so that it is a large load to the battery and thus, voltage of the battery drops, thereby possibly resulting in malfunctioning of the electric circuit. In focus detection requiring high accuracy, not malfunctioning but deviation of detection data is apt to occur due to voltage change or voltage drop, thereby adversely affecting detection accuracy. Also, in the case where a light measuring circuit is provided, luminance data of the light measuring circuit is apt to deviate. In order to reduce the malfunctioning and deviation in data, when the lens is driven, only the auxiliary light beam corresponding to the region A is emitted, which also serves to reduce consumption of electric charge.

At step #35 of FIG. 13a, a decision is made as to whether or not a flag 3BEF indicating emission of three auxiliary light beams, which is set at the time of stop of drive of the lens and is reset at the time of start of drive of the lens, is set. In the case of "YES" at step #35, output terminals OP8, OP9 and OP10 are set to the high level such that the auxiliary light beams are emitted by the three light emitting diodes LEA, LEB and LEC at step #40. On the other hand, in the case of "NO" at step #35, only the output terminal OP10 is set to the high level such that the light emitting diode LEA corresponding to the region A is turned on at step #45. Both steps #35 and #45 are followed by step #50.

At step #50, the microcomputer μC outputs a one-shot signal from the output terminal OP11 so as to start integration of the CCD. Subsequently, a timer for counting a time period for integration is reset and started at step #55 and then, a decision is made at step #60 as to whether or not the auxiliary light flag is set. When it is found at step #60 that the auxiliary light flag is not set, namely, auxiliary light is not emitted, the program flow proceeds to step #95 at which a decision is made, on the basis of the level of the signal of the input terminal IP6, as to whether or not the AF mode is employed. In the case of "YES" at step #95, the program flow proceeds to step #100 at which a decision is made as to whether or not a signal indicating that integration of all the regions has been completed has been inputted from the AND circuit AN2 to the microcomputer μC. In the case of "NO" at step #100, a decision is made at step #110 as to whether or not 20 msec. have elapsed. In the case of "NO" at step #110, the program flow returns to step #95 so as to continue integration. In the case of "YES" at step #110, a high-level signal is outputted form the output terminal OP1 at step #115 so as to complete integration of all the regions and then, step #120 follows. Meanwhile, in the case of "YES" at step #100, the program flow proceeds to step #120 so as to perform calculation of focus detection. In the case of "NO" at step #95, the microcomputer μC decides at step #105, on the basis of a level of a signal of the input terminal IP1, whether or not integration of the region A has been completed. In the case of "YES" at step #105, the program flow proceeds to step #120. On the other hand, in the case of "NO" at step #100, the program flow proceeds to step #110 so as to perform the same control as described above.

Meanwhile, when auxiliary light has been emitted, the auxiliary light flag is set at step #60 and then, the program flow proceeds to step #65 at which a decision is made as to whether or not 20 msec. have elapsed. In the case of "YES" at step #65, a decision is made at step #70 from the input terminal IP2 as to whether or not integration of all the regions has been completed. The reason for making a decision, even after emission of auxiliary light, as to whether or not integration of all the regions has been completed in 20 msec. is as follows. In this embodiment, the continuous AF mode using auxiliary light is employed. Therefore, when the AF mode is employed by following a moving object, its photographic scene changes and in some cases, a portion of the photographic scene, which has been dark initially, becomes bright, thereby resulting in no need for emission of auxiliary light. If auxiliary light is emitted at this time, power consumption is wasted. Hence, the above described decision is made in order to eliminate such wasteful power consumption.

Thus, in the case of "YES" at step #70, a flag LLF indicative of darkness is reset at step #75 and then, step #90 follows. Meanwhile, in the case of "NO" at step #70, a decision is made at step #80 as to whether or not 80 msec. have elapsed. Upon lapse of 80 msec., the integration completion signal is outputted from the output terminal OP1 at step #85 so as to complete integration and then, at step #90, the output terminals OP8, OP9 and OP10 are set to the low level and a signal for stopping emission of auxiliary light is outputted so as to stop emission of auxiliary light. It is to be noted that integration of all the regions may be completed during a period between 20 msec. and 80 msec.

Then, the microcomputer μC stops the above described timer at step #120 and effects data dump at step #125. A subroutine of this data dump is described with reference to FIG. 25. Initially, in order to cause an output of analog data of the region A to be equal to or greater than a predetermined value, AGCA data is inputted from the circuit MDE to the microcomputer μC through the input terminal It1 at step #3000 and then, is outputted from the output terminal Ot3 to the gain control circuit AGC at step #3005. Then, in order to input data from the transfer portion of the region A to the microcomputer μC, the microcomputer μC sets the terminals OP5 and OP2 to the high level so as to turn on the analog switch AS1 and set the AND circuit AN1 to a state enabling pass of a signal at steps #3010 and #3015, respectively. Thereafter, at step #3020, the microcomputer μC starts input of data of the region A. When input of the necessary number of the data of the region A has been completed at step #3025, input of the data of the region A is stopped at step #3030 and then, the terminals OP2 and OP5 are set to the low level so as to set the AND circuit AN1 to a state preventing pass of a signal and turn off the analog switch AS1 at steps #3035 and #3040, respectively. Subsequently, the same processing as described above is performed for the regions B and C. Since control signals and input and output data of the regions B and C are different from those of the region A but the same processing as in the region A is performed in the regions B and C at steps #3045 to #3125, description thereof is abbreviated for the sake of brevity. When data input of the regions B and C has been completed, the program flow returns.

Referring back to FIG. 13c, after completion of data input of all the regions, difference data taken every four pixels in both the standard portion and the reference portion of each of the regions A, B and C are calculated and stored at steps #130 to #140. Meanwhile, data other than the difference data are separately stored. At steps #145 to #155, −30 is substituted for registers JAR, JBR and JCR for storing the numbers of shift in the regions A, B and C. In this value of −30, sign "−" indicates the front focus side, while numeral "30" is a value nonexistent in this control device and is used for measuring a distance of a far object.

Then, at step #160, the flag LCF indicating the focus detection is impossible is set. When focus detection is possible at the time of focus detection to be described later, this flag LCF is reset. Thereafter, at steps #165 to #175, the microcomputer μC stores a value of −KE in registers DAR, DBR and DCR for storing defocus amounts of the regions A, B and C, respectively. The value of −KE indicates a numeral of the front focus side nonexistent in this control device and is used for detecting an object most proximate to the photographic camera as will be described in detail later.

Figure 14A:
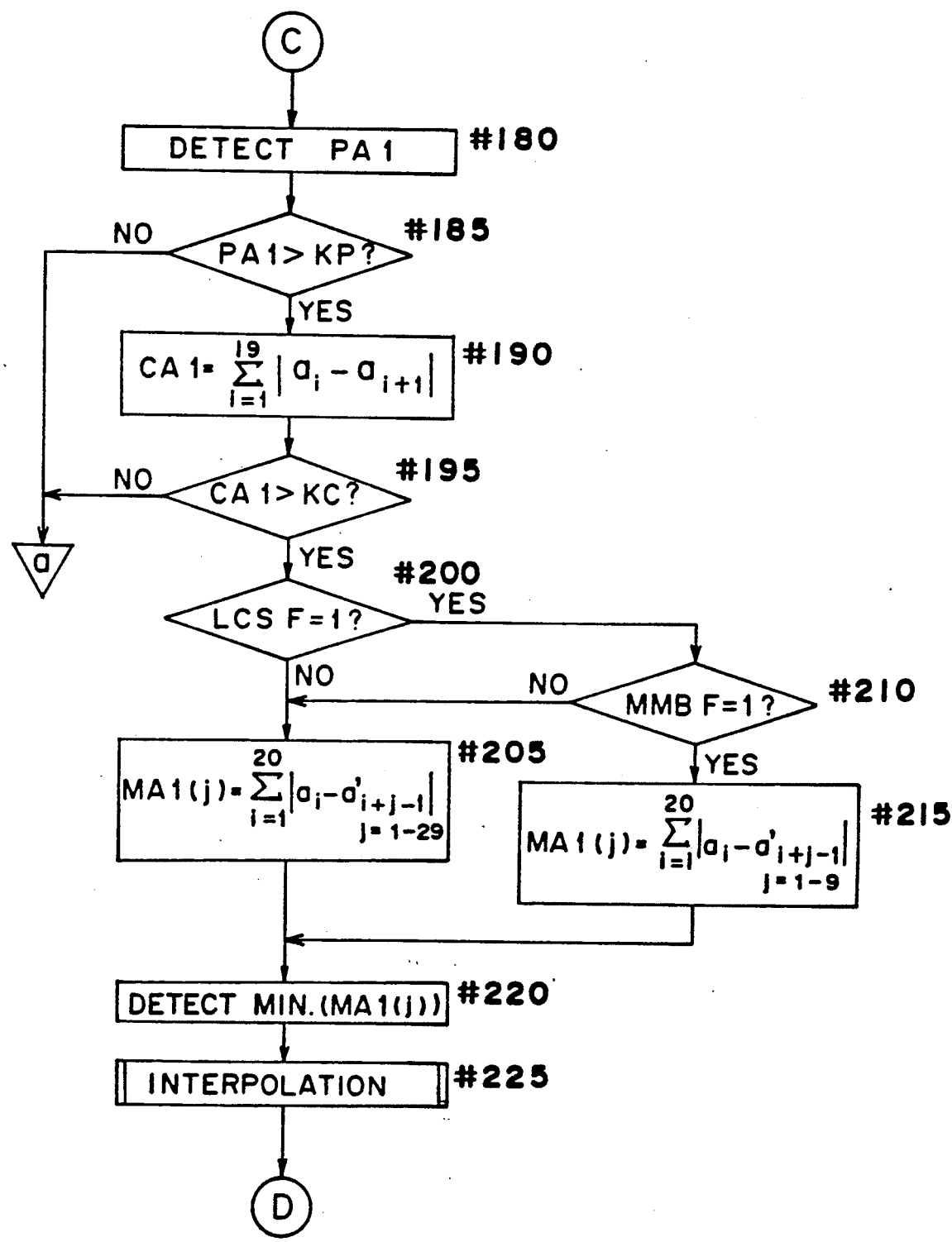
Figure 14B:
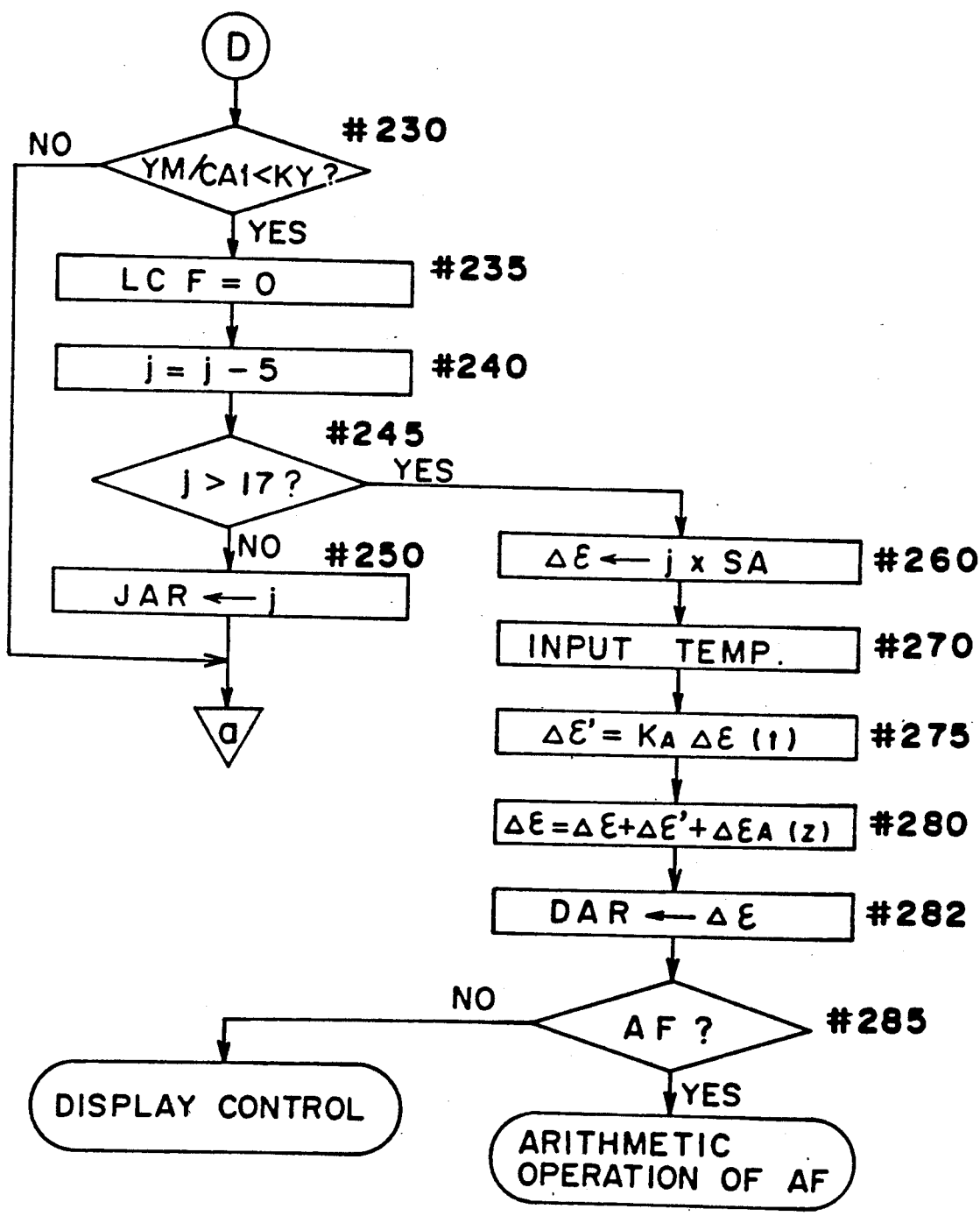

Subsequently, the program flow proceeds to the processing of FIG. 14 comprising FIGS. 14a and 14b for performing calculation of focus detection of the region A. Initially, calculation of focus detection of the segment A1 of the region A of FIG. 9 is performed. At step #180, the microcomputer μC detects a peak value PA1 from raw data (data in which difference data have not been taken) of the segment A1. Then, the microcomputer μC decides at step #185 whether or not the peak value PA1 is greater than a predetermined value KP. In the case of "YES" at step #185, the peak value PA1 is used as reliable data for focus detection and the program flow proceeds to step #190 at which a contrast CA1 of the standard portion of the segment A1 is obtained by the following equation.

$$CA1 = \sum_{i=1}^{19} |a_i - a_{i+1}|$$

In the above equation, character "a" denotes difference data of the standard portion and character "i" denotes order of pixels counted from the left of the difference data. Then, at step #195, a decision is made as to whether or not the contrast CA1 is greater than a predetermined value KC, namely the contrast is sufficient for focus detection. In the case of "YES" at step #195, the contrast CA1 is used as data sufficient for focus detection and the program flow proceeds to step #200.

At step #200, a decision is made as to whether or not a mode, in which focus detection is impossible and a region enabling focus detection is searched for by driving the lens (referred to as "low-contrast search mode", hereinbelow), is employed. When the low-contrast search mode is not employed, namely, a low-contrast search flag LCSF is not set, correlation calculation is performed at step #205 by using the following equation.

$$MA1(j) = \sum_{i=1}^{20} |a_i - a'_{i+j-1}|$$

$$j = 1\text{-}29$$

In the above equation, character "a" denotes difference data of the standard portion, character "a'"0 denotes difference data of the reference portion, character "i" denotes order of pixels counted from the left of the difference data and character "j" denotes the number of shift in the reference portion. If it is found at step #200 that the low-contrast search mode is employed, the program flow proceeds to step #210 at which a direction of travel of the lens is decided. When a flag MMBF indicating a direction of rearward drive of the lens is not set, namely, a direction of forward drive of the lens is employed, the program flow proceeds to step #205 at which the above described correlation calculation is performed. On the contrary, when the flag MMBF is set, namely the direction of rearward drive of the lens is employed, the program flow proceeds to step #215 at which correlation calculation is performed. The correlation calculation of step #215 is different from that of step #205 in the number j of shift for the following reason.

As shown in FIG. 10, respective defocus ranges (deviation pitch amounts) of the segments A1, A2 and A3 relative to the in-focus point are different from each other. For example, in the segment A1, the defocus ranges are 4 pitches at the front focus side and 24 pitches at the rear focus side. When the above described low-contrast search mode is employed in such a case, the lens is initially advanced at the time of forward drive of the lens, namely, the lens is advanced so as to search for an object disposed at the rear focus side, i.e., adjacent to the photographic camera. Therefore, if an object is disposed at the rear focus side, the object can be detected, so that the reference portion is required to be shifted over a whole range. During low-contrast search, j=1-4 is disposed at the front focus side and therefore, is not necessarily required to be used. However, since the object may be detected due to change of the object and change of ambient light, 4 pitches or so are provided for the range of correlation calculation. On the other hand, in the case of low-contrast search at the time of rearward drive of the lens, the lens is retracted so as to search for an object disposed at the front focus side, i.e., far away from the photographic camera. Thus, it will proper to perform correlation calculation with respect to the reference portion allotted to the front focus side. Therefore, in this case, j=5 is obtained in the in-focus state, so that the necessary shift amount is 1-4. However, by adding 4 pitches of 6-9 for allowance on the same ground as described above, shift of 9 pitches is performed, so that calculation time at the time of time-consuming low-contrast search is reduced as much as possible and a time interval of calculation of focus detection is decreased, thereby improving detection efficiency.

Referring back to FIG. 14, when the correlation calculation has been completed, the microcomputer μC obtains, at step #220, a minimum correlation value (maximum correlation degree) from among the correlation values obtained by the shift. In order to obtain a real minimum value from this discrete correlation value, interpolation calculation is performed at step #225.

Figure 26:
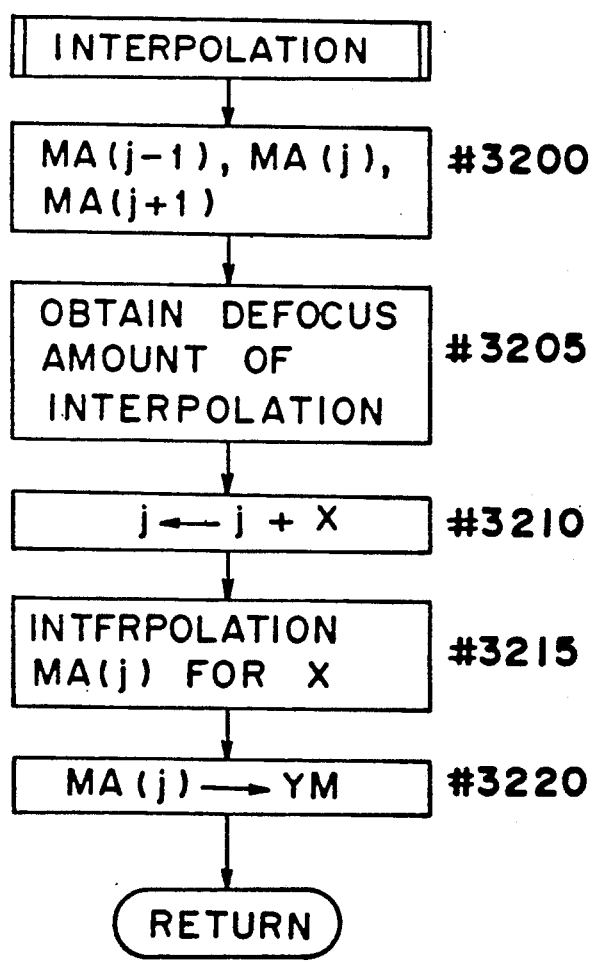

A subroutine of this interpolation calculation is described with reference to FIG. 26. Let a minimum value of obtained MA1(j), a value of MA1(j−1) preceding the minimum MA1(j) and a value of MA1(j+1) following the minimum MA1(j) be MA(j), MA(j−1) and MA(j+1), respectively, the values MA(j), MA(j−1) and MA(j+1) are obtained at step #3200. By using the values MA(j), MA(j−1) and MA(j+1), a correction value X of the shift amount j is obtained at step #3205. Then, a real shift amount is obtained at step #3210 by adding the correction value X to the shift amount j. Since the interpolation calculation itself is not subject matter of the present invention, description thereof is abbreviated for the sake of brevity. From the real shift amount j obtained by the interpolation calculation, a minimum correlation value MA(j) at this time is obtained at step #3215 and then, is set as YM at step #3220. Then, the program flow returns.

Referring back to FIG. 14, YM thus obtained is normalized by the contrast CA1 and a decision is made at step #230 as to whether or not the normalized value of (YM/CA1) is less than a predetermined value KY. In the case of "YES" at step #230, the normalized value of (YM/CA1) is regarded as reliable data. Hence, it is considered that focus detection is possible and thus, the low-contrast flag LCF is reset at step #235. Then, at step #240, by subtracting 5 (number of shift in the in-focus state) from the shift amount j, a rear focus amount from the in-focus position is obtained. Then, a decision is made at step #245 as to whether or not the obtained shift amount j is greater than 17. The decision of step #245 is made for the following reason. Namely, in this embodiment, it is so arranged that focusing is performed in one of the detected areas (the regions A, B and C and their segments), which is most proximate to the photographic camera. As will be seen from FIG. 15, if the rear focus side of the segment A1 exceeds 15, the segment A1 has a maximum rear focus state as compared with other segments. Therefore, it is useless to perform calculation in other segments and thus, the decision of the shift amount j is made at step #245. At step #245, the shift amount j is compared with 17 but may be actually compared with 15 as is understood from the foregoing. The shift amount j is compared with 17 at step #245 in view of scatter of the shift amount j and therefore, may be compared with 16 or so.

In the case of "YES" at step #245, a defocus amount SA per pitch of the region A is multiplied by the shift amount j so as to obtain a defocus amount Δε at step #260. The defocus amount SA per pitch of the region A is a constant changeable in each of the regions according to the optical system and positioning. Therefore, this constant is given to each photographic camera and may be stored in, for example, an E²PROM (electrically erasable and programmable ROM). Then, at step #270, a detected temperature is inputted from the temperature detecting device TEMPDET to the microcomputer μC. A standard defocus correction amount Δε(t) for change of a focus detecting optical system by temperature is obtained from a memory table (not shown). Furthermore, since change of the defocus amount is different for each of the regions, a coefficient $K_A$ corresponding to the region A is read from the memory table and is multiplied with the standard defocus correction value Δε(t) such that a defocus correction amount Δε' corrected by the temperature t is obtained at step #275. Then, at step #280, by adding a correction amount $\Delta\epsilon_A(z)$ required for correcting the manufacturing error of the optical system in the direction of Z axis in the region A, the above described defocus amount Δε' corrected by the temperature t and the defocus amount Δε to each other, an accurate defocus amount is obtained at step #280 and then, is stored in a register DAR at step #282. Then, a decision is made at step #285 as to whether or not the AF mode is employed. In the case of "YES" at step #285, the program flow proceeds to processing of AF calculation. On the other hand, in the case of "NO" at step #285, the program flow proceeds to processing of display control.

When the peak value PA1 is not more than the predetermined value KP at step #185, or when the contrast CA1 is not more than the predetermined value KC at step #195 or when the normalized value of (YM/CA1) is not less than the predetermined value KY at step #230, the obtained data are regarded as unreliable data for focus detection and thus, calculation of focus detection of the segment A2 of the region A is performed. If it is found at step #245 that the shift amount j is not more than 17, the shift amount j is stored in the register JAR and the program flow proceeds to calculation of focus detection of the segment A2.

Figure 15A:
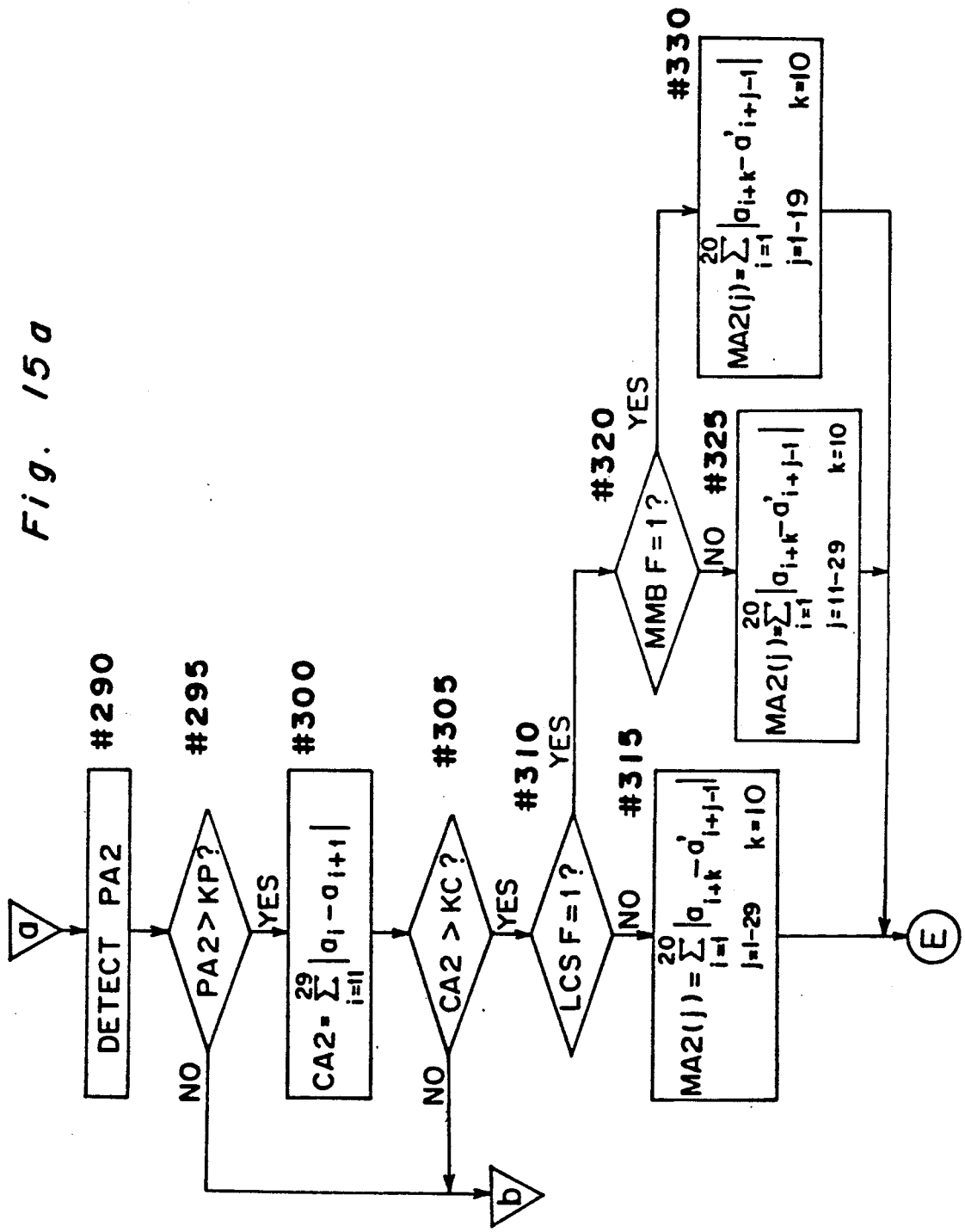
Figure 15B:
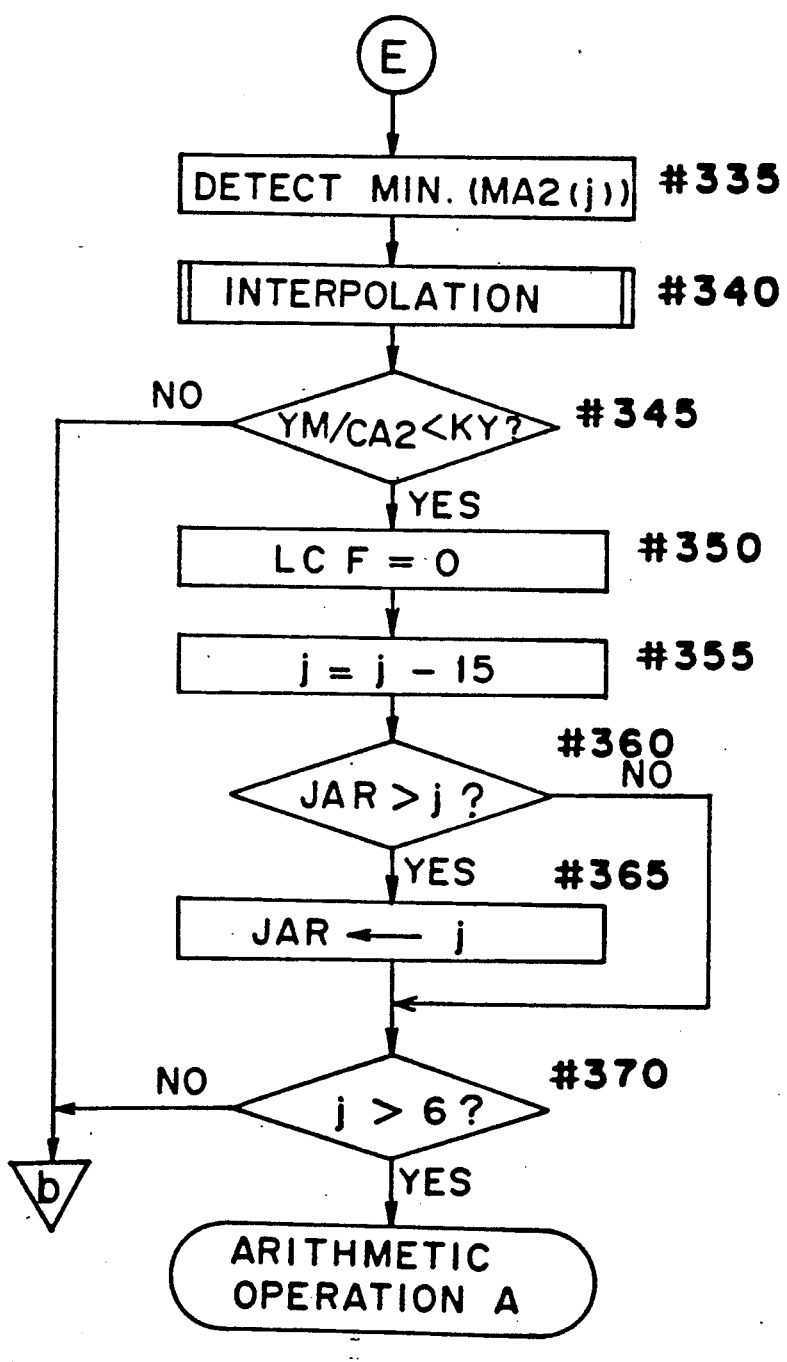

Calculation of focus detection of the segment A2 is shown in FIG. 15 comprising FIGS. 15a and 15b and is substantially the same as that of the segment A1. Therefore, a portion of calculation of focus detection of the segment A2, which is different from that of the segment A1, is described mainly. At steps #290 to #350, various data such as a peak value PA2, a contrast CA2 and a normalized value of (YM/CA2) are different from those of the segment A1. Moreover, steps #320 to #330 are different from those of the segment A1. If it is found at step #320 that the flag MMBF indicating rearward drive of the lens is set, the shift amount j ranges from 1 to 19. In the case of "NO" at step #320, the shift amount j ranges from 11 to 29.

In order to employ, as data of the standard portion, 20 data of the segment A2 ranging from 11 to 30 counted from the left, subscript k of pixels $a_{i+k}$ of the standard portion is set to 10, while subscript i ranges from 1 to 20. The reason why the shift amount at the time of forward drive of the lens (MMBF=0) and the shift amount at the time of rearward drive of the lens (MMBF=1) are made different from each other is the same as described at step #205 to #215. At the time of forward drive of the lens, all pitches and 4 pitches, which are, respectively, disposed at the rear focus side and the front focus side relative to j=15 of the in-focus state, make the shift amount j=11-29. Meanwhile, at the time of rearward drive of the lens, 4 pitches and all pitches, which are, respectively, disposed at the rear focus side and the front focus side relative to j=15 of the in-focus state, make the shift amount j=1-19.

At step #355, 15 (shift amount of the in-focus state) is subtracted from the shift amount j so as to obtain the rear focus amount from the in-focus position. A decision is made at step #360 as to whether or not the shift number of the segment A1 stored in the register JAR is greater than the subtracted shift amount j of the segment A2. In the case of "YES" at step #360, the shift amount j of the segment A2 is newly stored in the register JAR at step #365 followed by step #370. On the other hand, in the case of "NO" at step #360, the program flow proceeds to step #370 by skipping step #365. At step #370, a decision is made as to whether or not the value of the register JAR is greater than 6. In the case of "YES" at step #370, the program flow proceeds to a routine of arithmetic operation A. In the case of "NO" at step #370, the program flow proceeds to calculation of focus detection of the segment A3. This is because since a maximum defocus pitch of the rear focus state in the segment A3 is 4, it is useless to perform focus detection in the segment A3 if the shift amount j has exceeded 4. At step #370, a threshold value of 6 is employed for allowance instead of 4 in view of errors of focus detection in the same manner as at step #245. When focus detection data are found to be unreliable at step #295, #305 or #345, the program flow proceeds to calculation of focus detection of the segment A3.

Figure 16:
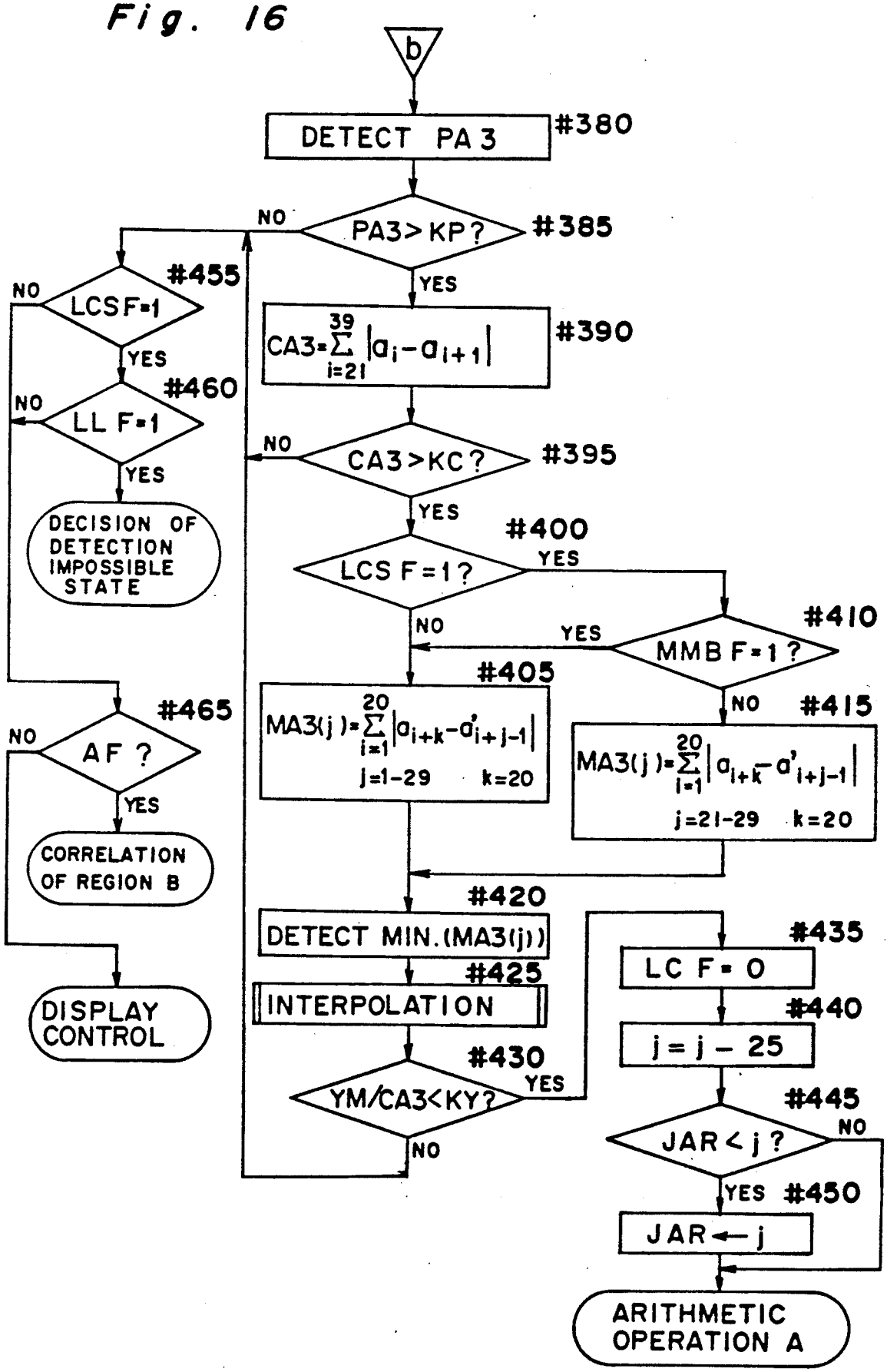

Calculation of focus detection of the segment A3 is described with reference to FIG. 16. In FIG. 16, since steps #380 to #435 are similar to steps #180 to #235 of FIG. 14, detailed description thereof is abbreviated for the sake of brevity. If it is found at step #410 that the flag MMBF indicating rearward drive of the lens is not set, namely, at the time of forward drive of the lens, focus detection in the rear focus direction is to be performed. Hence, by setting the shift amount j of the in-focus state at 25, all pitches at the rear focus side and 4 pitches at the front focus side make the shift amount j ranging from 21 to 29 at step #415. On the other hand, when the flag MMBF is set, namely, at the time of rearward drive of the lens, focus detection in the front focus direction is required to be performed, so that the shift amount j ranging from 1 to 29 is employed at step #405. When the program flow proceeds from step #435 to step #440, 25 (shift amount of the in-focus state) is subtracted from the shift amount j so as to detect the rear focus amount from the in-focus position. Then, at step #445, a decision is made as to whether or not the subtracted shift amount j is greater than the shift amount stored in the register JAR. In the case of "YES" at step #445, the shift amount j is stored in the register JAR at step #450 proceeding to a routine of arithmetic operation A. In the case of "NO" at step #445, the program flow proceeds to the routine of arithmetic operation A by skipping step #450. When data obtained at step #385, #395 or #430 are unreliable for focus detection, the program flow proceeds to step #455 at which a decision is made as to whether or not the flag LCSF indicative of the mode for searching, while the lens is being driven, for a region enabling focus detection is set. In the case of "YES" at step #455, a decision is made at step #460 as to whether or not the flag LLF indicative of a low luminance is set. In the case of "YES" at step #460, the program flow proceeds to a processing for deciding whether or not focus detection is impossible.

As described above, in the mode in which while the lens is being driven (LCSF=1), auxiliary light is emitted (LLF=1) so as to search for a region enabling focus detection, focus detection of only the region A including the segments A1, A2 and A3 is performed, so that correlation calculation of the region B is not performed. When either one of the flags LCSF and LLF is not set, the program flow proceeds to step #465 at which a decision is made, by detecting a level of a signal of the input terminal IP6, as to whether or not the AF mode is employed. In the case of "YES" at step #465, the program flow proceeds to correlation calculation of the region B. In the case of "NO" at step #465, namely, if the FA mode is employed, the program flow proceeds to a processing of display control of the focusing state without performing correlation calculation of the region B.

Figure 17A:
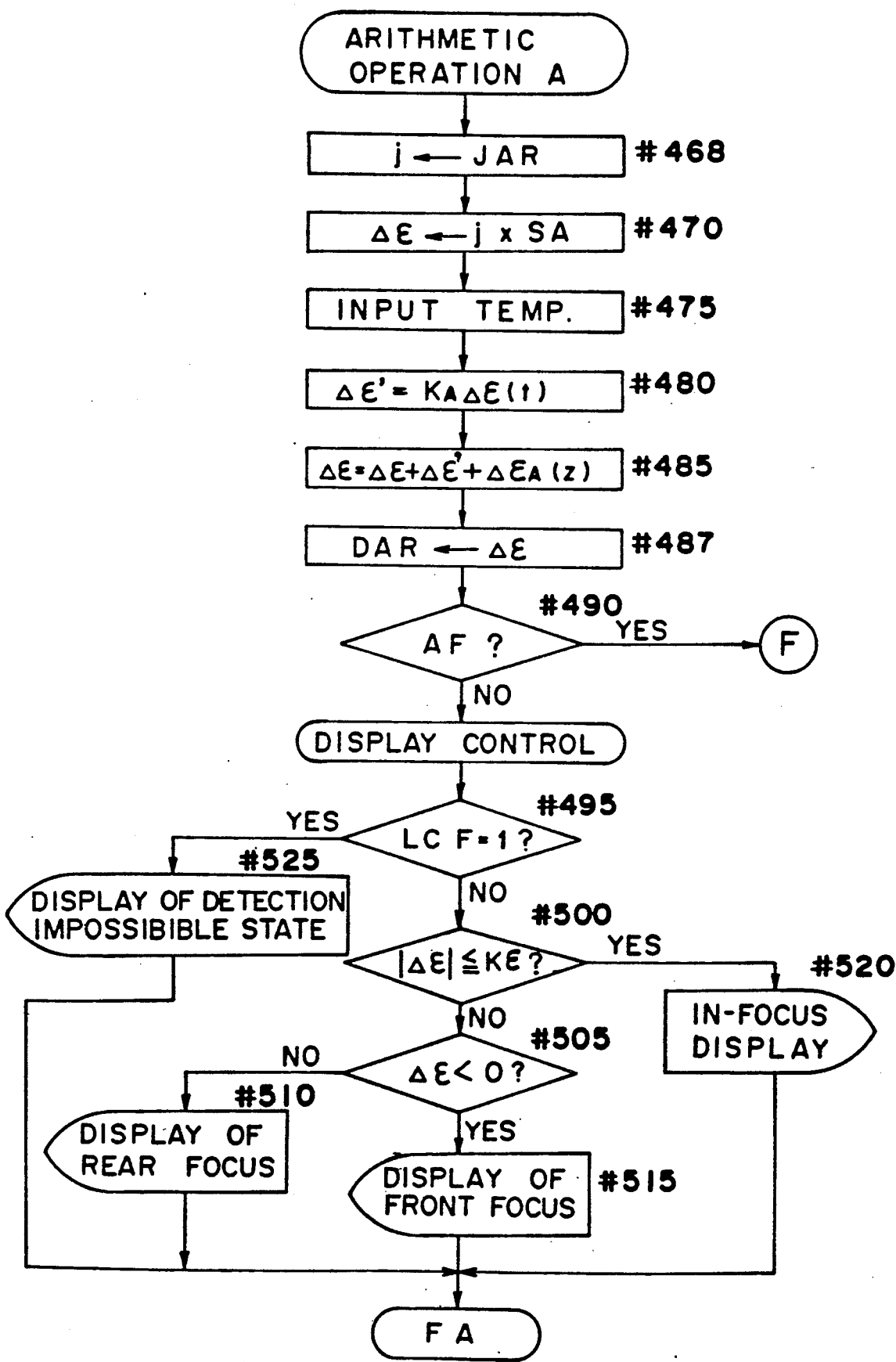
Figure 17B:
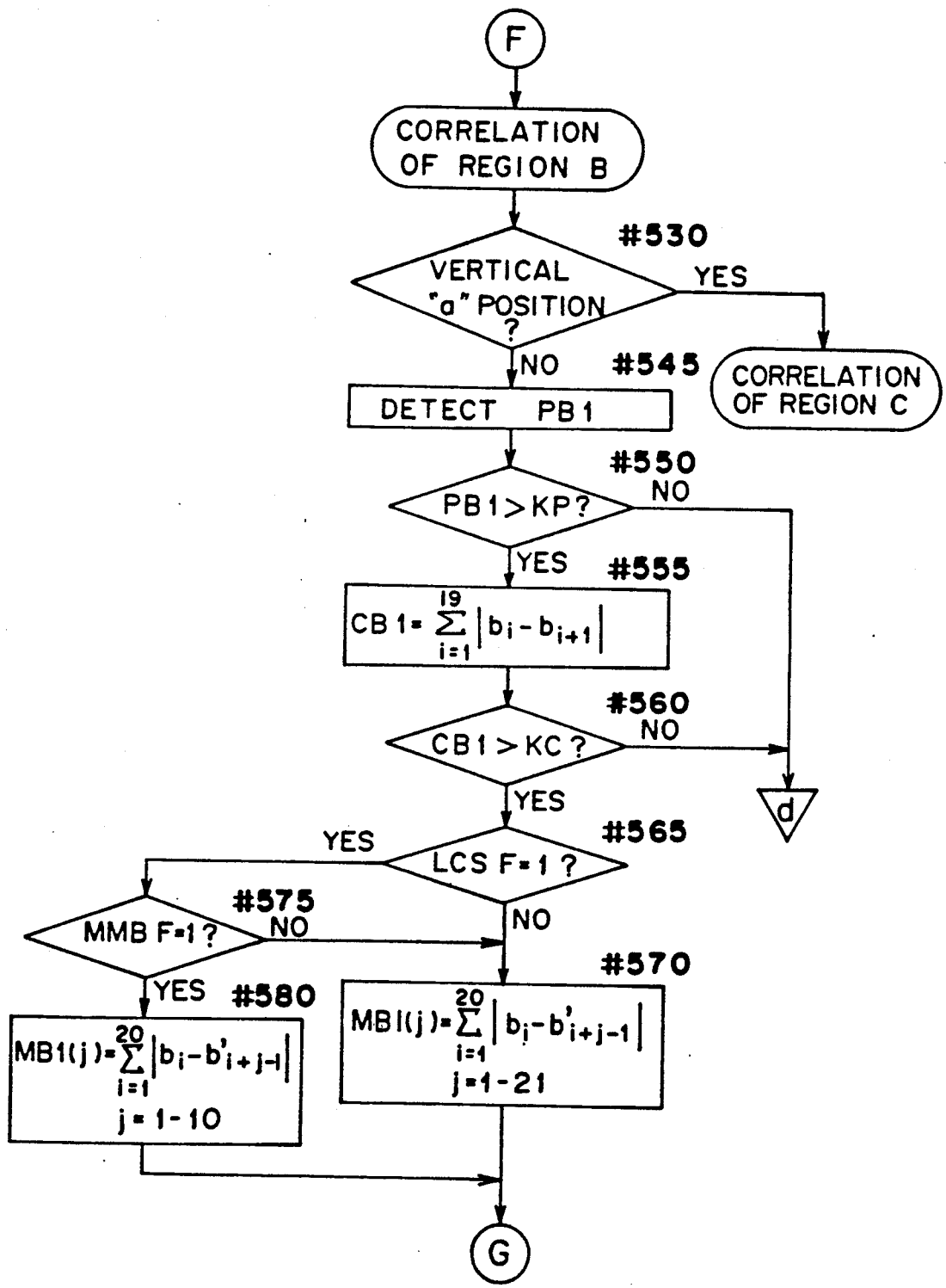
Figure 17C:
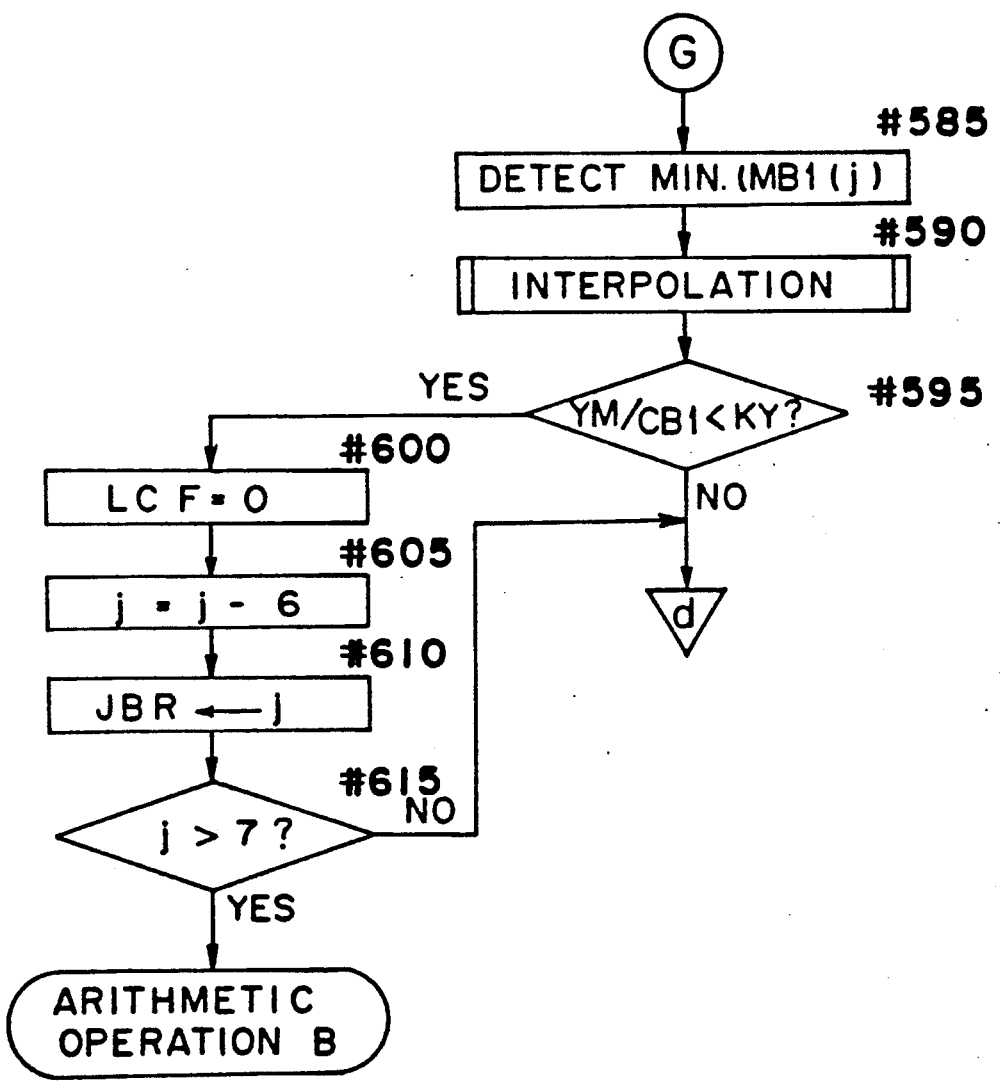

Then, the routine of the arithmetic operation A is described with reference to FIG. 17 comprising FIGS. 17a, 17b and 17c. The shift amount j stored in the register JAR is multiplied by the defocus amount SA per pitch in the region A so as to obtain the defocus amount $\Delta\epsilon$ at steps #468 and #470. At step #475, a temperature is inputted from the temperature detecting device TEMPDET to the microcomputer $\mu$C. Then, at step #480, a standard defocus correction amount $\Delta\epsilon(t)$ of the focus detecting optical system for temperature is read from a table and then, a coefficient $K_A$ is read from the table so as to obtain a defocus correction amount $\Delta\epsilon'$ in the region A corrected by temperature by multiplying the standard defocus correction amount $\Delta\epsilon(t)$ by the coefficient $K_A$. An accurate defocus amount is obtained by adding the assembly error $\Delta\epsilon_A(z)$ in the direction of the optical axis, the corrected defocus amount $\Delta\epsilon'$ to the defocus amount $\Delta\epsilon$ at step #485 and then, is stored in the register DAR at step #487. Then, at step #490, the microcomputer $\mu$C decides, by detecting a level of a signal of the input terminal IP6, whether or not the AF mode is employed. In the case of "YES" at step #490, the program flow proceeds to correlation calculation of the region B. In the case of "NO" at step #490, the program flow proceeds to a processing of display control for displaying the focusing state.

Initially, the processing of display control is described. At step #495, the microcomputer $\mu$C decides whether or not the flag LCF indicating that focus detection is impossible is set. In the case of "YES" at step #495, a state that focus detection is impossible is displayed by the display portion DISPII as described with reference to FIG. 7 and then, the program flow proceeds to a processing "FA". In the case of "NO" at step #495, a decision is made at step #500 as to whether or not an absolute value of the defocus amount $\Delta\epsilon$, i.e., $|\Delta\epsilon|$ is equal to or less than a predetermined value $K\epsilon$ indicative of a range of the in-focus state. In the case of "YES" at step #500, the program flow proceeds to step #520 for displaying the in-focus state by the display portion DISPII. In the case of "NO" at step #500, a decision is made at step #505 as to whether or not the defocus amount $\Delta\epsilon$ is negative. In the case of "YES" at step #505, the program flow proceeds to step #515 for displaying the front focus state by the display portion DISPII. In the case of "NO" at step #505, the program flow proceeds to step #510 for displaying the rear focus state by the display portion DISPII. Steps #510 and #515 are followed by the processing "FA".

Then, correlation calculation of the region B is described. By detecting levels of signals of the input terminals IP4 and IP3, the microcomputer $\mu C$ decides at step #530 whether or not the camera body is held at the vertical "a" position. In the case of the vertical "a" position, namely when the region B is disposed at the lower portion in the display of the viewfinder of FIG. 7, focus detection of the region B is not performed on the assumption that a target object to be photographed seldom exists in such a lower portion as the region B. This is partly because the target object can be generally caught in the region A even if the region B is neglected. Another reason is as follows. Namely, when the target object exists in the region A, the lower position may frequently contain another object disposed more adjacent to the lens than the target object, as in the case of a figure appearing in the region A and an object appearing in the region B and disposed at the foot and forwardly of the figure. In such a case, the near object in the region B is focused and thus, the target object is not focused. Therefore, another reason is to prevent such a phenomenon. Thus, if it is found at step #530 that the camera body is held at the vertical "a" position, the program flow proceeds to correlation calculation of the region C.

In the case of "NO" at step #530, the program flow proceeds to step #545. Since steps #545 to #600 for performing correlation calculation of the segment B1 are similar to steps #180 to #235 for the segment A1, detailed description thereof is abbreviated for the sake of brevity. At step #575, a decision is made as to whether or not the flag MMBF indicative of rearward drive of the lens is set. In the case of "NO" at step #575, correlation calculation of a whole of the reference portion is performed at step #570. This is because the segment B1 is allotted for the rear focus side. On the other hand, in the case of "YES" at step #575, all pitches and 4 pitches (for allowance), which are, respectively, disposed at the front focus side and the rear focus side relative to the shift amount $j=6$ of the in-focus state, make the shift amount $j=1-10$ such that correlation calculation of the reference portion is performed by using the shift amount $j=1-10$ at step #580.

When the peak value PB1 is not more than the predetermined value KP at step #550, or when the contrast CB1 is not more than the predetermined value KC at step #560 or when the normalized value of (YM/CB1) is not less than the predetermined value KY at step #595, the program flow proceeds to correlation calculation of the segment B2. At step #605, 6 is subtracted from the shift amount j so as to calculate the rear focus amount. The subtracted shift amount j is stored in the register JBR. Then, at step #615, a decision is made as to whether or not the shift amount j is greater than 7. When the shift amount j is greater than 7, it is useless to perform correlation calculation of the segment B2 and thus, the program flow proceeds to a processing of arithmetic operation B for calculating the defocus amount. Numeral "7" of step #615 may be replaced by numeral "6" essentially, but numeral "7" is employed in view of error in the same manner as step #245 for the region A. Then, in the case of "NO" at step #615, the program flow proceeds to correlation calculation of the segment B2.

Figure 18A:
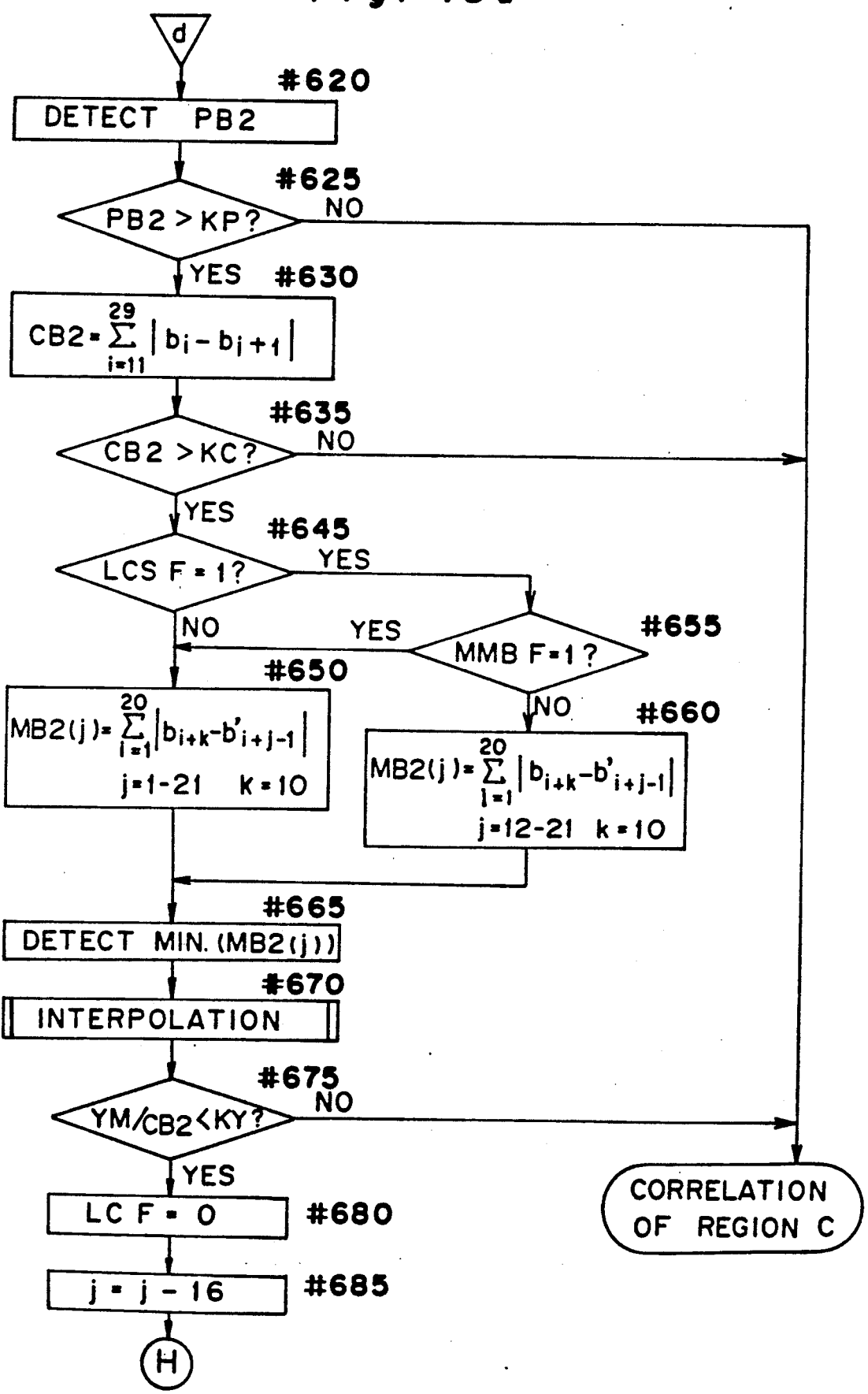
Figure 18B:
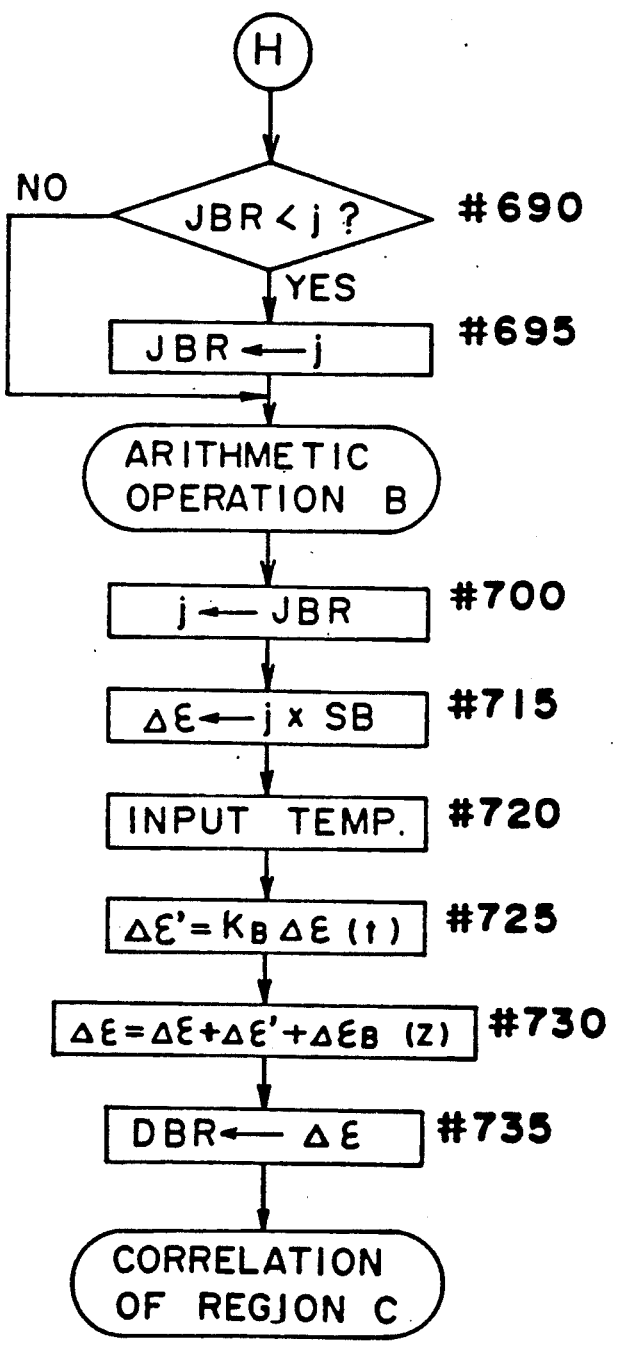

FIG. 18 comprising FIGS. 18a and 18b shows correlation calculation of the segment B2. Steps #620 to #680 are similar to steps #545 to #600 for correlation calculation of the segment B1 and therefore, are described briefly. At step #655, a decision is made as to whether or not the flag MMBF indicative of rearward drive of the lens is set. In the case of "YES" at step #655, correlation calculation of a whole of the reference portion is performed at step #650. In the case of "NO" at step #655, pitches up to the shift amount $j=21$ and 4 pitches, which are, respectively, disposed at the rear focus side and the front focus side relative to the shift amount $j=16$ of the in-focus state, make the shift amount $j=12-21$ such that correlation calculation of the reference portion is performed by using the shift amount $j=12-21$ at step #660. When the peak value PB2 is not more than the predetermined value KP at step #625, or when the contrast CB2 is not more than the predetermined value KC at step #635 or when the normalized value of (YM/CB2) is not less than the predetermined value KY, these data are regarded as unreliable for focus detection and thus, the program flow proceeds to correlation calculation of the region C.

At step #685, 16 (shift amount of the in-focus state) is subtracted from the shift amount j. Then, at step #690, a decision is made as to whether or not the subtracted shift amount j is greater than the shift amount stored in the register JBR. In the case of "YES" at step #690, the subtracted shift amount j is stored in the register JBR at step #695. On the contrary, in the case of "NO" at step #690, the program flow proceeds to a routine of arithmetic operation B by skipping step #695.

In the routine of arithmetic operation B, the shift amount stored in the register JBR is allotted to the shift amount j at step #700. Then, at step #715, the defocus amount SB per pitch in the region B is read from the memory table and is multiplied by the shift amount j so as to obtain the defocus amount $\Delta \epsilon$. A measured temperature is inputted from the temperature detecting device TEMPDET to the input terminal It1 at step #720. Then, at step #725, a standard defocus correction amount $\Delta \epsilon(t)$ corresponding to the measured temperature is read from the table and is multiplied by a temperature coefficient $K_B$ in the region B so as to obtain a corrected defocus amount $\Delta \epsilon'$. Subsequently, the defocus amount $\Delta \epsilon$, the correction value $\Delta \epsilon'$ obtained as described above and a correction amount $\Delta \epsilon_B(z)$ for correcting an error produced in the direction of the optical axis at the time of assembly are read from the memory table and are added to each other so as to newly obtain a defocus amount $\Delta \epsilon$ at step #730. Thereafter, this new defocus amount $\Delta \epsilon$ is stored in the register DBR at step #735 and then, the program flow proceeds to correlation calculation of the region C.

Figure 19A:
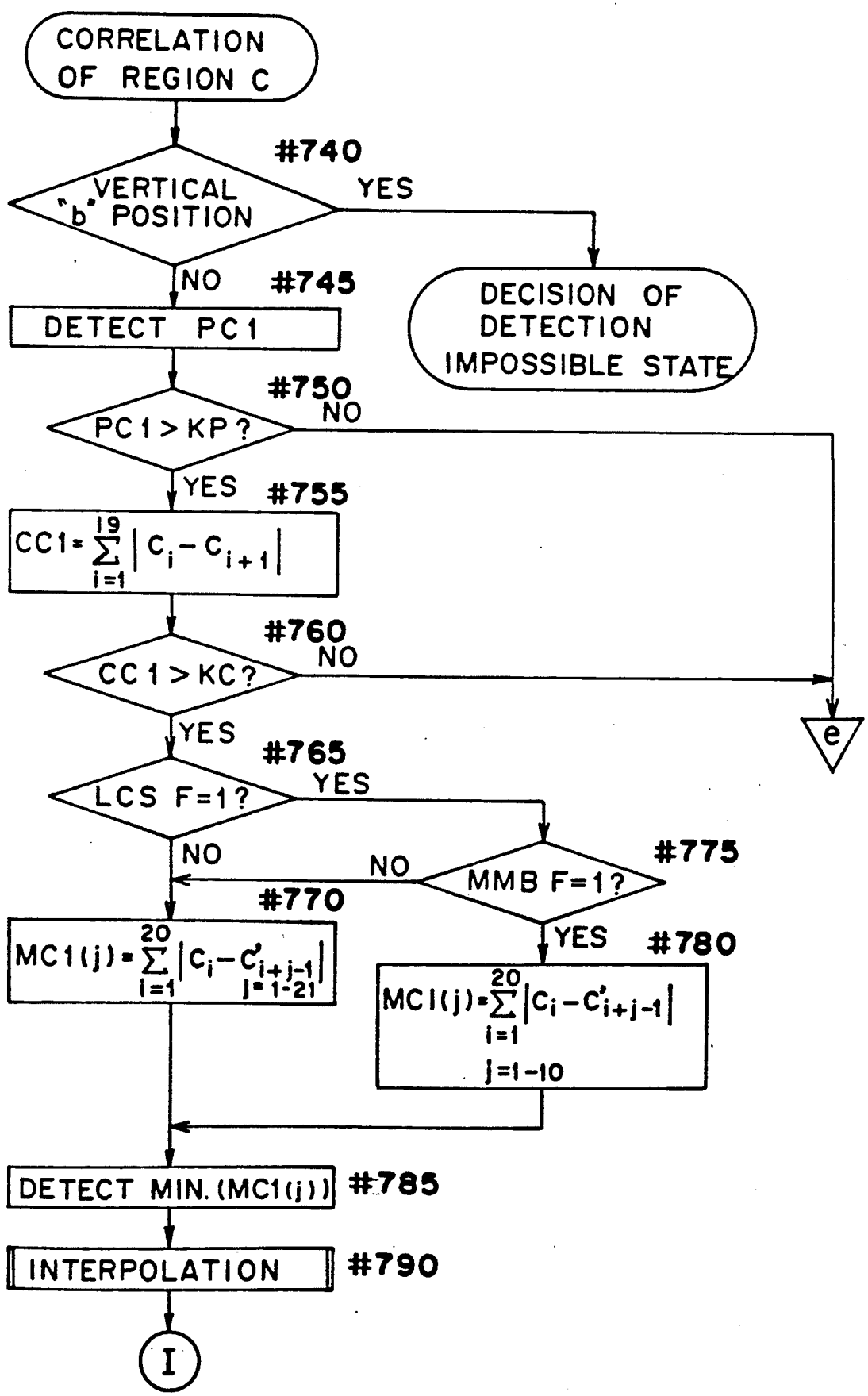
Figure 19B:
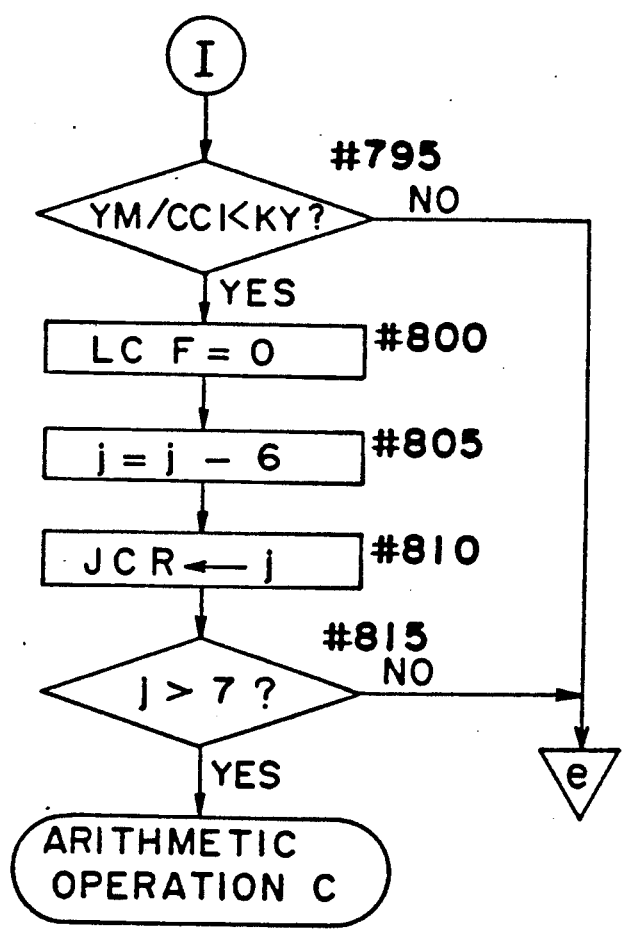
Figure 20A:
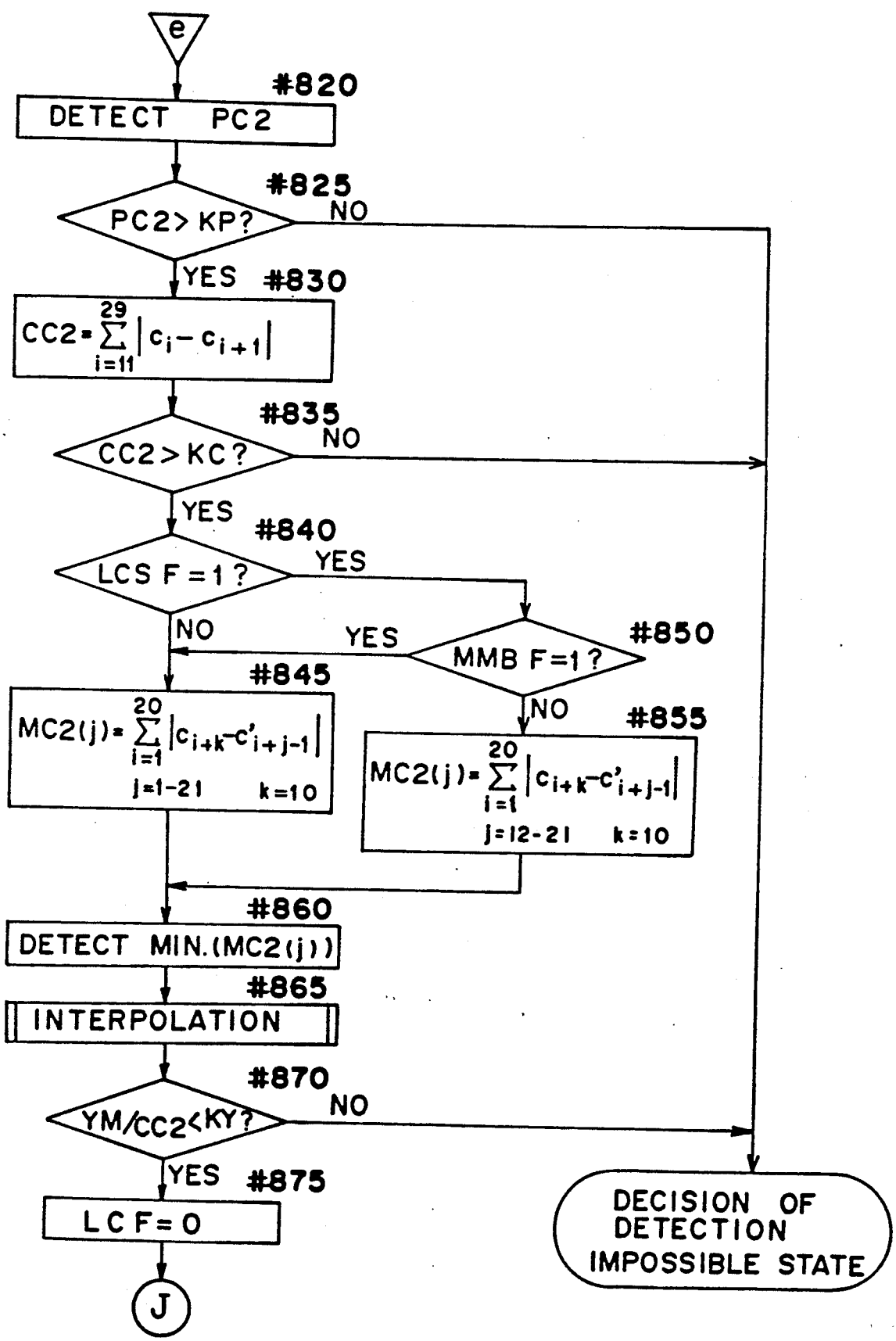
Figure 20B:
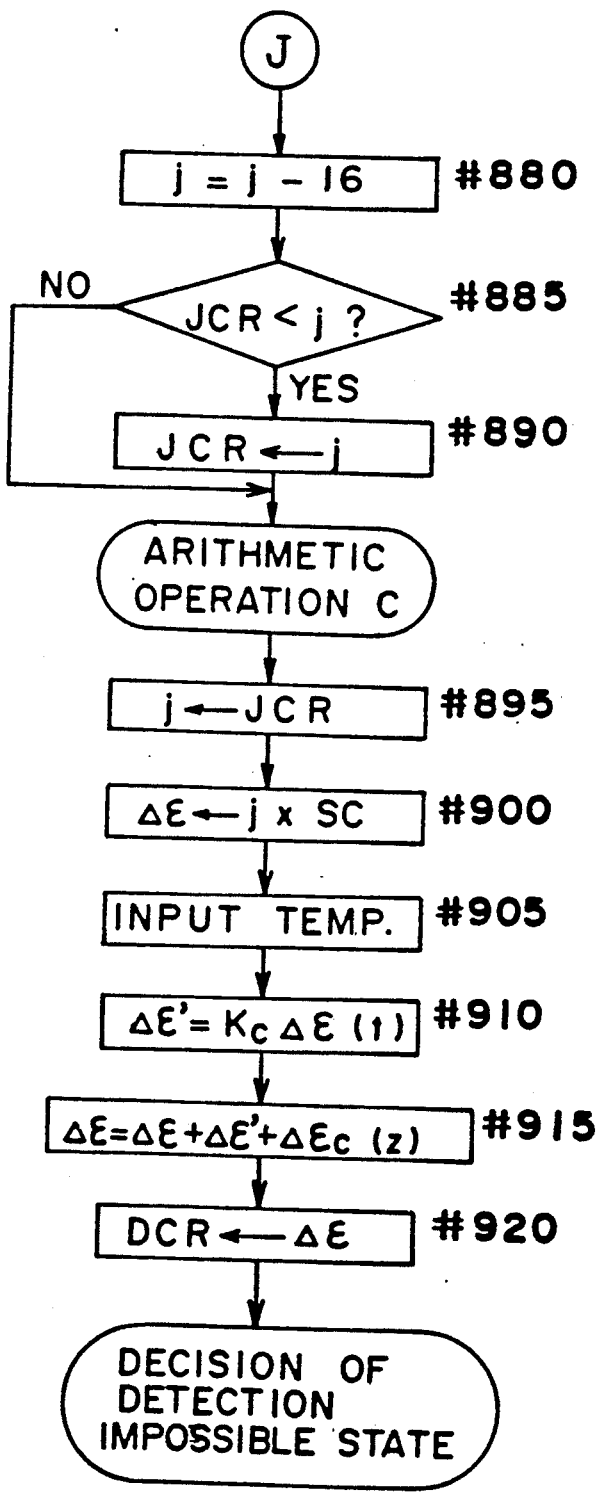

As shown in FIG. 19 comprising FIGS. 19a and 19b and FIG. 20 comprising FIGS. 20a and 20b, in correlation calculation of the region C, a decision is initially made at step #740 as to whether or not the camera body is held at the vertical "b" position. In the case of "YES" at step #740, the region C is disposed at the lower side of the photographing field. Thus, in order to exclude the region C from an area for focus detection, the program flow proceeds to the routine for deciding whether or not focus detection is impossible, without performing correlation calculation of the region C. In the case of "NO" at step #740, correlation calculation of the segments C1 and C2 is performed at steps #745 to #920. As is seen from FIG. 9, the regions C and B are disposed sidewise symmetrically with respect to a center of the photographing field and have an identical vertical length. Therefore, algorithm for focus detection in the region C is substantially the same as steps #545 to #735 except for variables, calculation results, registers, etc. and thus, description of steps #745 to #920 is abbreviated. A difference between steps #545 to #735 and steps #745 to #920 lies in the region B, if data for focus detection are unreliable or when focus detection has been completed, the program flow proceeds to correlation calculation of the region C, while in the region C, in the above two cases, the program flow proceeds to the routine for deciding whether or not focus detection is impossible.

Figure 21A:
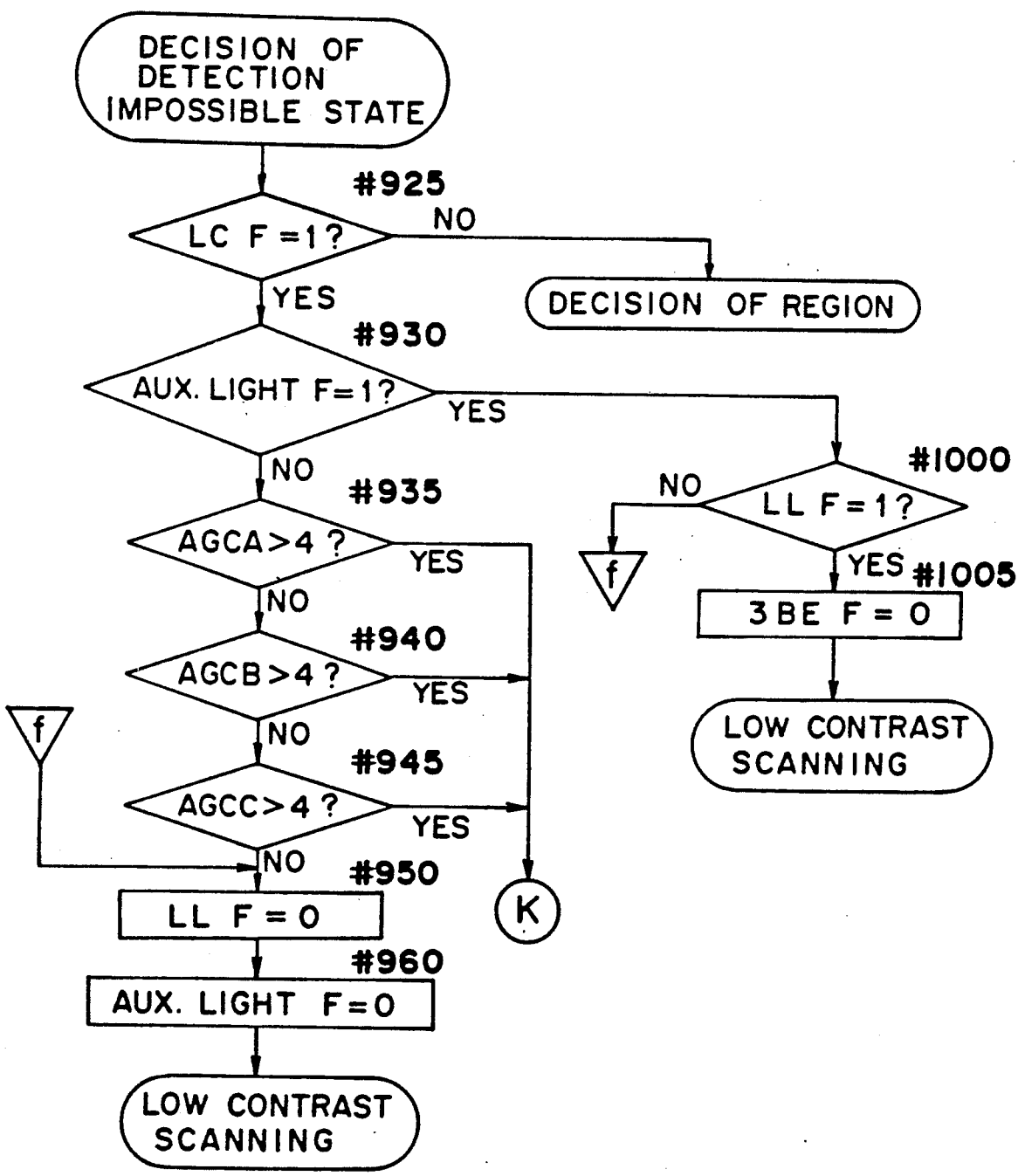
Figure 21B:
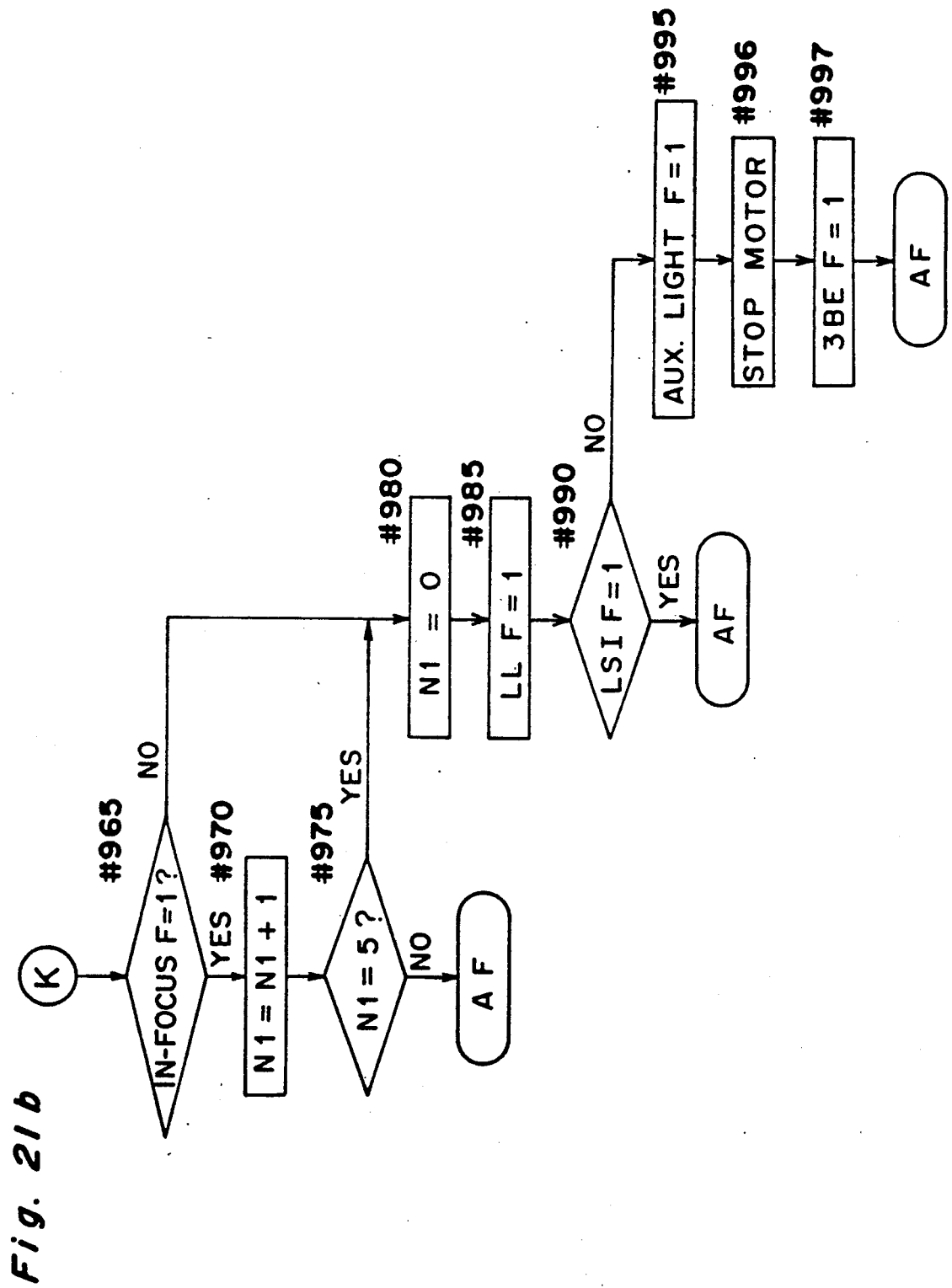

FIG. 21 comprising FIGS. 21a and 21b shows the routine for deciding whether or not focus detection is impossible. At step #925, the microcomputer µC decides, by using the flag LCF indicating that focus detection is impossible, whether or not focus detection was possible. The flag LCF is set at the time of start of focus detection and is reset in case focus detection is possible in each region. Thus, when the flag LCF is reset, the program flow proceeds to a routine for deciding a region for detecting the most rear focus side. On the other hand, when the flag LCF is set, focus detection of all the regions A, B and C is regarded as impossible (unreliable) and thus, the program flow proceeds to step #930. At step #930, a decision is made, by using the auxiliary light flag, as to whether or not auxiliary light has been emitted in focus detection at this time. Initially, a case is described in which the auxiliary light flag is not set, namely focus detection has been performed by using only ambient light. At steps #935, #940 and #945, a decision is made as to whether or not the AGC data AGCA, AGCB and AGCC of the regions A, B and C are greater than 4, respectively. In the case of "NO" at steps #935 to #945, focus detection in ambient light is regarded as possible, the flag LLF indicative of a low luminance is reset at step #950 and then, the auxiliary light flag is reset at step #960. Resetting of the flags LLF and the auxiliary light flag has a significance when the program flow proceeds from step #1000 as will be described later. Then, the program flow proceeds to the processing of low-contrast contrast scanning. When any one of the AGC data AGCA, AGCB and AGCC of the regions A, B, and C is greater than 4 at steps #935 to #945, the program flow proceeds to step #965 at which a decision is made as to whether or not the preceding focus detecting operation achieved the in-focus state, namely, the in-focus flag was set. In the case of "NO" at step #965, a variable N1 is reset to 0 at step #980 and then, the flag LLF indicative of a low luminance is set at step #985. The above described variable N1 is provided such that, when the in-focus state has been achieved in the continuous AF mode by emitting auxiliary light, auxiliary light is emitted not at the time of each focus detecting operation but at intervals of several focus detecting operations as will be described in detail later.

Subsequently, a decision is made at step #990 to whether or not a flag LSIF indicating prohibition of low-contrast scanning in which a region enabling focus detection is searched for while the lens is being driven is set. The flag LSIF is set when it was impossible to obtain the region enabling focus detection although predetermined operations were performed. When the flag LSIF is set, emission of auxiliary light is prohibited. The reason for setting the flag LSIF is as follows. Namely, it is useless to perform, after it was decided that focus detection is impossible, namely, low-contrast scanning having emission of auxiliary light has been performed, focus detection having emission of auxiliary light, thereby resulting in waste of power consumption. For this reason, when the flag LSIF indicating prohibition of low-contrast scanning is set, the program flow does not proceed to steps #995 and so on for emitting auxiliary light but proceeds to a routine "AF" in which focus detection is performed without emitting auxiliary light (the auxiliary light flag is set to 0). In the case of "NO" at step #990, the auxiliary light flag is set at step #995 and the motor is stopped at step #996. Then, in order to perform focus detection by emitting three auxiliary light beams, a flag 3BEF for emitting three auxiliary light beams is set at step #997 and the program flow proceeds to the routine "AF".

If it is found at step #965 that the preceding focus detecting operation achieved the in-focus state, 1 is added to the variable N1 at step #970 and a decision is made at step #975 as to whether or not the variable N1 reaches 5. In the case of "YES" at step #975, the program flow proceeds to step #980 referred to above. In the case of "NO" at step #975, the program flow proceeds to the routine "AF". Thus, auxiliary light is emitted at intervals of six focus detecting operations such that power consumption is reduced. In the case of "YES" at step #930, the program flow proceeds to step #1000 at which a decision is made as to whether or not the flag LLF indicative of a low luminance is set. In the case of "NO" at step #1000, the program flow proceeds to step #950 such that the processing escapes from the auxiliary light mode. On the other hand, in the case of "YES" at step #1000, the flag 3BEF indicative of the three beams is reset at step #1005 and the program flow proceeds to the processing of low-contrast scanning.

Figure 22:
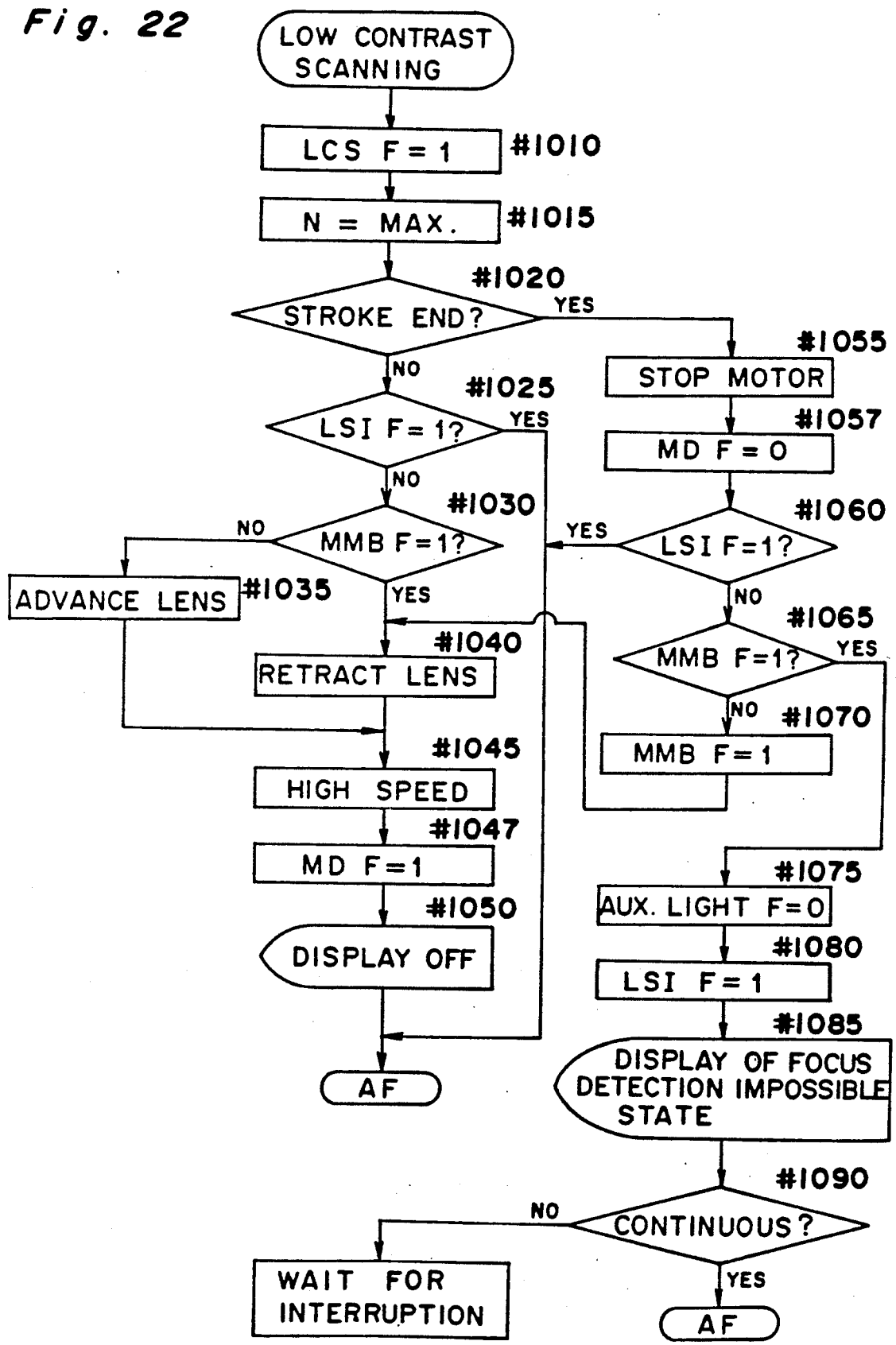

Then, the processing of low-contrast scanning is described with reference to FIG. 22. The microcomputer initially sets the flag LCSF indicative of low-contrast scanning at step #1010 and sets to a maximum value a count N of a counter for controlling a drive amount of the motor at step #1015. The maximum value may assume a value greater than a drive amount of the motor produced in one focus detecting operation, i.e., a value greater than the number of pulses from an encoder. Thus, in focus detection of low-contrast scanning, such a phenomenon is prevented that the lens stops although focus detection is impossible.

Subsequently, at step #1020, a decision is made, based on whether or not the switch S3 is in the ON state, as to whether or not the lens is disposed at one of its opposite stroke ends. If the switch S3 is in the OFF state, namely, the lens is not disposed at one of the stroke ends, a decision is made at step #1025 as to whether or not the flag LSIF indicating prohibition of low-contrast scanning is set. In the case of "YES" at step #1025, the program flow proceeds to the routine "AF" without performing low-contrast scanning. In the case of "NO" at step #1025, a decision is made at step #1030 as to whether or not the flag MMBF indicative of rearward drive of the lens is set. In the case of "YES" at step #1030, a control signal for retracting the lens is outputted to a motor control circuit MOC at step #1040. In the case of "NO" at step #1030, a control signal for advancing the lens is outputted to the motor control circuit MOC at step #1035. Then, at step #1045, a control signal for setting a rotational speed of the motor at a high speed is outputted to the motor control circuit MOC. In response to these control signals, the motor control circuit MOC controls the motor. Subsequently, at step #1047, a flag MDF indicating that the motor is being driven is set. Then, at step #1050, a control signal for turning off a display lamp indicative of a focus detecting state is outputted to the display portion DISPII and then, the program flow proceeds to the routine "AF".

In the case of "YES" at step #1020, the microcomputer μC outputs to the motor control circuit MOC a signal for stopping the motor at step #1055 and then, the flag MDF is reset at step #1057 so as to indicate stop of the motor. Then, at step #1060, a decision is made as to whether or not the flag LSIF indicative of prohibition of low-contrast scanning is set. In the case of "YES" at step #1060, the program flow proceeds to the routine "AF" without performing low-contrast scanning. In the case of "NO" at step #1060, the program flow proceeds to step #1065 at which a decision is made as to whether or not the flag MMBF indicative of rearward drive of the lens is set. In the case of "NO" at step #1065, this means that the lens has been advanced to the stroke end. Thus, in order to continue control of rearward drive of the motor, the flag MMBF is set at step #1070 and then, the program flow proceeds to step #1040 for controlling the motor. In the case of "YES" at step #1 it is considered that a region enabling focus detection cannot be detected even if the lens is retracted or advanced. Thereafter, at step #1075, in order to prohibit emission of auxiliary light at the time of the next focus detecting operation, the auxiliary light flag is reset at step #1075 and then, the flag LSIF indicative of prohibition of low-contrast scanning is set at step #1080 so as to prohibit the next low-contrast scanning. Then, the state that focus detection is impossible is displayed by the display portion DISPII at step #1085.

The, at step #1090, the microcomputer μC decides from the state of the switch S5 whether or not the continuous AF mode is employed. In the case of "YES" at step #1090, the program flow proceeds to the routine "AF" so as to continue focus detection. In the case of "NO" at step #1090, the program flow proceeds to waiting of the next interruption, more concretely, further turning on of the switch S1.

Figure 23A:
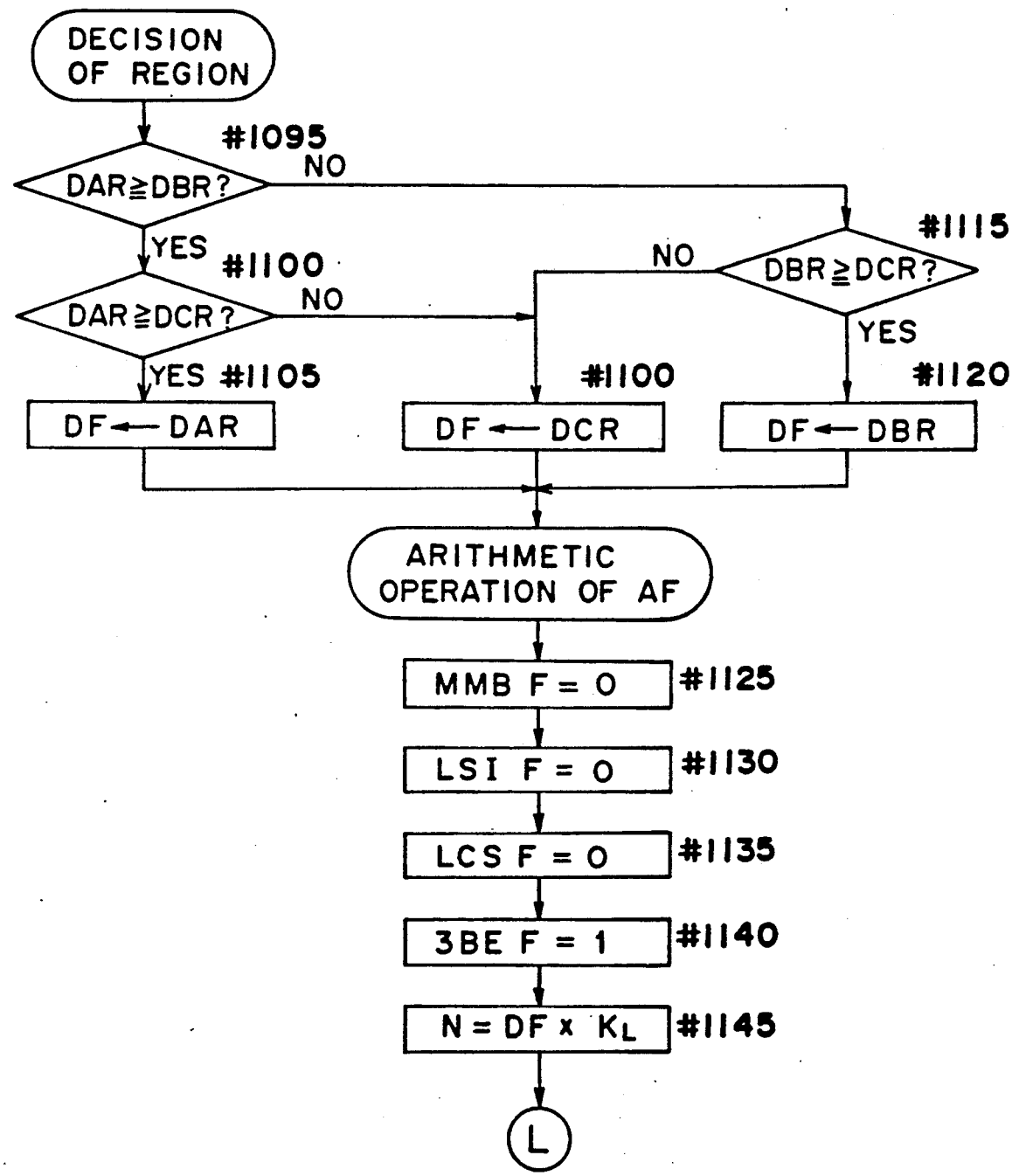
Figure 23B:
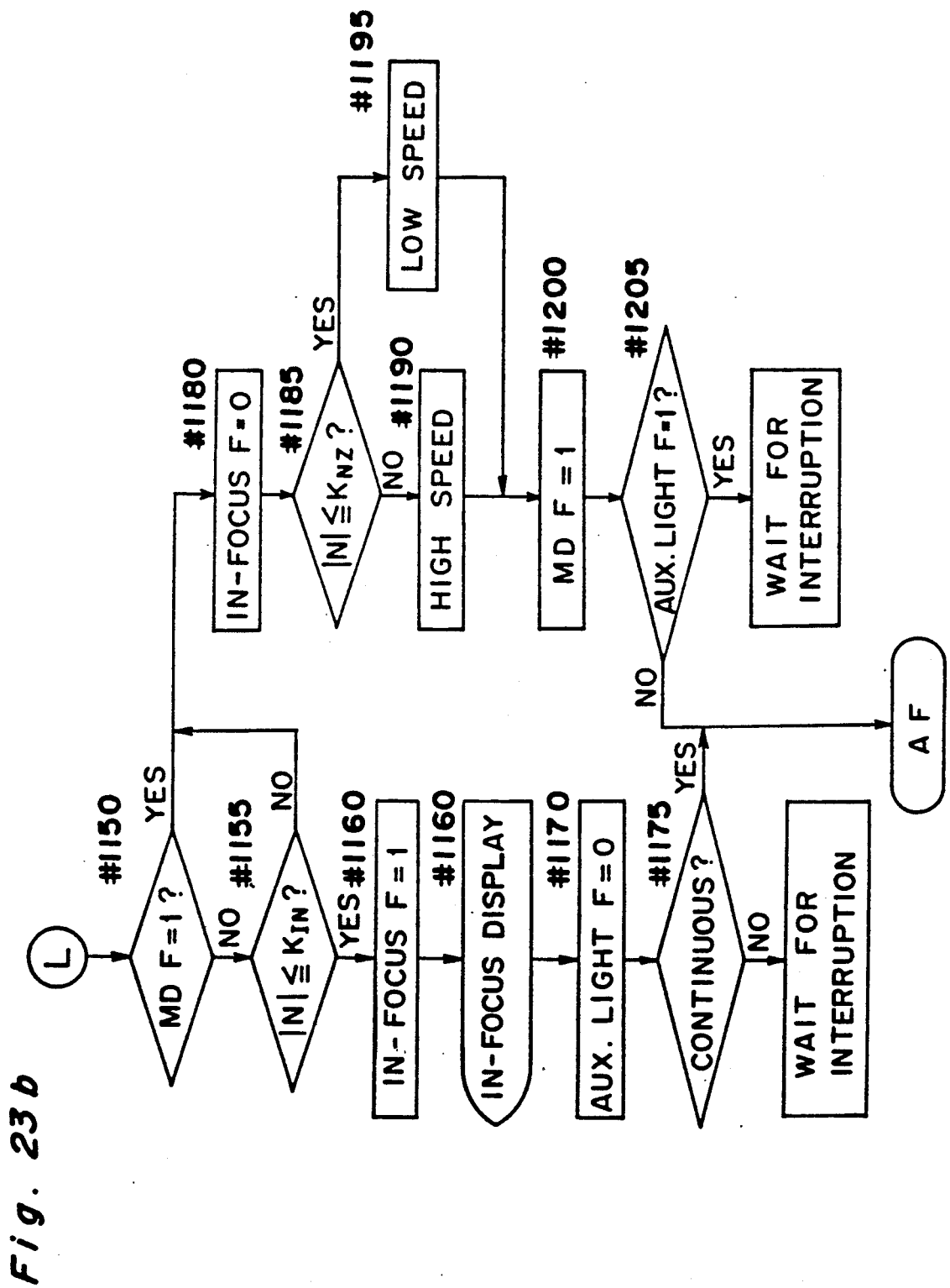

Hereinbelow, description of how one of the defocus amounts of the respective regions obtained when focus detection is possible is selected is given with reference to a routine of FIG. 23 comprising FIGS. 23a and 23b for deciding on one of the regions. As described above, in the device, it is so arranged than an object disposed most proximate to the camera body is focused. To this end, it is proper to select a defocus amount taken at the most rear focus side, i.e., a maximum defocus amount. In the routine for deciding on one of the regions, the maximum defocus amount is detected at steps #1095, #1100 and #1115. The defocus amount of the region in which the maximum defocus amount has been selected is employed as the defocus amount DF at steps #1095 to #1120 and then, the program flow proceeds to a routine of arithmetic operation of AF for obtaining a drive amount of the lens. In the routine of arithmetic operation of AF, since focus detection is possible, the flag MMBF indicative of rearward drive of the lens, the flag LSIF indicative of prohibition of low-contrast scanning and the flag LCSF indicative of low-contrast scanning are reset at steps #1125, #1130 and #1135, respectively and then, the flag 3BEF for emitting three auxiliary light beams is set at step #1140. Then, at step #1145, the defocus amount DF obtained as described above is multiplied by a coefficient $K_L$ for converting the defocus amount into the number N of rotations of the motor so as to obtain the number N of rotations of the motor.

Then, at step #1150, a decision is made, by the flag MDF indicating that the motor is being driven, as to whether or not the motor is being driven. When the flag MDF is not set, namely, the lens is at a stop, a decision is made at step #1155 as to whether or not an absolute value $|N|$ of the number N of rotations of the motor is equal to or less than a predetermined value $K_{IN}$ indicative of an in-focus range. In the case of "YES" at step #1155, an in-focus flag is set at step #1160 and then, the in-focus state is displayed by the display portion DISPII. Subsequently, in order to prohibit emission of auxiliary light, the auxiliary light flag is reset at step #1170. Then, at step #1175, a decision is made as to whether or not the continuous AF mode is employed. In the case of "YES" at step #1175, the program flow returns to the routine "AF" so as to repeat focus detection. In the case of "NO" at step #1175, the program flow proceeds to waiting of an interruption.

When the motor is being driven at step #1150, namely, the flag MDF is set or when an object is not in focus at step #1155, namely, the absolute value $|N|$ of the number N of rotations of the motor is greater than the predetermined value $K_{IN}$, the program flow proceeds to step #1180 at which the in-focus flag indicative of the in-focus state is reset. Then, at step #1185, a decision is made as to whether or not the absolute value $|N|$ of the number N of rotations of the motor is equal to or less than a predetermined value $K_{NZ}$ indicative of a range in the vicinity of the in-focus position. In the case of "YES" at step #1185, a signal for setting the rotational speed of the motor at a low speed is outputted to the motor control circuit MOC at step #1195. In the case of "NO" at step #1185, a signal for setting the rotational speed of the motor at a high speed is outputted to the motor control circuit MOC at step #1190. Then, at step #1200, the flag MDF indicating that the motor is being driven is set at step #1200. Subsequently, at step #1205, a decision is made, based on whether or not the auxiliary light flag is set, as to whether or not the focus detecting operation at this time has been performed by using auxiliary light. In the case of "YES" at step #1205, the program flow proceeds to waiting of an interruption. In the case of "NO" at step #1205, the program flow proceeds to the routine "AF". Thus, when not only focus detection is possible but auxiliary light is being emitted, focus detection is not performed during drive of the lens.

Figure 24:
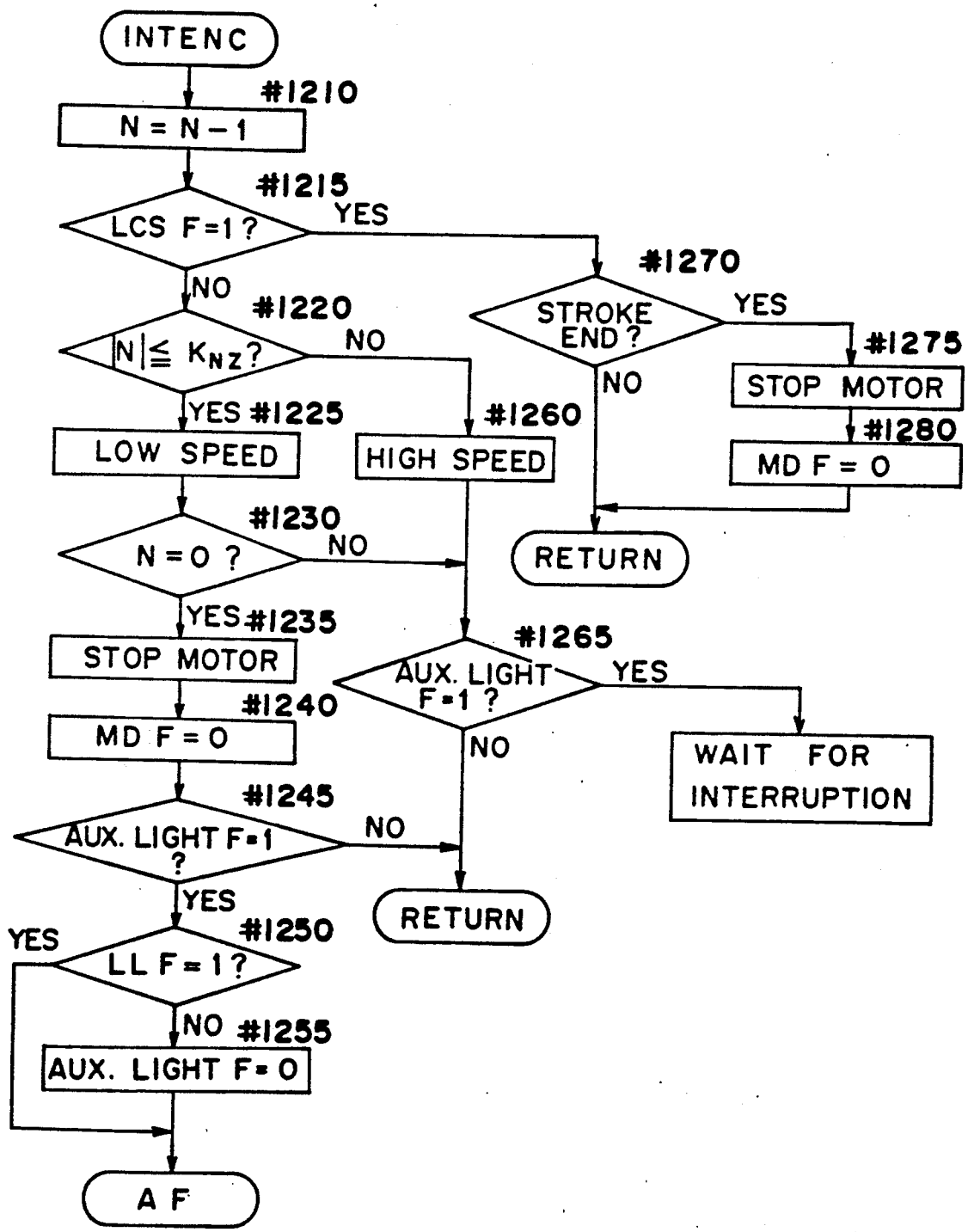
Figure 25:
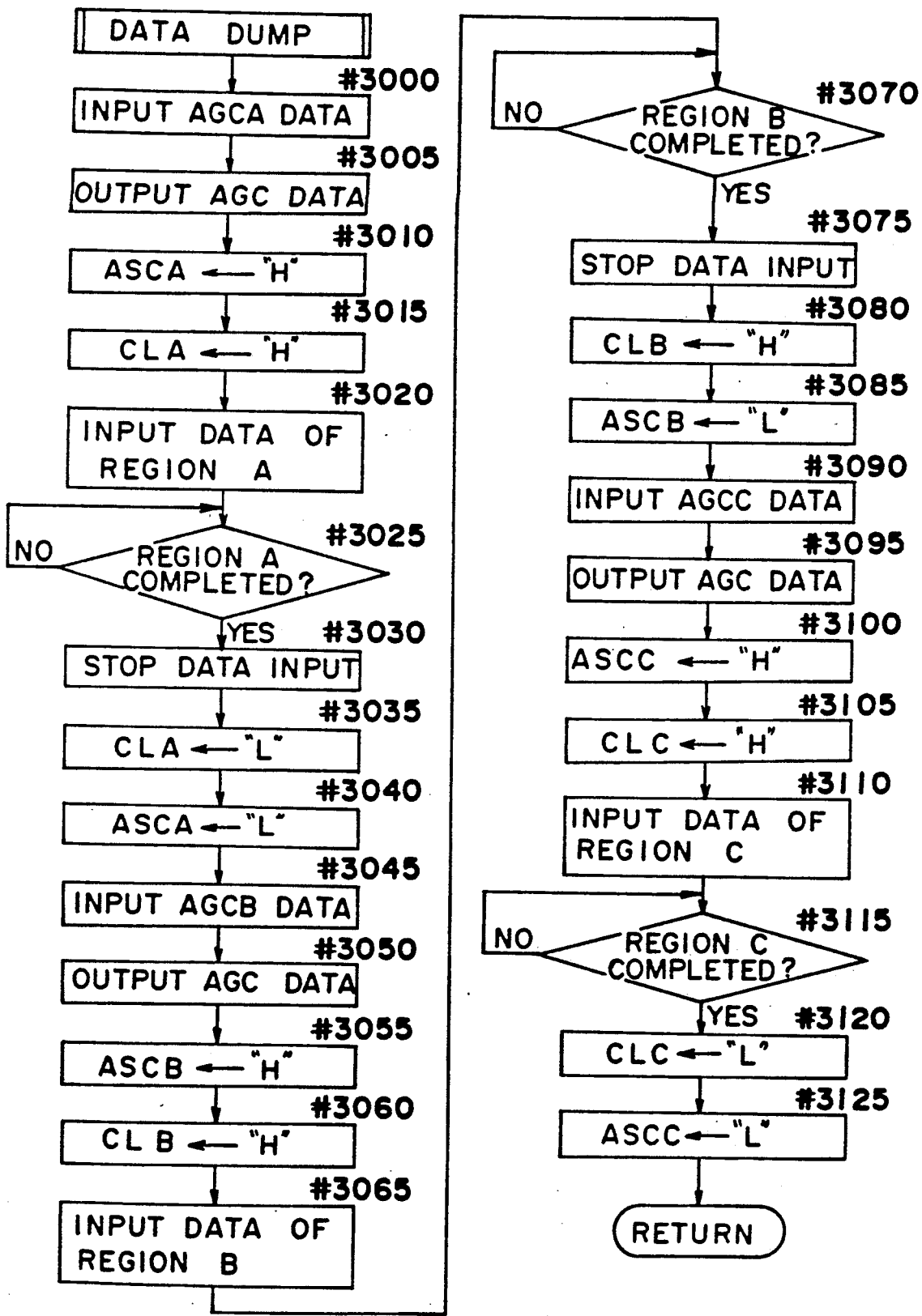

Hereinbelow, a processing INTENC for performing an interruption each time a pulse from the encoder circuit ENC is inputted is shown in FIG. 24 and control of the motor and control of focus detection during drive of the motor are described. Initially, the microcomputer μC subtracts 1 from the number N of rotations of the motor at step #1210. Then, at step #1215, a decision is made, based on whether or not the flag LCSF is set, as to whether or not low-contrast scanning is being performed. In the case of "YES" at step #1215, a decision is made at step #1270, based on whether or not the switch S3 is in the ON state, as to whether or not the lens is disposed at one of the stroke ends. In the case of "NO" at step #1270, the program flow returns. In the case of "YES" at step #1270, a signal for stopping the motor is outputted at step #1275 and the flag MDF is reset so as to indicate stop of the motor at step #1280 and then, the program flow returns. In the case of "NO" at step #1215, a decision is made at step #1220 as to whether or not the absolute value |N| of the number N of rotations of the motor is equal to or less than the predetermined value $K_{NZ}$ indicative of a range in the vicinity of the in-focus position. In the case of "NO" at step #1220, the signal for setting the motor to the high speed is outputted to the motor control circuit MOC at step #1260 and the program flow proceeds to step #1265. On the other hand, in the case of "YES" at step #1220, the signal for setting the motor to the low speed is outputted to the motor control circuit MOC at step #1225 and then, a decision is made at step #1230 as to whether or not the variable N has reached 0. In the case of "NO" at step #1230, a decision is made at step #1265 by the auxiliary light flag as to whether or not focus detection has been performed by emitting auxiliary light. If the auxiliary light flag is set, it is decided that auxiliary light has been emitted and then, the program flow proceeds to waiting of an interruption. In the case of "NO" at step #1265, the program flow returns.

In the case of "YES" at step #1230, the control signal for stopping the motor is outputted to the motor control circuit MOC at step #1235 and the flag MDF is reset at step #1240. Then, at step #1245, a decision is made by the auxiliary light flag as to whether or not focus detection has been performed by emitting auxiliary light. In the case of "YES" at step #1245, a decision is made at step #1250 as to whether or not the flag LLF indicative of a low luminance is set. In the case of "NO" at step #1250, the auxiliary light flag is reset at step #1255 and the program flow proceeds to the routine "AF". In the case of "YES" at step #1250, the program flow proceeds directly to the routine "AF" by skipping step #1255. On the other hand, in the case of "NO" at step #1245, the program flow returns.

Hereinbelow, one modification of the present invention is described. In the above described embodiment, when the camera body is held at the vertical "a" position and the vertical "b" portion, correlation calculation of the region B and that of the region C are not performed, respectively. In this modification, correlation calculation of the regions B and C is performed even if the camera body is held at the vertical position. It is supposed that sign MAX.($\Delta\epsilon A$, $\Delta\epsilon C$) denotes one of the defocus amounts $\Delta\epsilon A$ and $\Delta\epsilon C$ of the regions A and C, which is greater at the rear focus side than the other one of the defocus amounts $\Delta\epsilon A$ and $\Delta\epsilon C$. At the vertical "a" position, when not only the defocus amount $\Delta\epsilon B$ of the region B is maximum but an absolute value of a difference between the defocus amount $\Delta\epsilon B$ and the defocus amount MAX.($\Delta\epsilon A$, $\Delta\epsilon C$) is not more than a predetermined value, the defocus amount $\Delta\epsilon$ may be calculated from the following equation.

$$\Delta\epsilon = K \cdot \Delta\epsilon B + (1 - K) \cdot MAX.(\Delta\epsilon A, \Delta\epsilon C)$$

$$(0 < K < 1)$$

Likewise, it is supposed that sign MAX.($\Delta\epsilon A$, $\Delta\epsilon B$) denotes one of the defocus amounts $\Delta\epsilon A$ and $\Delta\epsilon B$ of the regions A and B, which is greater at the rear focus side than the other one of the defocus amounts $\Delta\epsilon A$ and $\Delta\epsilon B$. At the vertical "b" position, when not only the defocus amount $\Delta\epsilon C$ of the region C is maximum but an absolute value of a difference between the defocus amount $\Delta\epsilon C$ and the defocus amount MAX.($\Delta\epsilon A$, $\Delta\epsilon B$) is not more than a predetermined value, the defocus amount $\Delta\epsilon$ may be calculated from the following equation.

$$\Delta\epsilon = K \cdot \Delta\epsilon C + (1 - K) \cdot MAX.(\Delta\epsilon A, \Delta\epsilon B)$$

Figure 27:
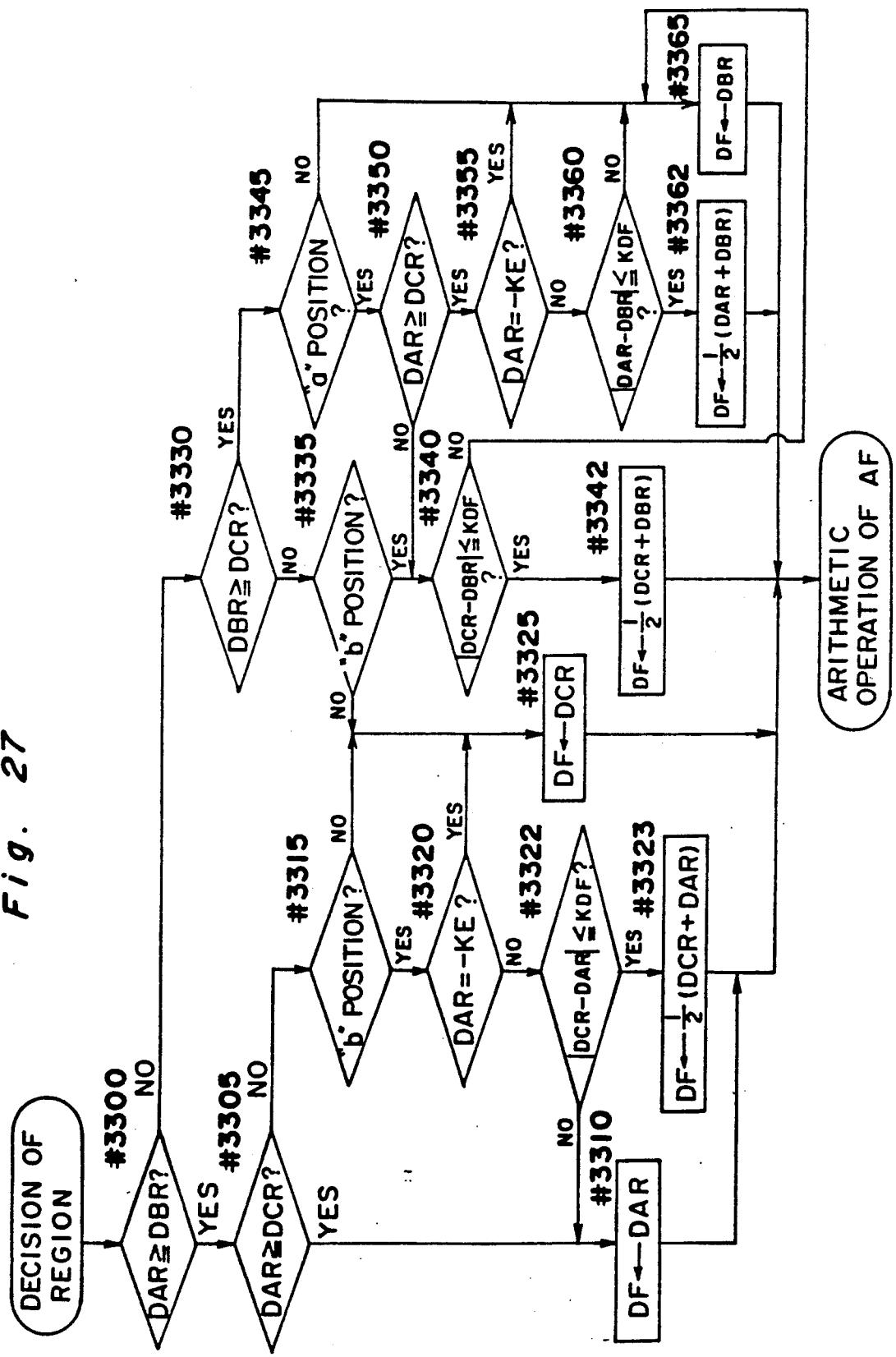

This modification is based on an idea that there is a possibility of existence of an object within the region B or C in both of the above cases. Namely, since it is improper to use the defocus amount by employing only one of the regions, one of the defocus amounts $\Delta\epsilon B$ and $\Delta\epsilon C$ and a larger one of the other defocus amounts are used to obtain the true defocus amount $\Delta\epsilon$. In order to execute a processing of the modification, the routine of FIG. 23 for deciding on the region is changed into that of FIG. 27 by deleting step #530 of FIG. 17 and step #740 of FIG. 19. In FIG. 27, the constant K is set to ½.

In FIG. 27, when the defocus amount of the region A is maximum, that is if DAR($\neq -KE$)$\geq$DBR$\geq$DCR, the program flow proceeds from step #3300, through step #3305, to step #3310 by employing the defocus amount of the region A. If DBR$\leq$DAR<DCR, the program flow proceeds from step #3300, through step #3305, to step #3315 at which a decision is made as to whether or not the camera body is held at the vertical "b" position. In the case of "NO" at step #3315, the defocus amount of the region C is employed at step #3325. On the contrary, in the case of "YES" at step #3315, a decision is made at step #3320 as to whether or not the defocus amount of the region A is equal to $-KE$, that is if DAR$= -KE$, namely, focus detection is impossible, the defocus amount of the region C is also employed at step #3325. In the case of "NO" at step #3320, a decision is made at step #3322 as to whether or not an absolute value of a difference between the defocus amount of the region C and the defocus amount of the region A is equal to or less than a predetermined value KDF. In the case of "YES" at step #3322, ½(DAR+DCR) is employed as a defocus amount DF at step #3323. In the case of "NO" at step #3322, the defocus amount of the region A is employed as the defocus amount DF.

If DCR>DBR>DAR, the program flow proceeds from step #3300, through step #3330, to step #3335 at which a decision is made as to whether or not the camera body is held at the vertical "b" position. In the case of "NO" at step #3335, the defocus amount of the region C is employed at step #3325. In the case of "YES" at step #3335, a decision is made at step #3340 as to whether or not an absolute value of a difference between the defocus amount of the region B and the defocus amount of the region C is equal to or less than the predetermined value KDF. In the case of "YES" at step #3340, ½(DCR+DBR) is employed as the defocus amount DF at step #3342. In the case of "NO" at step #3340, the defocus amount of the region B is employed as the defocus amount DF at step #3365.

When the defocus amount of the region B is maximum, the program flow proceeds from step #3300, through step #3330, to step #3345 at which a decision is made as to whether or not the camera body is held at the vertical "a" position. In the case of "NO" at step #3345, the defocus amount of the region B is employed as the defocus amount DF at step #3365. In the case of "YES" at step #3345, a decision is made at step #3350 as to whether or not the defocus amount of the region A is equal to or greater than the defocus amount of the region C. In the case of "NO" at step #3350, the program flow proceeds to step #3340. Thus, in the case of "YES" at step #3340, $\frac{1}{2}$(DCR+DBR) is employed as the defocus amount DF at step #3342 as described above. In the case of "YES" at step #3350, a decision is made at step #3355 as to whether or not the defocus amount of the region A is equal to $-KE$. In the case of "YES" at step #3355, it is decided that focus detection is impossible in both the regions A and C, so that the defocus amount of the region B is employed as the defocus amount DF at step #3365. In the case of "NO" at step #3355, a decision is made at step #3360 as to whether or not an absolute value of a difference between the defocus amount of the region A and the defocus amount of the region B is equal to or greater than the predetermined value KDF. In the case of "YES" at step #3360, $\frac{1}{2}$(DAR+DBR) is employed as the defocus amount DF at step #3362. In the case of "NO" at step #3360, the defocus amount of the region B is employed as the defocus amount DF at step #3365. Meanwhile, the constant K is not limited to $\frac{1}{2}$.

Furthermore, in the above described embodiment, correction in the direction of the optical axis is performed in each of the focus detecting regions. However, it is needless to say that accuracy of focus detection is improved if correction in the direction of the optical axis is performed in each segment of each of the focus detecting regions.

Steps #455 and #460 of FIG. 16 decide whether or not low-contrast scanning is performed in the auxiliary light mode. If focus detection is impossible in the region A at the time of low-contrast scanning in the auxiliary light mode, it is decided whether or not focus detection is impossible, without performing focus detection of the regions B and C. Thus, it becomes possible to reduce a time period required for automatic focusing without performing calculation of focus detection of portions not subjected to irradiation of auxiliary light. However, this scheme does not function properly in such a case that, regarding state of an object, the region A has a low luminance, while the region B or C has neither a low luminance nor a low contrast but the microcomputer $\mu$C receives from the CCD input data insufficient for focus detection because the lens is disposed far away from the in-focus position. At this time, auxiliary light is irradiated over the respective regions. However, in case focus detection is still impossible in all the regions A, B and C even if auxiliary light is irradiated over the regions A, B and C, for example, in the case where auxiliary light does not reach the object in all the regions, low-contrast scanning is performed in the auxiliary light mode. At this time, in the above described embodiment, since sufficient data for focus detection cannot be obtained in the region A, it is decided that focus detection is impossible. Namely, in the above described embodiment, although focus detection may be possible if the lens is driven because the region B or C has neither a low luminance nor a low contrast, it is decided that focus detection is impossible.

Figure 28:
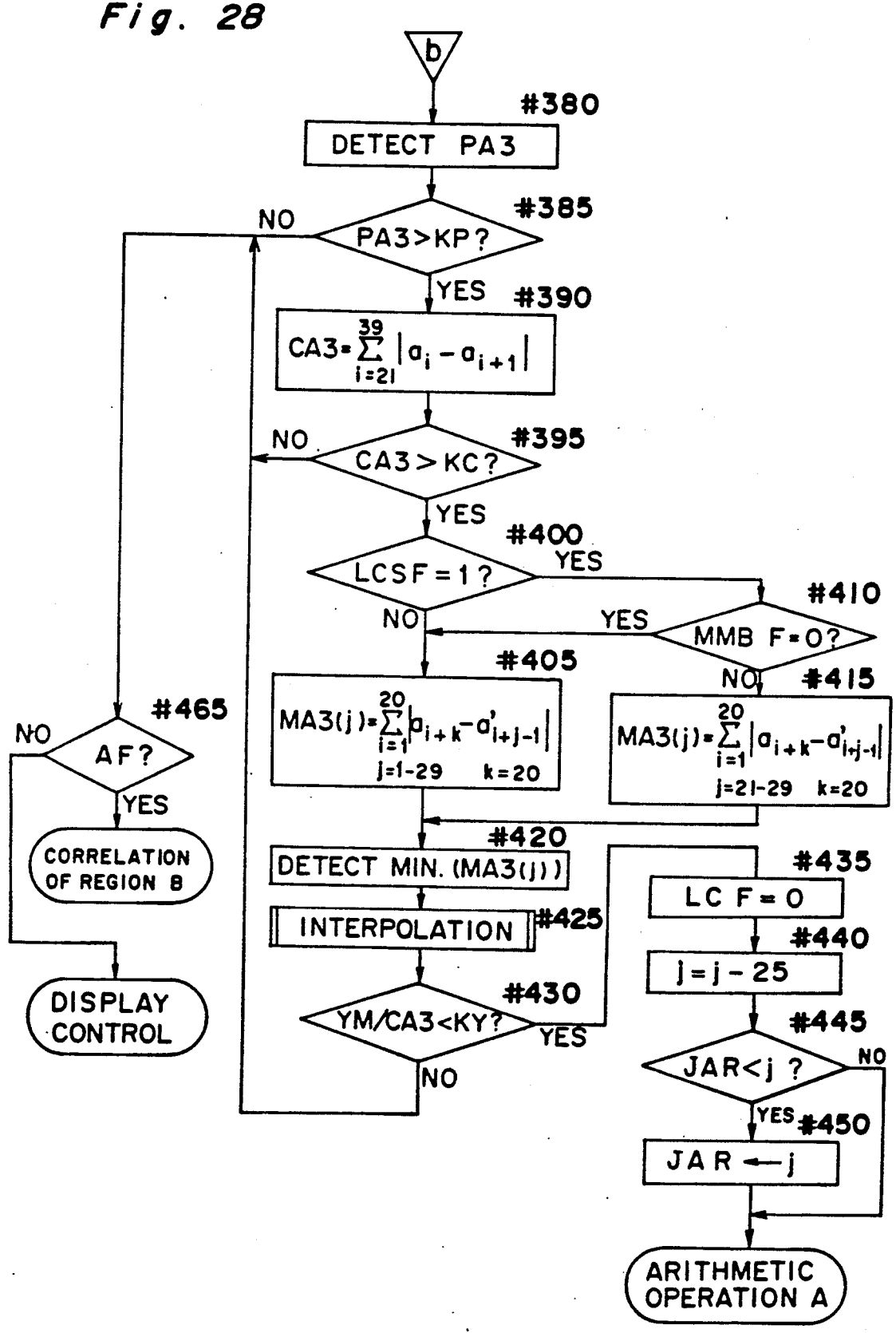

Therefore, in order to rectify such a phenomenon, steps #455 and #460 of FIG. 16 are deleted in a further modification shown in FIG. 28. By this program schema, calculation of focus detection is performed in all the regions A, B and C even at the time of low-contrast scanning in the auxiliary light mode. Namely, if it is decided at step #385, #395 or #430 that focus detection is impossible, the program flow proceeds directly to step #465. Then, if it is found at step #465 that the AF mode is employed, correlation calculation of the region B is performed and thus, calculation of focus detection is performed in all the regions A, B and C.

Moreover, in compensation of the defocus amount for temperature change, it can also be so arranged that by preparing a memory table storing a corrected defocus amount, an obtained defocus amount is corrected by using the memory table so as to obtain a real defocus amount, instead of employing a method in which a standard defocus amount produced temperature change is obtained and is multiplied by each of different coefficients of respective regions so as to obtain a corrected defocus amount.

As is clear from the foregoing description, in accordance with the present invention, since the deviation amount in the direction of the optical axis can be separately corrected in each of a plurality of the focus detecting regions, an accurate result of focus detection can be obtained in each of the focus detecting regions regardless of dimensional errors in the direction of the optical axis between each photo-sensor means and the optical system.

Furthermore, in accordance with the present invention, since the distance between the images on the light-receiving element array is converted into the defocus amount by each of the conversion coefficients stored in the respective focus detecting regions, it becomes possible to change the distance between a pair of the reimaging lenses in each of the focus detecting regions. Therefore, in the light-receiving element array corresponding to the reimaging lenses spaced a short distance from each other, the number of elements can be reduced. Thus, the chip having the light-receiving element arrays provided thereon can be made compact in size and its yield is improved. Due to reduction of the distance between the reimaging lenses, it becomes possible to make the focus control device compact in size. Meanwhile, since the number of elements of the light-receiving element array has been reduced, a time period required for inputting data is decreased.

Moreover, in accordance with the present invention, since the defocus amount obtained from the distance between the images on the light-receiving element array is compensated by temperature in accordance with the distance between the reimaging lenses corresponding to each of the light-receiving element arrays, accurate focus detection be performed even if there are differences of amounts of thermal expansion of the distances between each pair of the reimaging lenses for the respective focus detecting regions due to differences of the distances between each pair of the reimaging lenses.

Meanwhile, as described earlier, if temperature is detected at only one location on the assumption that the respective pairs of the reimaging lenses have a substantially identical temperature, the focus control device is simplified in construction.

In addition, in accordance with the present invention, since auxiliary light is not emitted regardless of brightness of the focus detecting regions if focus detection is possible even in one focus detecting region, wasteful power consumption is obviated. Meanwhile, in case focus detection is impossible in all the focus detecting regions, auxiliary light is emitted when even one focus detecting region has a low luminance, so that a probability that focus detection is possible becomes remarkably high, whereby it becomes possible to perform control of auxiliary light, which is suitable for the automatic focus control device having a plurality of the focus detecting regions.

Furthermore, in accordance with the present invention, when a region enabling focus detection is searched for by driving the lens in case focus detection is impossible, the range of calculation of the defocus amount in the direction opposite to that of search of the region enabling focus detection is restricted. Therefore, a load to the defocus amount calculating means can be reduced and the region enabling focus detection can be searched for at a high speed.

Meanwhile, the focus control device of the present invention is effective especially in that calculation of the defocus amount for focus detection is required to be a plurality of times in the focus control device having a plurality of the focus detecting regions.

Moreover, in accordance with the present invention, when the camera body is held at the vertical position, less weight for the defocus amount is given to the lower portion of the photographing field than the central portion of the photographing field such that one defocus amount is calculated. Accordingly, when a target object to be photographed is disposed at the central portion of the photographing field, an effect upon focus detection of an object disposed forwardly of the target object, i.e., disposed at the lower portion of the photographing field can be lessened, thereby raising accuracy for focusing the target object.

Meanwhile, in accordance with the present invention, since the focus detecting zone is widened in the first mode for driving the lens to the in-focus position on the basis of results of focus detection, an object in focus can be searched for in the wide range and thus, the object can be focused automatically. Therefore, the photographer does not need to pay attention to focusing of the object at the time of selection of a photographic composition. Meanwhile, since the focus detecting zone is narrowed in the second mode for performing only focus detection, a target object to be photographed can be focused accurately and focus detection suitable for each of the first and second modes can be performed.

In addition, in accordance with the present invention, since the number of the auxiliary light beams capable of being emitted is restricted during search of a region enabling focus detection in the focus control device having an electric battery acting as its power source, voltage of the power source is least likely to drop and malfunctioning of the circuit or production of measuring errors can be prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic focus control device of a camera, comprising:
    photo-sensor means for receiving, through a photo-taking lens of said camera, light coming from a plurality of regions different from each other in a photographic field to be photographed, said plurality of regions including a specified region having a plurality of blocks different from each other;
    means for detecting focus condition of said photo-taking lens with respect to said respective regions and respective blocks on the basis of a plurality of outputs of said photo-sensor means;
    means for discriminating whether or not the focus detection is possible at each of the plurality of regions, said discriminating means discriminating that the focus detection with respect to said specified region is impossible when discriminating that the focus detection with respect to all of the blocks included in said specified region is impossible; and
    means for controlling a predetermined operation of the camera when the discriminating means discriminates that the focus detection is impossible at all of the plurality of regions.

2. An automatic focus control device as claimed in claim 1, wherein said controlling means includes means for forcibly shifting a photo-taking lens of the camera by bringing said plurality of photo-sensor means and said discriminating means into operation.

3. An automatic focus control device as claimed in claim 2, further comprising means for indicating that the focus detection is impossible, when said discriminating means does not discriminate that the focus detection is possible at all of the plurality of regions during the shifting of the photo-taking lens by said forcibly shifting means.

4. An automatic focus control device of a camera, comprising:
    focus condition detecting means for detecting focus condition of a photo-taking lens of the camera;
    discriminating means for discriminating whether or not focus detection of said detecting means is possible to output a discriminating signal when the focus detection is discriminated to be impossible;
    shifting means for shifting the photo-taking lens;
    bringing means, in response to the discriminating signal, for bringing both of said detecting means and said shifting means into operation;
    direction detecting means for detecting a direction along which the photo-taking lens is shifted by said shifting means; and
    determining means, operable when said bringing means is operated in response to the discriminating signal, for determining defocus range into which the focus condition of the photo-taking lens is detected by the detecting means, said determining means determining a first defocus range along the direction detected by the detecting means and a second defocus range opposite to the direction, said first defocus range being determined to be larger than said second defocus range.

5. An automatic focus control device of a camera, comprising:
    first calculating means for calculating a plurality of defocus amounts corresponding respectively to a plurality of regions;
    means for determining a plurality of weights, each of which is attributed to each of said defocus amounts calculated by said first calculating means;
    second calculating means for calculating one amount on the basis of said plurality of defocus amounts and said plurality of weights;
    means for detecting whether the camera is held for a vertical format or for a horizontal format; and
    varying means for varying the plurality of weights determined by said determining means in accordance with the detected result of said detecting means.

6. An automatic focus control device as claimed in claim 5, wherein said varying means includes means for decreasing the weights to be attributed to the regions corresponding to a lower portion in a photographic frame to be photographed, when said vertical format is detected by said detecting means.

7. An automatic focus control device of a camera, comprising:
  first detecting means for detecting a focus condition of the photo-taking lens with respect to at least one first region in a photographic field;
  second detecting means for detecting a focus condition of the photo-taking lens with respect to a second region which is smaller than said first region;
  means for selecting either of a first mode, in which the photo-taking lens is automatically shifted to its in-focus condition, and a second mode, in which the focus condition is indicated without automatically shifting the photo-taking lens; and
  means for bringing said first detecting means into operation when said first mode is selected by said selecting means, and for bringing said second detecting means into operation when said second mode is selected by said selecting means.

8. An automatic focus control device as claimed in claim 7, wherein said first detecting means includes means for detecting a plurality of focus conditions with respect to a plurality of first regions in said photographic field, and wherein said second detecting means includes means for detecting a focus condition with respect to a second region located in the center of the photographic field.

9. An automatic focus control device as claimed in claim 7, further comprising means for shifting the photo-taking lens in accordance with the focus condition detected by said first detecting means when said first mode is selected by said selecting means, and means for indicating the focus condition detected by said second detecting means when said second mode is selected by said selecting means.

10. An automatic focus control device as claimed in claim 7, further comprising means for displaying a position corresponding to said first region when said first mode is selected by said selecting means, and for displaying a position corresponding to said second region when said second mode is selected by said selecting means.

11. An automatic focus control device as claimed in claim 10, wherein said displaying means includes a liquid crystal device.

12. An automatic focus control device of a camera, comprising:
  focus condition detecting means for detecting focus condition of a photo-taking lens of the camera;
  shifting means for shifting the photo-taking lens based on the result of said focus condition detecting means;
  direction detecting means for detecting a direction along which the photo-taking lens is shifted by said shifting means; and
  determining means for determining defocus range into which the focus condition of the photo-taking lens is detected by said focus condition detecting means, said determining means determining a first defocus range along the direction detected by the detecting means and a second defocus range opposite to the direction, said first defocus range being determined to be larger than said second defocus range.

* * * * *